(12) United States Patent
Walton et al.

(10) Patent No.: US 10,504,148 B2
(45) Date of Patent: Dec. 10, 2019

(54) PEER-TO-PEER RELAYING OF DISCOVERY INFORMATION

(71) Applicant: QUALCOMM Incorporated, San Diego, CA (US)

(72) Inventors: Jay Rodney Walton, Carlisle, MA (US); Georgios Tsirtsis, London (GB); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 812 days.

(21) Appl. No.: 14/657,694

(22) Filed: Mar. 13, 2015

(65) Prior Publication Data

US 2015/0339718 A1 Nov. 26, 2015

Related U.S. Application Data

(60) Provisional application No. 62/039,235, filed on Aug. 19, 2014, provisional application No. 62/002,662, filed on May 23, 2014.

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 20/1235* (2013.01); *G06Q 20/3226* (2013.01);
(Continued)

(58) Field of Classification Search
None
See application file for complete search history.

(56) References Cited

U.S. PATENT DOCUMENTS

| 7,986,915 B1 | 7/2011 | Wang et al. |
| 8,478,820 B2 | 7/2013 | Michaelis et al. |

(Continued)

FOREIGN PATENT DOCUMENTS

| CN | 101626370 A | 1/2010 |
| CN | 101742496 A | 6/2010 |

(Continued)

OTHER PUBLICATIONS

Konark—A system and protocols for device independent, peer-to-peer discovery and delivery of mobile services. (Year: 2003).*

(Continued)

*Primary Examiner* — Maria V Vanderhorst
(74) *Attorney, Agent, or Firm* — Patterson & Sheridan, L.L.P.

(57) ABSTRACT

Certain aspects of the present disclosure relate to methods and apparatus for wireless communication, and more specifically to advertising discovery information, relaying discovery information, and to the secure relay of discovery information in wireless networks. Various frame structures are provided for such transmitting and relaying of discovery information. According to certain aspects of the present disclosure, security is provided for relaying discovery information. According to certain aspects of the present disclosure, compensation may be provided to a device that relays discovery information (e.g., when the relaying results in a transaction).

56 Claims, 39 Drawing Sheets

(51) Int. Cl.
*G06Q 20/32* (2012.01)
*G06Q 20/38* (2012.01)
*G06Q 20/12* (2012.01)
*H04L 12/733* (2013.01)
*H04L 29/08* (2006.01)
*H04L 12/24* (2006.01)
*G05B 19/418* (2006.01)
*H04B 7/155* (2006.01)
*H04W 8/00* (2009.01)
*H04W 4/70* (2018.01)

(52) U.S. Cl.
CPC ....... *G06Q 20/387* (2013.01); *G06Q 30/0214* (2013.01); *H04L 41/5058* (2013.01); *H04L 45/20* (2013.01); *H04L 67/16* (2013.01); *H04L 67/2809* (2013.01); *H04B 7/15507* (2013.01); *H04L 41/12* (2013.01); *H04W 4/70* (2018.02); *H04W 8/005* (2013.01)

(56) References Cited

U.S. PATENT DOCUMENTS

| | | | |
|---|---|---|---|
| 8,593,948 | B1 | 11/2013 | Orii |
| 8,811,957 | B2 | 8/2014 | Jovicic et al. |
| 9,247,411 | B2 | 1/2016 | Wu et al. |
| 2004/0025018 | A1 | 2/2004 | Haas et al. |
| 2004/0103282 | A1 | 5/2004 | Meier et al. |
| 2004/0233855 | A1 | 11/2004 | Gutierrez et al. |
| 2005/0227616 | A1 | 10/2005 | Takatani et al. |
| 2006/0020783 | A1 | 1/2006 | Fisher |
| 2006/0174127 | A1 | 8/2006 | Kalavade et al. |
| 2007/0206537 | A1 | 9/2007 | Cam-Winget et al. |
| 2008/0037499 | A1 | 2/2008 | Kumar et al. |
| 2008/0052340 | A1 | 2/2008 | Hallmark |
| 2008/0076393 | A1 | 3/2008 | Khetawat et al. |
| 2008/0076419 | A1 | 3/2008 | Khetawat et al. |
| 2008/0095075 | A1 | 4/2008 | Monier |
| 2008/0137581 | A1 | 6/2008 | Doppler et al. |
| 2008/0219275 | A1 | 9/2008 | Boariu et al. |
| 2008/0221988 | A1 | 9/2008 | Bappu et al. |
| 2009/0016524 | A1 | 1/2009 | Park et al. |
| 2009/0262718 | A1 | 10/2009 | Meier et al. |
| 2009/0316628 | A1 | 12/2009 | Enns et al. |
| 2010/0061272 | A1 | 3/2010 | Veillette |
| 2010/0239087 | A1 | 9/2010 | Chaisson et al. |
| 2010/0322213 | A1 | 12/2010 | Liu et al. |
| 2011/0066850 | A1 | 3/2011 | Ekberg |
| 2011/0282793 | A1 | 11/2011 | Mercuri et al. |
| 2012/0008515 | A1 | 1/2012 | Jung |
| 2012/0167184 | A1 | 6/2012 | Vanderveen et al. |
| 2012/0230491 | A1 | 9/2012 | Duo et al. |
| 2012/0296742 | A1* | 11/2012 | Patwa ................ G06Q 30/0241 705/14.54 |
| 2012/0316939 | A1* | 12/2012 | Moshfeghi ............. G06Q 30/02 705/14.16 |
| 2013/0077489 | A1 | 3/2013 | Bloch et al. |
| 2013/0235760 | A1 | 9/2013 | Merlin et al. |
| 2013/0235789 | A1 | 9/2013 | Abraham et al. |
| 2013/0303223 | A1 | 11/2013 | Patil et al. |
| 2014/0010108 | A1* | 1/2014 | Tavildar ................ H04W 8/005 370/254 |
| 2014/0045422 | A1 | 2/2014 | Qi et al. |
| 2014/0056220 | A1 | 2/2014 | Poitau et al. |
| 2014/0064481 | A1 | 3/2014 | Abraham et al. |
| 2014/0086215 | A1 | 3/2014 | Duo et al. |
| 2014/0094212 | A1 | 4/2014 | Ahn et al. |
| 2014/0119544 | A1 | 5/2014 | Lee et al. |
| 2014/0162688 | A1 | 6/2014 | Edge |
| 2014/0206322 | A1 | 7/2014 | Dimou et al. |
| 2015/0029866 | A1 | 1/2015 | Liao et al. |
| 2015/0281938 | A1 | 10/2015 | Wei et al. |
| 2015/0327157 | A1 | 11/2015 | Al-Shalash |
| 2015/0341794 | A1 | 11/2015 | Vanderveen |
| 2019/0053059 | A1 | 2/2019 | Vanderveen et al. |

FOREIGN PATENT DOCUMENTS

| | | |
|---|---|---|
| CN | 103493435 A | 1/2014 |
| CN | 103533540 A | 1/2014 |
| CN | 103765461 A | 4/2014 |
| JP | 2004038701 A | 2/2004 |
| JP | 2004241865 A | 8/2004 |
| JP | 2007529959 A | 10/2007 |
| JP | 2010108279 A | 5/2010 |
| JP | 2011525333 A | 9/2011 |
| WO | WO-2005091546 A2 | 9/2005 |
| WO | WO-2011028381 A2 | 3/2011 |
| WO | WO-2011079054 A1 | 6/2011 |
| WO | WO-2012031247 A2 | 3/2012 |
| WO | 2013169974 A1 | 11/2013 |

OTHER PUBLICATIONS

Word of mouth mobile marketing for real world recommendations. (Year: 2010).*

International Search Report and Written Opinion—PCT/US2015/027988—ISA/EPO—dated Jul. 28, 2015.

3GPP, Technical Specification Group Services and System Aspect; Proximity-based services (ProSe); Stage 2(Release 12), [online], Feb. 2014, 3GPP TS 23. 303, V12. 0. 0, pp. 1-53, retrieved on Jan. 29, 2019.

* cited by examiner

PEER-TO-PEER RELAYING OF DISCOVERY INFORMATION

CROSS-REFERENCE TO RELATED APPLICATIONS

This application claims benefit of U.S. Provisional Patent Application Ser. No. 62/002,662, filed May 23, 2014, and U.S. Provisional Patent Application Ser. No. 62/039,235, filed Aug. 19, 2014, both of which are expressly herein incorporated by reference.

TECHNICAL FIELD

The present disclosure relates generally to wireless communication, and more particularly, to methods and apparatus for the secure relay of discovery information in wireless networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power).

Increasingly, wireless environments have a high density of wireless devices, which presents various opportunities, for example, for vendors of goods and services to reach potential customers. However, the large number of wireless devices and limited coverage areas also creates a challenge to quickly and efficiently discover those most likely to be interested in the particular goods or services offered.

In some cases, relay devices may be utilized to effectively extend range of an advertising/announcing device by relaying discovery information. The use of such relay devices creates security issues, such as how to ensure integrity of a message that is simply relayed by a device (e.g., how to ensure the relaying device has not altered the message content in any way).

SUMMARY

Aspects of the present disclosure provide a method for wireless communications. The method generally includes discovering, via device-to-device communications using a first wireless signal comprising a first one or more data packets, goods or services provided by one or more vendors, maintaining a database of one or more elements related to the goods or services, discovering, via device-to-device communications using a second wireless signal comprising a second one or more data packets, interest in the goods or services by one or more devices, deciding to share at least one element related to the goods or services based, at least in part, on the discovery of interest, and sharing the at least one element, via a third wireless signal comprising a third one or more data packets.

Aspects of the present disclosure provide a method for wireless communications. The method generally includes receiving, via a first wireless signal comprising a first one or more data packets, discovery information regarding at least one of goods or services provided by an entity, relaying the discovery information to another entity via a second wireless signal comprising a second one or more data packets, and receiving compensation for the relaying of the discovery information.

Aspects of the present disclosure provide a method for providing compensation to a relay device via a wireless transmission. The method generally includes determining that a transaction between a consuming entity and the vending entity for the goods or services resulted from the discovery information relayed by the relaying device via a wireless signal comprising one or more data packets, identifying the relay device based on information included in the one or more data packets, and providing compensation to the relay device for relaying the discovery information, based on the determination.

Aspects of the present disclosure provide a method for wireless communications. The method generally includes receiving discovery information relayed by another apparatus via a wireless signal comprising one or more data packets, the discovery information regarding at least one of goods or services relayed by an entity different from the other apparatus, identifying the entity based on information included in the one or more packets, and performing a transaction with the entity for the goods or services.

Aspects of the present disclosure provide a method for wireless communications. The method generally includes receiving, via a first wireless signal comprising a first one or more data packets, a discovery frame having one or more fields containing discovery information regarding at least one of goods or services provided by an entity and transmitting via a second wireless signal comprising a second one or more data packets, based on one or more rules, a relay frame having one or more fields containing at least a portion of the discovery information.

Aspects of the present disclosure provide a method for wireless communications. The method generally includes generating a discovery frame having one or more fields containing discovery information regarding at least one of goods or services provided by an entity associated with the apparatus and transmitting the discovery frame, via a first wireless signal comprising a first one or more data packets, to a relay device to relay at least a portion of the discovery information in a relay frame.

Aspects of the present disclosure provide a method for wireless communications. The method generally includes receiving, via a first wireless signal comprising a first one or more data packets, a relay frame from another apparatus and processing the relay frame to obtain discovery information regarding at least one of goods or services provided by an entity different from the other apparatus.

Certain aspects of the present disclosure provide method of wireless communication by an apparatus. The method generally includes constructing a discovery frame having one or more relay-specific fields changeable by relay devices capable of relaying the discovery frame, initializing the one or more relay-specific fields, generating a message integrity check (MIC) value based, at least in part, on a security key and initialized one or more relay-specific fields, and transmitting, via a first wireless signal comprising a first one or more data packets, the discovery frame including the MIC value and the relay-specific fields but lacking the security key.

Certain aspects of the present disclosure provide method of wireless communication by an apparatus. The method generally includes receiving, via a first wireless signal comprising a first one or more data packets, a discovery frame having one or more relay-specific fields changeable by relay devices capable of relaying the discovery frame, and a message integrity check (MIC) value generated based, at least in part, on a security key and initial values of the one or more relay-specific fields, adjusting one or more of the one or more relay-specific fields, and transmitting, via a second wireless signal comprising a second one or more data packets, the discovery frame including the MIC value as received and the adjusted values of the relay-specific fields.

Certain aspects of the present disclosure provide a method of wireless communication by an entity capable of verifying a discovery frame. The method generally includes providing a security key to be used to compute message integrity check (MIC) values, receiving, via a first wireless signal comprising a first one or more data packets, a discovery frame including a MIC value and one or more relay-specific fields changeable by relay devices capable of relaying the discovery frame, wherein the MIC value was generated based, at least in part, on a security key and initialized values of the one or more relay-specific fields, generating a MIC value locally based on the security key, information in the discovery frame and an adjusted values of the one or more relay-specific fields, and performing a verification function for the discovery frame based on a comparison of the MIC value included in the discovery frame and the locally generated MIC value.

Aspects also provide various apparatus, systems, computer program products, and processing systems for performing the operations described above.

BRIEF DESCRIPTION OF THE DRAWINGS

FIGS. 19A and 19B illustrate an example scenario of when a UE may act as a replayer, in accordance with certain aspects of the present disclosure.

DETAILED DESCRIPTION

Figure 1:
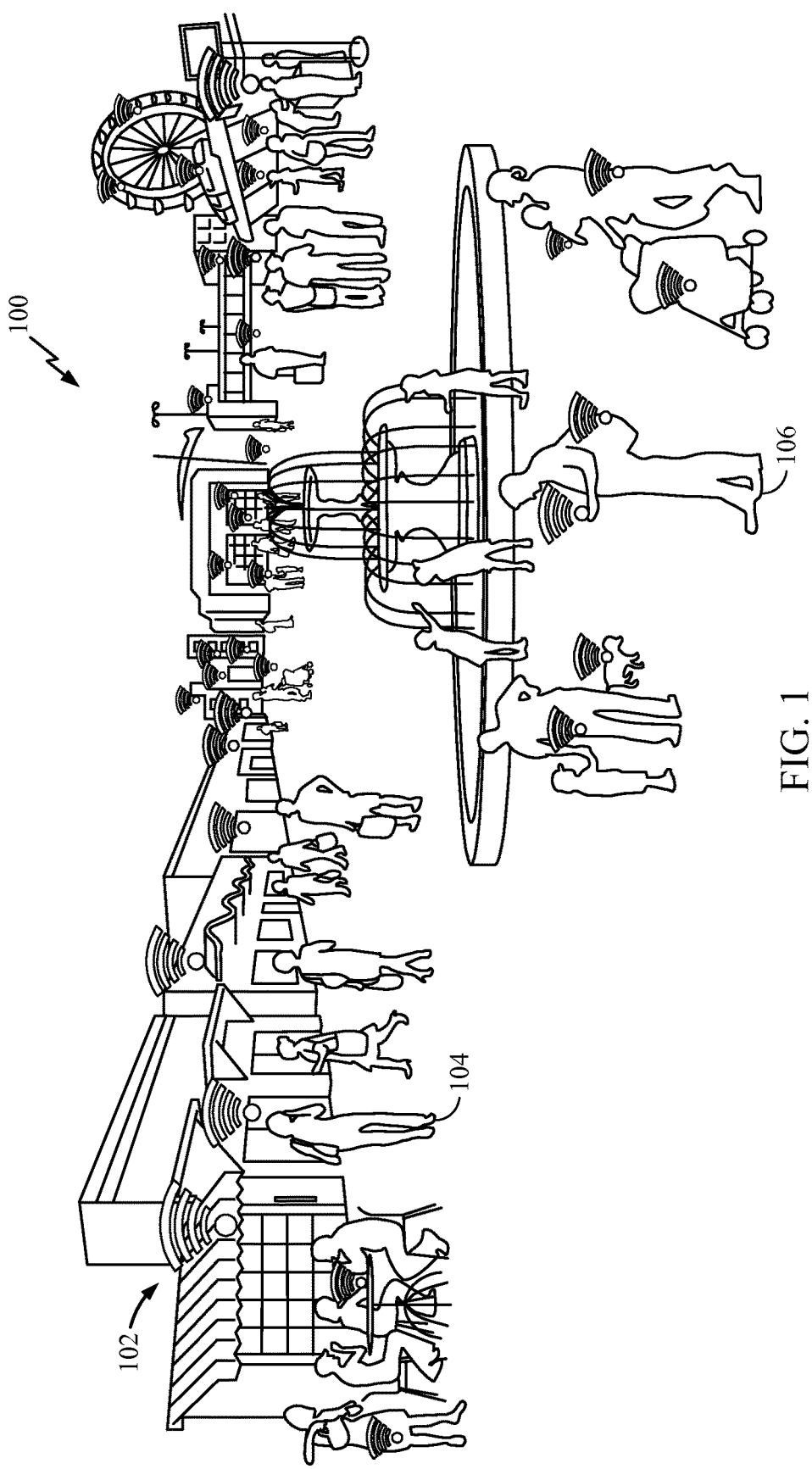
FIGS. 1 and 1A illustrate an example environment in which aspects of the present disclosure may be practiced.

Aspects of the present disclosure provide techniques that may be used to enable secure relaying of discovery information between devices (e.g. peer-to-peer, mesh, D2D, WAN, LAN type networks). The present disclosure provides for a full range of processing of expressions carrying discovery information, from initial registration of expressions by entities, to a physical (PHY) and media access control (MAC) layer signaling protocol to allow devices to participate in discovery, communications, and relaying, not only of goods and services offered, but goods and services desired by users. As used herein, the term "expression" generally refers to a transmission sent from a device that includes information allowing discovery of that device and/or goods or services provided by that device As will be described herein, relaying of discovery information, for example in peer-to-peer fashion (or other network arrangement) may effectively extend the wireless coverage area of vendors. This can enable more potential customers to learn of goods and services offered by those vendors. Components of networks can either be static or dynamic for provision of relayed information. This can also enable users to passively receive information to learn about information of interest.

As such, peer-to-peer relaying of discovery information may be considered a form of referral. In some cases, a structure may be in place to provide economic incentive structure for devices (or users thereof) to perform a referral. For example, a user may be granted a credit if a referral results in an actual transaction at a vendor. Such credit may be monetary or token/credits to be redeemed for goods and services at the vendor (and/or other vendors).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Environment

Aspects of the present disclosure provide device to device (D2D) mechanisms that may be utilized, in wireless environments with a high density of wireless devices, to help match vendors of goods and services to potential customers. For example, aspects of the present disclosure provide a physical (PHY) and media access control (MAC) layer signaling protocol to facilitate discovery, communications, and relaying, not only of goods and services offered, but goods and services desired by users.

As will be described in greater detail, device manufacturers may make such a protocol available to application designers via an application programming interface (API) that allows access to the discovery mechanism and information. Such an API may facilitate customization and creation of applications (apps) that make use of the available D2D services enabled by this system. Such apps may be vendor specific or general purpose (e.g., for presentation, profile manipulation, alert customization, and the like). In other words, the API described herein may provide discovered information to apps, which allows a user to personalize what expressions they wish to be alerted about, and also control what information is advertised (for others to discover).

FIG. 1 illustrates an example environment 100, in which vendors 102 may benefit by peer-to-peer relaying of discovery information by a user 104 to expand their effective coverage area, using aspects of the present disclosure. As an example, a user 104 within the actual coverage area of a vendor 102 may discover information regarding goods (and/) or services provided by vendor 102.

The user 104 may then move, within a discoverable range of a user 106 who is outside the actual coverage area of vendor 102. The user 104 may then relay the information regarding goods or services provided by vendor 102 with user 106, in effect, referring user 106 to vendor 102 for those goods or services.

As will be described in greater detail below, in some cases, user 104 may receive some form of compensation if the referral results in a transaction. For example, user 104 may receive credits or actual/virtual currency redeemable at vendor 102 (and/or some other vendor) for goods or services. The transaction may be executed at vendor 102 or, in some cases, at device 104 (e.g., via transfer of a credit, voucher, digital media or digital rights).

User 104 may use any suitable mechanism (or mechanisms) to discover information from vendor 102 and to share the discovered information with user 106. One example of such a mechanism is referred to as long term evolution (LTE) Direct (LTE-D) discovery. LTE-D enables a device to autonomously discover devices and their services in the proximity of the device. LTE-D uses LTE spectrum and infrastructure, which may allow mobile operators to offer a range of differentiated applications and services to users. LTE-D is just one example of a type of mechanism that may be used for performing discovery as described herein.

Figure 1A:
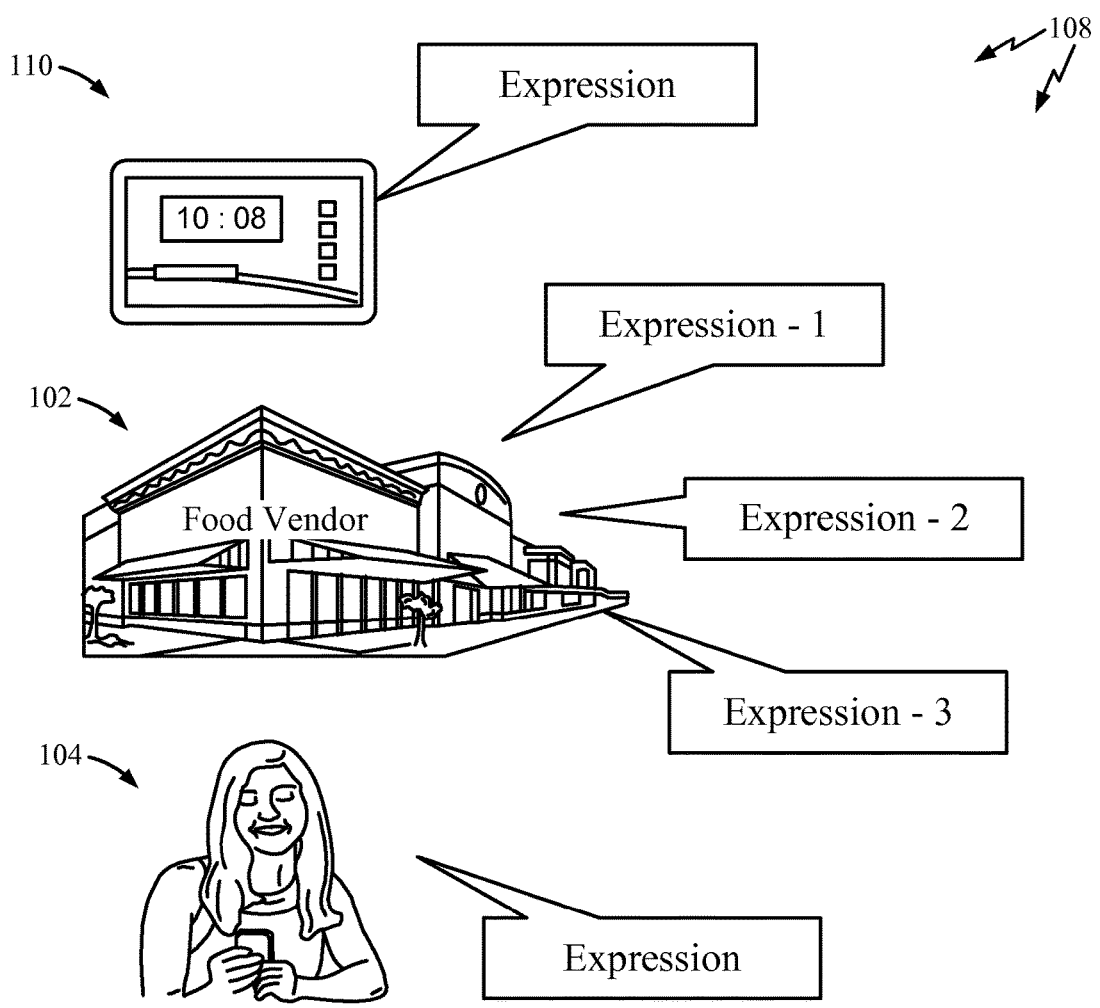

As illustrated in FIG. 1A, discovery of goods and services (e.g., LTE-D discovery) may involve detecting "expressions" transmitted by various devices, such as an access point/base station of a vendor 102 or mobile device 110 of a user 104, who is a potential customer of vendor 102.

As note above, the term "expression" generally refers to a transmission sent from a device that includes information allowing discovery of that device and/or goods or services provided by that device. In addition, an expression may broadcast a set of one or more goods and/or services of interest (e.g., needed or desired) by a user. Thus, aspects of the present disclosure may help match users looking for certain goods or services to corresponding vendors.

In other words, an expression may be used to convey any suitable type of information, such as advertising goods/services for sale, knowledge of another user's goods/services for sale, or a user's own personal interest in goods/services using expressions.

In some cases, an expression may include a service identifier (e.g., 64 or 128 bit) for each service or good offered by a vendor (or device or user). As will be described below, in some cases a relay device may make decisions regarding whether or not to relay an original expression based on a match between a good or service indicated by the original expression and a good or service indicated by an expression transmitted by a potential recipient of the relayed expression. This may be referred to herein as targeted relaying, an attempt to relay information that is of particular interest to a recipient.

Example Expression Registration

Figure 2A:
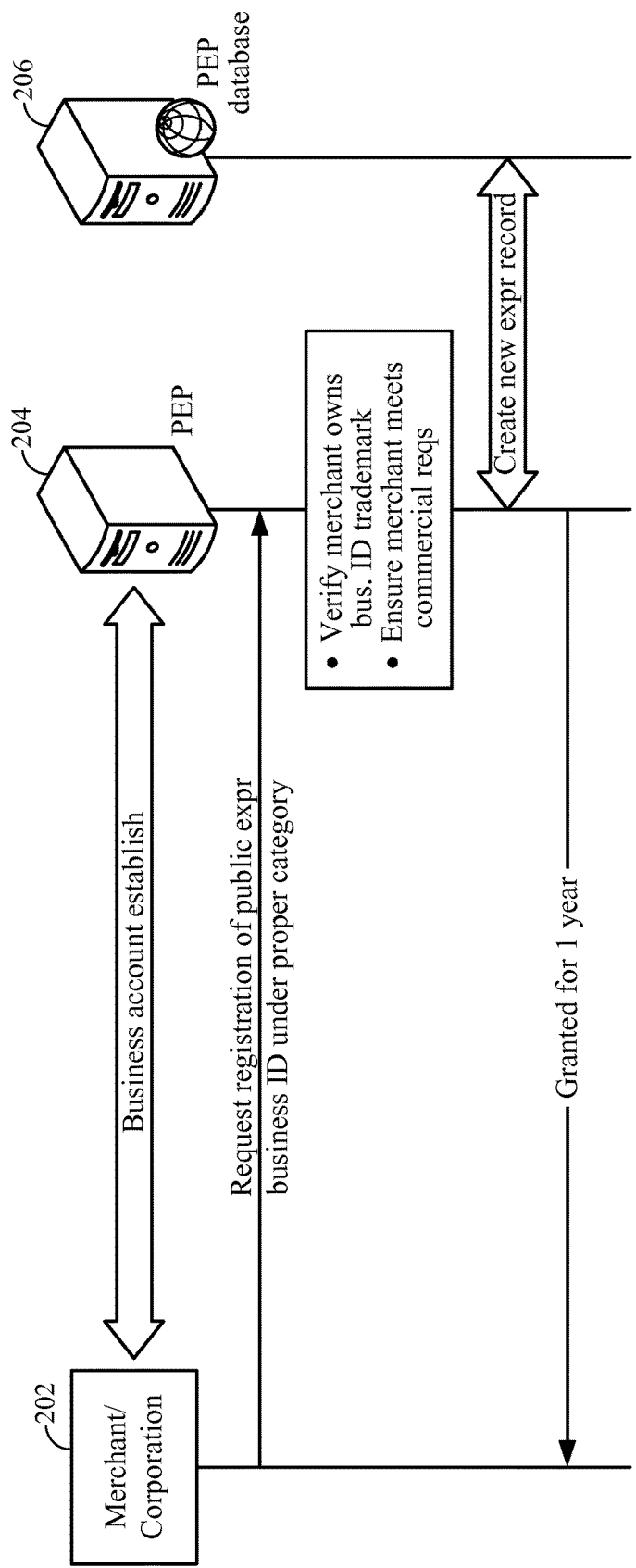
FIGS. 2A-2C illustrate examples of expression assignment and management, in accordance with aspects of the present disclosure.

In some cases, to help ensure expressions are unique (e.g., with unique service identifiers), expressions may be registered. FIG. 2A illustrates an example of how expressions may be registered. As illustrated, a vendor 202 (e.g., a merchant/corporation "registrant") may establish an account via a server 204, referred to herein as a public expression provider (PEP).

The registration may be for a particular business ID or an application ID and may be made under a particular commercial category (e.g., lodging, entertainment, food, etc.).

The PEP may perform various actions, such as verifying the merchant owns the corresponding business ID and ensuring the merchant meets certain commercial requirements. This step may be followed by a procedure to assign an expression prefix (Expression Name/Code) to a particular device (e.g., belonging to the merchant), which may involve utilization of a ProSe Application, for example, designed to ensure uniqueness for later validation and verification checks.

As illustrated, once registered, an entry may be created in a PEP database 206 that tracks registered expression IDs. In this manner, registering via the PEP may be similar, in some ways, to registering a domain name. In some cases, the registration may be for a fixed period of time (e.g., for a year) and subject to renewal.

Figure 2B:
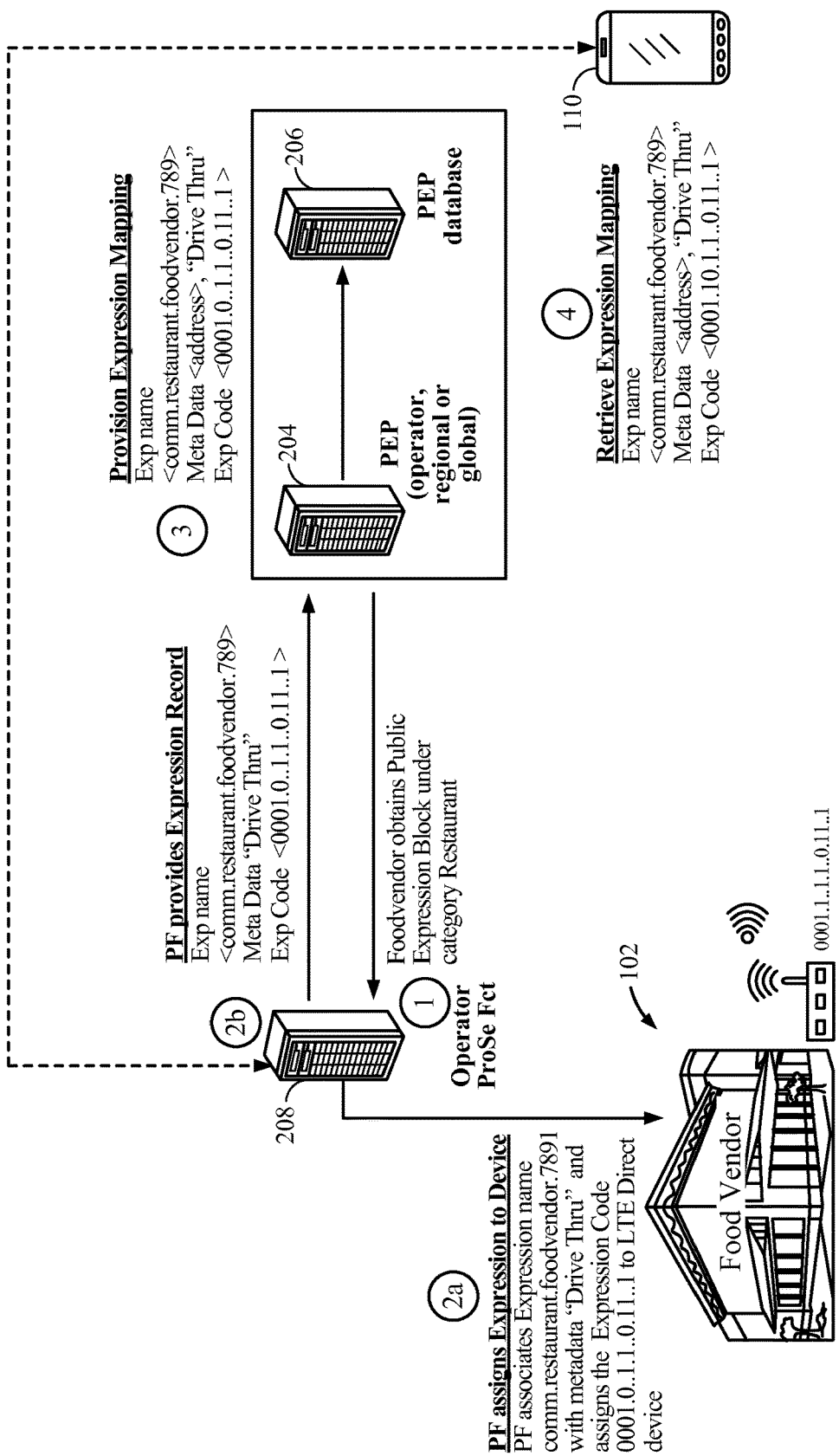

FIG. 2B illustrates how a registered expression may be used, in sequential operations, for an example vendor ("FoodVendor"). At (1), the vendor obtains a Public Expression Block under category Restaurant. At (2a), a ProSe Function (PF) associates an Expression name (comm.restaurant.foodvendor.7891), in this example, with metadata "Drive Thru" and assigns an Expression Code (0001.0..1.1..0.11..1) to a vendor device (e.g., an access point at the drive thru location). As illustrated, an Expression name may be a bitstring that describes the advertised goods or services at different levels (e.g., category, name, and metadata, such as location). In this manner, an expression may represent an identity, location, service, interest and allow for discovery by others in its proximity.

At (2b), the PF provides a record of the Expression to PEP server 204 and PEP database 206, while providing a mapping of the Expression name, Expression Code, and metadata, at (3). At (4), a mobile device 110 retrieves the expression mapping, which allows it to discover the corresponding services if it detects Expression Code broadcast by the vendor.

Figure 2C:
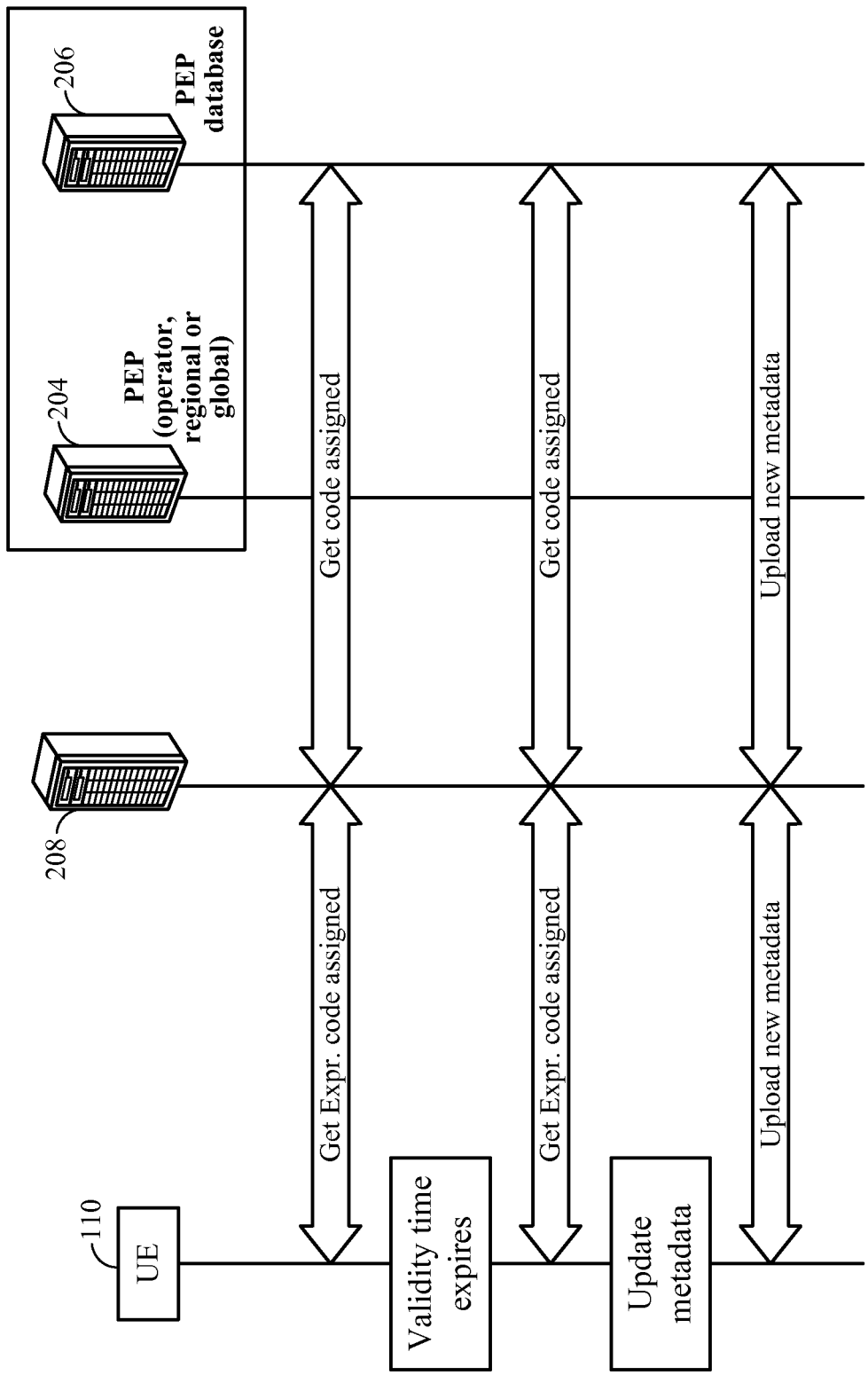

FIG. 2C illustrates an example of how expressions may be managed. As described above, a full or partial expression name (and code) may be assigned to a particular UE 110, for example, by an operator PF 208, using available expression namespace, which may have operator-scope, regional-scope, or global-scope, as defined by the PEP 202, with a record of the assignment stored in PEP database 206. As noted above, the assignment may be valid for a defined period of time.

After this validity time expires, the assignment may be renewed. In this case, the UE may receive a new code for the same expression (as it continues to be the owner), and the PEP database 206 may be updated accordingly. In addition, the PEP database 206 may be updated if there are any changes to the metadata associated with the assigned expression (e.g., category, name, or location).

In some cases, metadata associated with an expression may include whether the assignee of the expression has granted permission to relay the expression. For example, the metadata may include an element <relayable> that might be set to "false" by default, but the owner can set to "true" to allow the expression (or at least certain indicated field) to be relayed. A UE detecting this expression may then look up the metadata to see whether it can be relayed or not.

In some cases, granting permission to relay may involve application-layer signaling between a UE interested in relaying and the owner of the expression. In some cases, when a UE detects this expression, it may set up a connection (e.g., a WAN or direct connection) with the announcer via an app, which may be indicated in metadata. In this manner, the announcer may be able to know the identity of the UE wishing to relay (and can decide whether or not to grant permission).

Example Expression Discovery

As described above, an expression may be used to facilitate discovery of any suitable type of information, such as advertising goods/services for sale, knowledge of another user's goods/services for sale, or a user's own personal interest in goods/services. Any suitable wireless communications technology may be used for expression-based discovery, which may leverage existing infrastructure.

Figure 3:
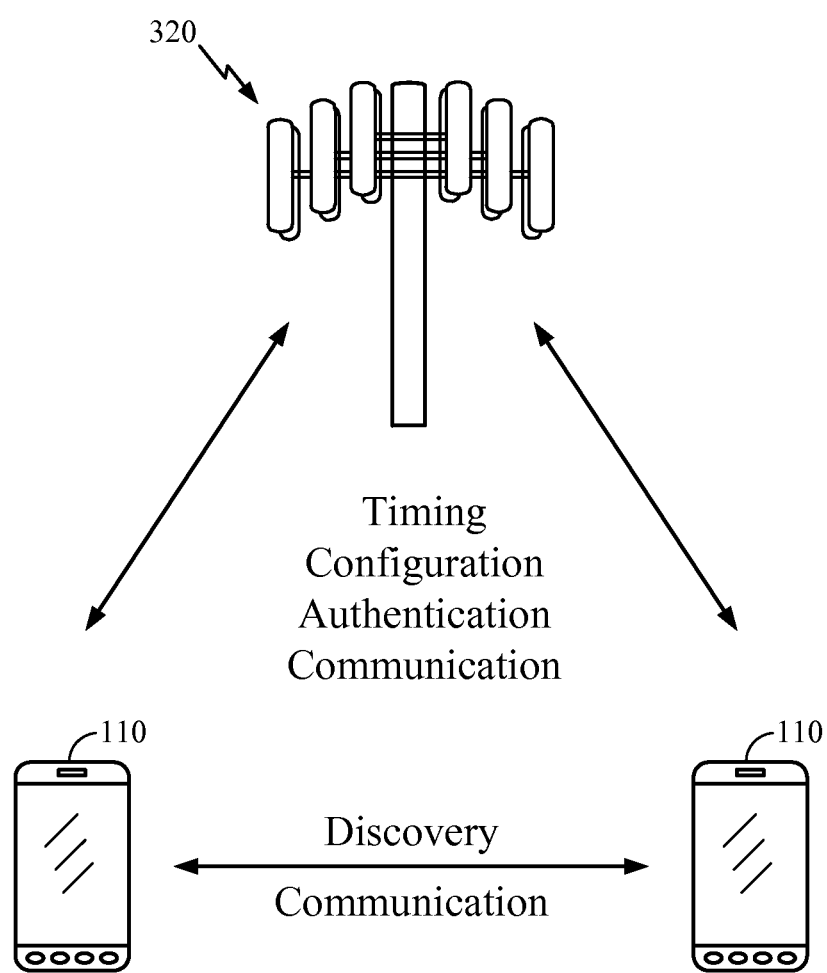
FIG. 3 illustrates an example peer-to-peer communication mechanism, which may be utilized in accordance with aspects of the present disclosure.

For example, as illustrated in FIG. 3, UEs 110 may be able to perform LTE-D based discovery, taking advantage of existing LTE structure. This may result in efficient discovery and ensuing data connectivity (between devices) may be either through a LTE network (e.g., between UEs 110 and a base station 320) or directly through LTE Direct. This approach may leverage the existing LTE network infrastructure, for example, for timing, resource allocation (to LTE Direct), as well as user authentication.

Figure 4:
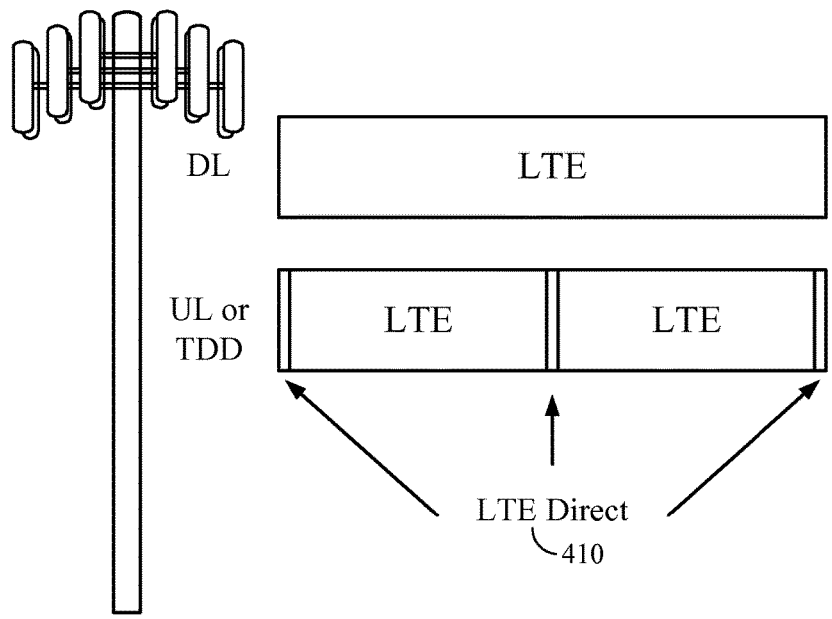
FIG. 4 illustrates example resources that may be allocated for peer-to-peer discovery, in accordance with aspects of the present disclosure.
Figure 5:
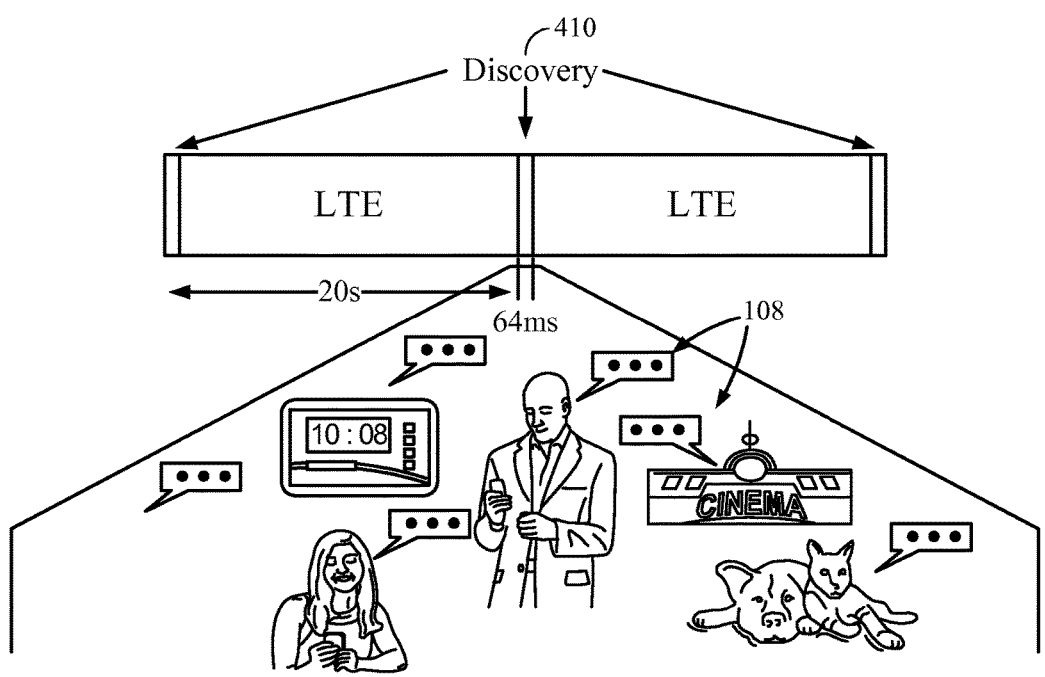
FIG. 5 illustrates how resources shown in FIG. 4 may be used for discovery of different devices, in accordance with aspects of the present disclosure.

As illustrated in FIGS. 4 and 5, portions 410 of uplink (UL) LTE resources may be allocated for LTE-D communications (e.g., discovery via expressions 108). This portion may be a portion of UL bandwidth in an LTE FDD system or dedicated frames in a LTE TDD system. The amount of resources allocated for LTE-D may be relatively small, resulting in little impact on conventional LTE operation.

Figure 6:
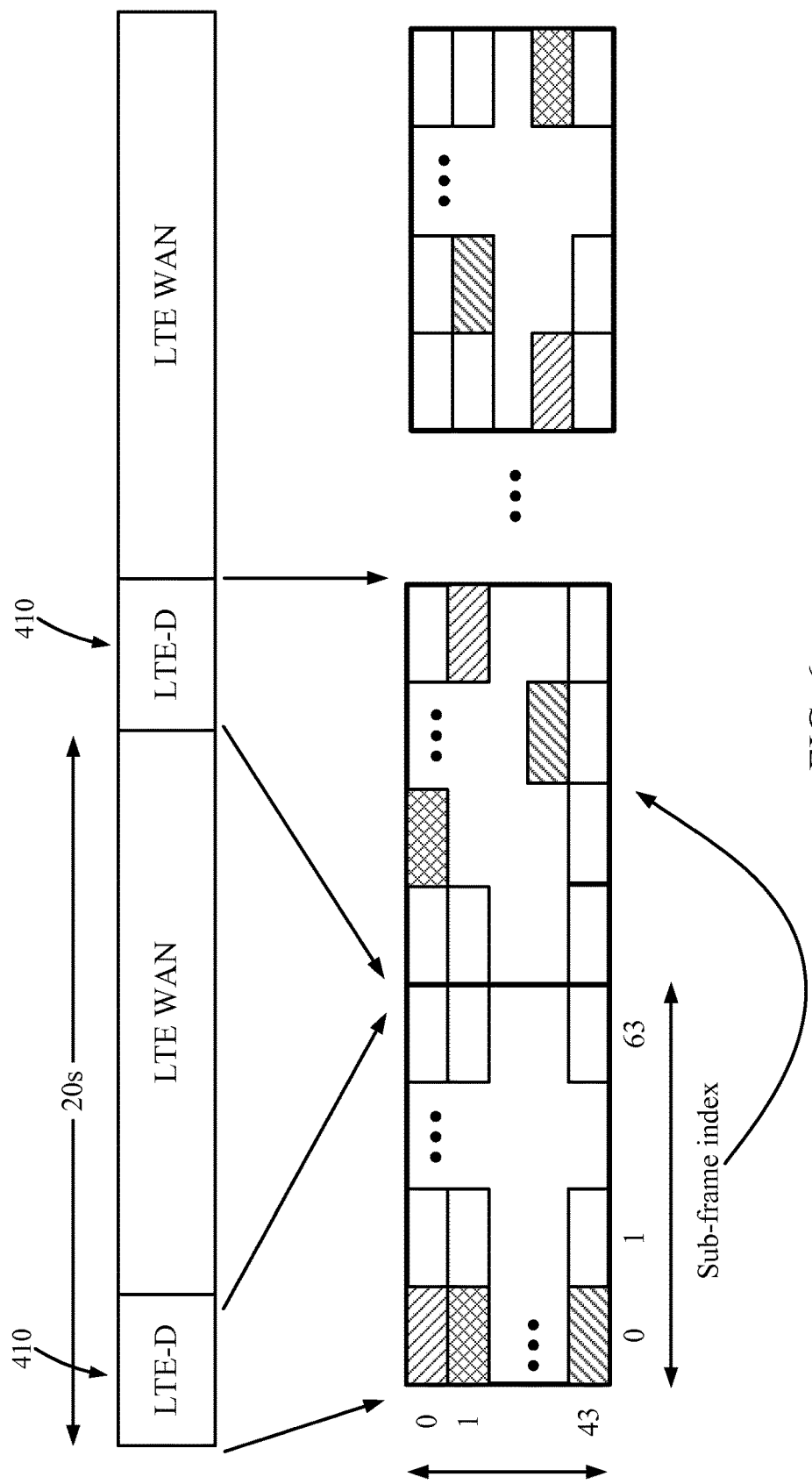
FIG. 6 illustrates how resources shown in FIG. 5 may be partitioned among different devices, in accordance with aspects of the present disclosure.

For example, as illustrated in FIG. 6, 64 subframes (64 ms assuming 1 ms subframes) periods may be allocated for LTE-D, while 20 s periods (2000 subframes) may be reserved for conventional LTE communications. FIG. 7 provides greater detail about how resource blocks within the 64 subframes may be allocated to support discovery transmissions by several different users.

LTE-D based discovery is just one example of a suitable mechanism for discovery and other mechanisms may also be used. For example, according to certain aspects, discovery may be performed on a wireless local area network (WLAN). In some cases, discovery may be performed on a common (unlicensed) channel, rather than a licensed channel. In such a case, a wide area network (e.g., 3G, UMTS, or 4G) may be used to provide common timing to synchronize discovery on the unlicensed channel.

Example Discovery Frame Formats

Figure 7A:
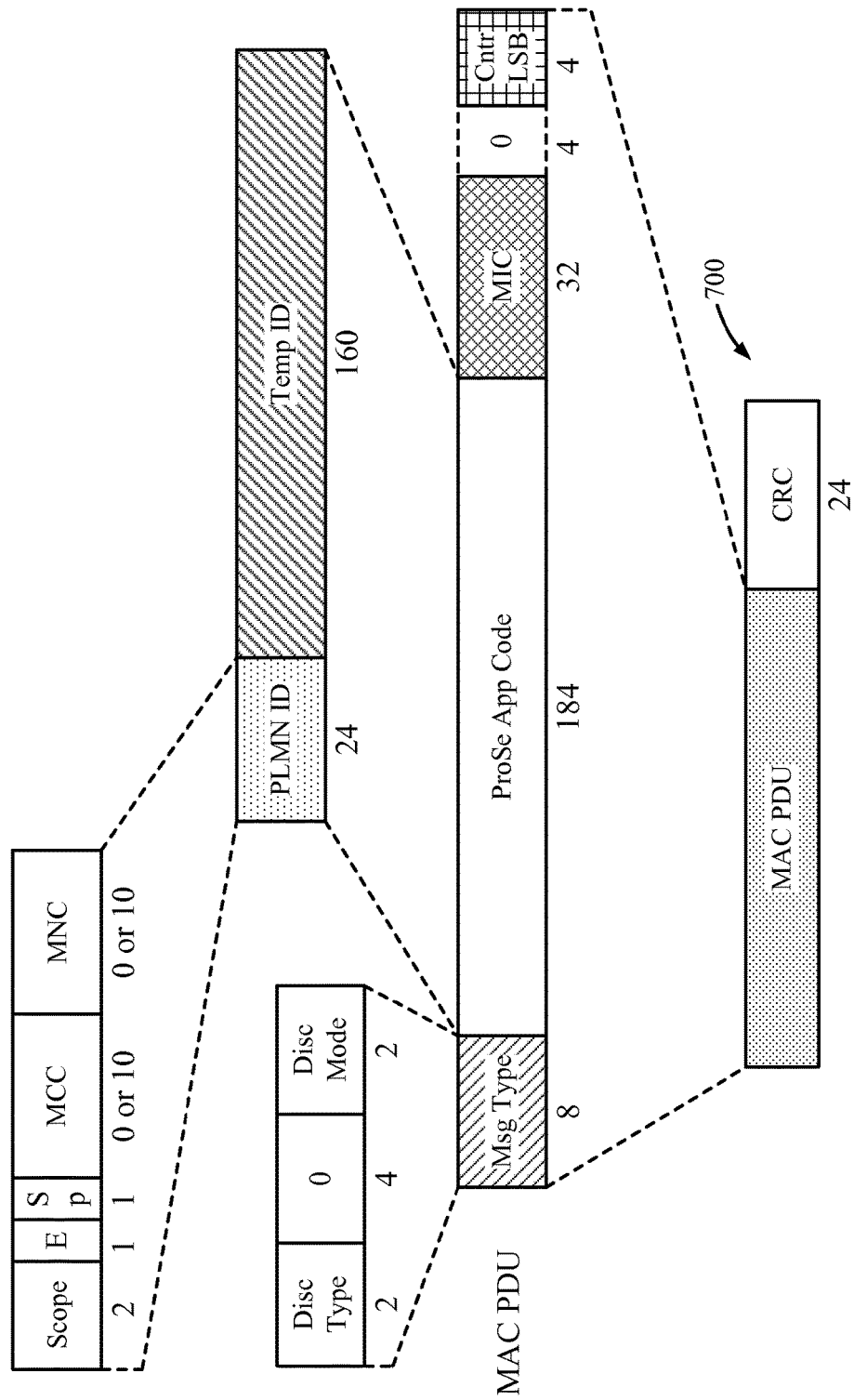
FIG. 7A-7C illustrate example discovery frame formats and devices capable of communicating using such formats, in accordance with aspects of the present disclosure.
Figure 7B:
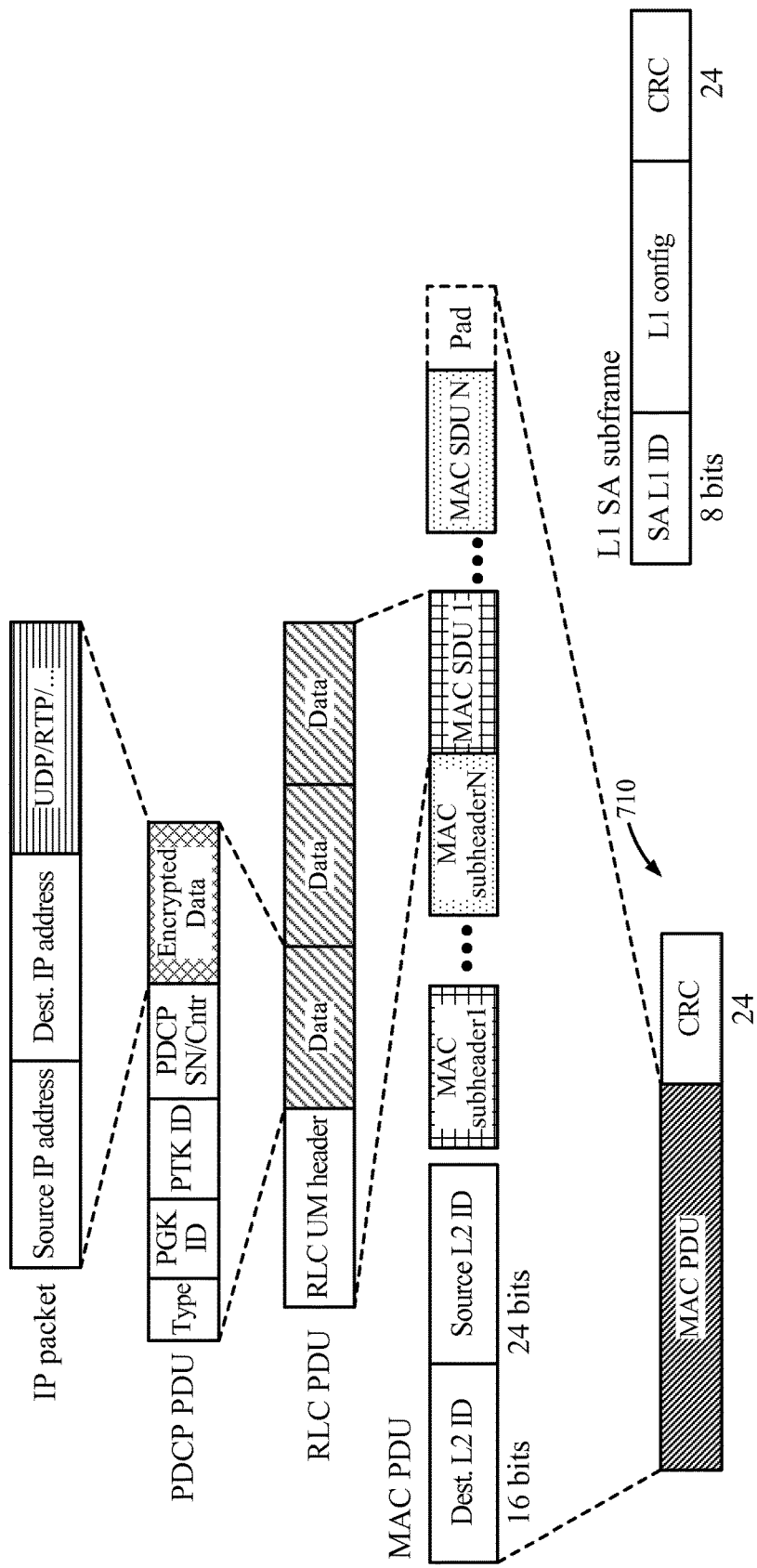
Figure 7C:
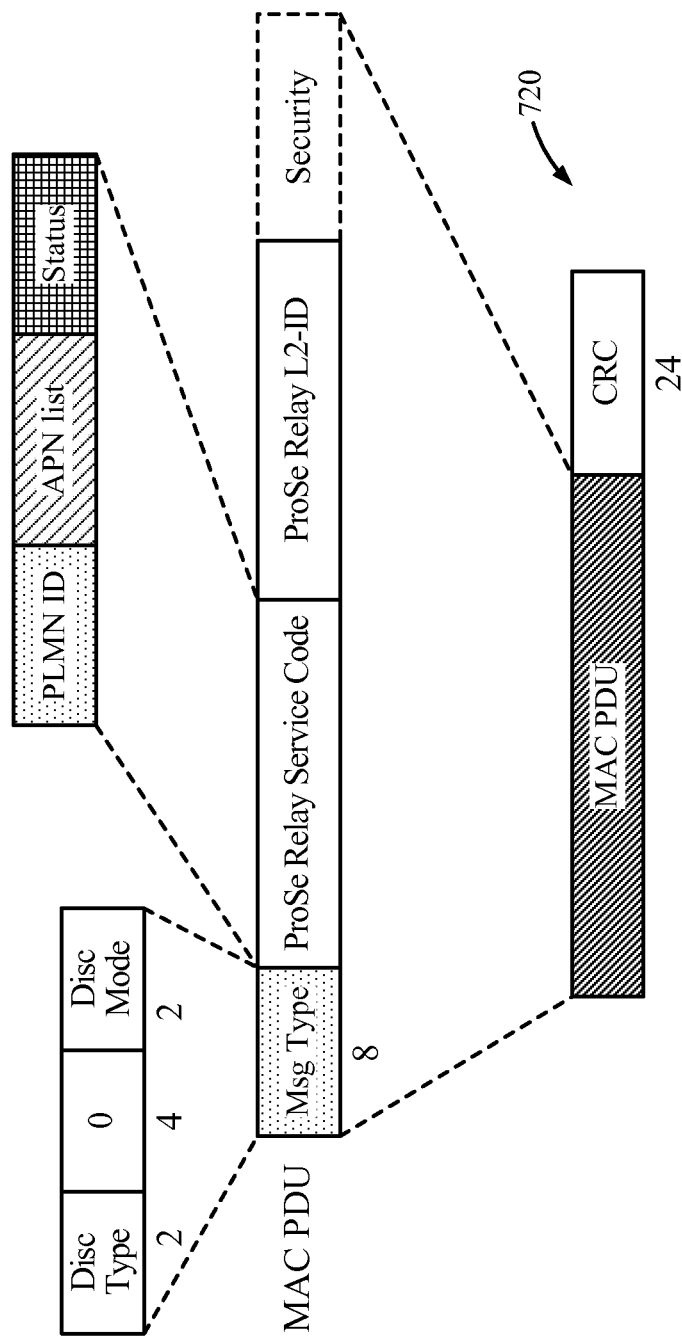

In general, expressions may be transmitted as discovery frames of any suitable format. UEs participating in discovery may have suitable PHY and MAC layers configured to generate and process discovery frames (e.g., of a suitable MAC packet format). FIGS. 7A-7C illustrate example discovery frame formats, which may include formats suitable for multicast and unicast, as well as relay frame formats that accommodate credit assignment capability (single hop, multi-hop). The frame formats illustrated in FIGS. 7A-7C may be used, for example, in the various discovery and relaying examples provided herein. Byte lengths shown under certain fields are exemplary only and actual byte lengths of different fields may vary.

FIG. 7A illustrates a first example discovery frame format 700 of a MAC packet. As illustrated, the packet may have a MAC protocol data unit (PDU) protected by a cyclic redundancy check (CRC). The MAC PDU components may include various fields, such as fields for a Msg Type, ProSe App Code, MIC, and time calibration information (e.g., LSBs of a counter). As illustrated, the MsgType field may include Discovery Type and Discovery Mode subfields, for example, which may be used to specify whether discovery is open or restricted. Open discovery may intrinsically require no permission control on who can monitor for the announced public expressions, while restricted discovery may require application/user-level permission.

The ProSe App Code field may include a public land mobile network (PLMN) ID field, with a mobile country code or mobile network (MCC/MNC) subfield, a Scope subfield that indicates if the Temporary ID is PLMN, country-wide, or global (e.g., and a field "E" that indicates whether the MCC and MNC are included), and the Temporary ID. The Temporary ID may indicate various application-layer information useful in processing the packet.

The MIC and time calibration fields may be used for verification by ProSe function during Match Reports. As will be described in greater detail below, a monitoring UE may need to figure a right time value that was used to compute the MIC and pass that along to ProSe Function. In this regard, the time calibration information may help, as these may be least significant bits (LSBs) of the UTC-based counter used in the MIC computation. According to other aspects, instead of a time-calibration parameter, a counter, sequence number, or random number ("nonce") may be used instead to impart freshness to the compute MIC value.

FIG. 7B illustrates an example frame format 710 for a multicast (1-to-many) transmission. In this example, the MAC PDU has destination and source ID fields and a plurality of MAC service data units (SDUs), each with a MAC subheader. Each SDU may carry a radio link control (RLC) PDU with one or more PDCP PDUs having an IP packet as an encrypted data payload. As illustrated, the IP packet may, in turn, have a Source IP address, Destination Address, and UDP/RTP data. An L1 Source Address subframe may have an SA L1 ID field and L1 configuration information. The L1 configuration information, for example, may include information such as a modulation and coding scheme (MCS), timing advance (TA), and time and frequency location of data.

FIG. 7C illustrates a first example relay discovery frame format 720 for a relayed packet (e.g., a discovery frame detected-and relayed by a relay device). As illustrated, the packet may have a MAC PDU protected by a CRC. The MAC PDU components may include various fields, such as fields for a Msg Type, ProSe Relay Service Code, a ProSe Relay L2 ID field, and possibly a security field. As with the format 700 of FIG. 7A, the MsgType field may include Discovery Type and Discovery Mode subfields.

In this example, the ProSe Relay Service Code field may include a PLMN ID field, access point name (APN) list field, and Status flags. The APN list may include a list of APNs that this relay provides connectivity to. The Status (or maintenance) flags may be used to indicate various conditions, such as whether the relay is temporarily without connectivity or battery running low, so the Remote UEs can seek/reselect another Relay, and whether it supports signaling for establishing additional packet data network (PDN) connections. The ProSe Relay Layer-2 ID field may be used as a Layer-2 ID for ProSe communication. The security field may include, for example, a MIC field and possible other fields, such as time calibration information. Such a field may not be useful for Public Safety out of coverage, but may be useful for various commercial use cases.

Figure 7D:
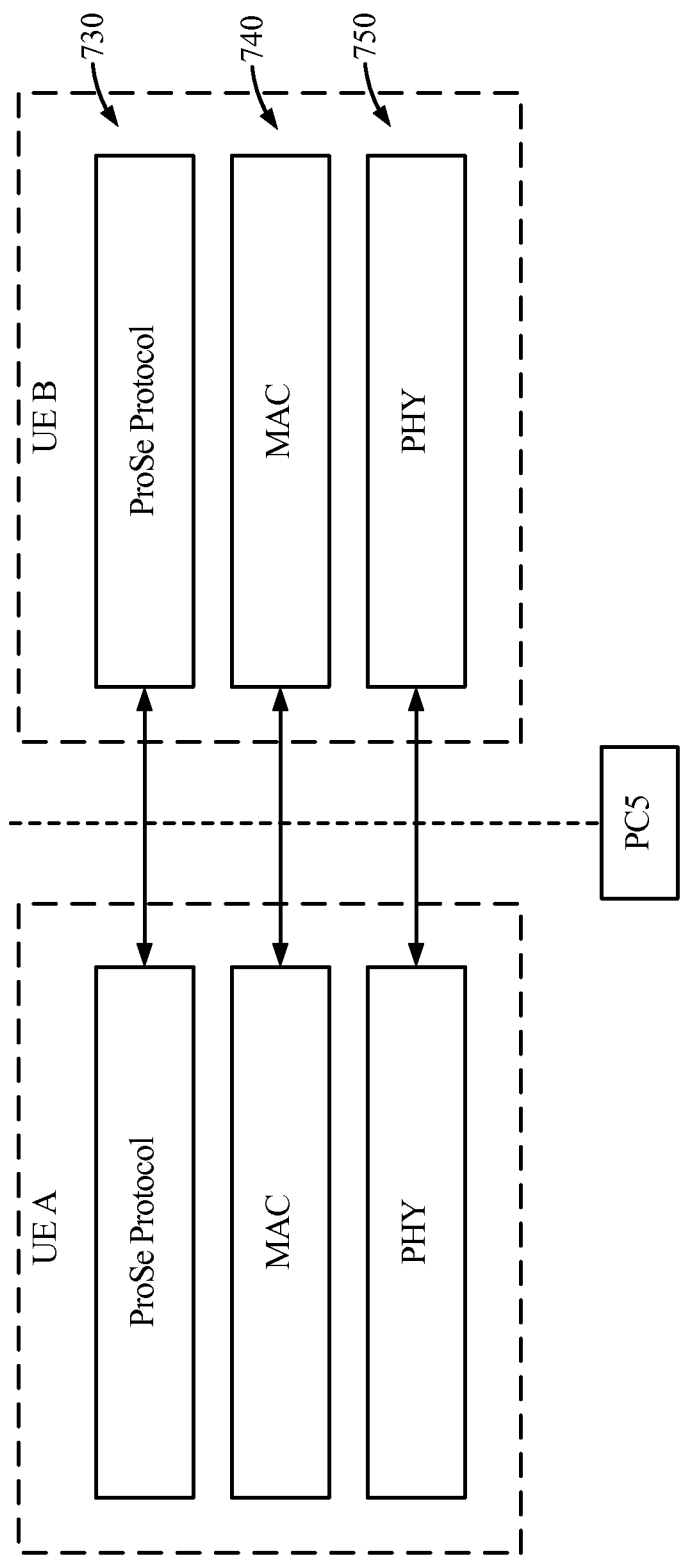
FIG. 7D illustrates an example architecture for processing and relaying discovery information, in accordance with aspects of the present disclosure.

FIG. 7D illustrates example UEs (UE A and UE B) capable of communicating via the frame formats illustrated in FIGS. 7A-7C. As illustrated, each UE may have components to communicate at the PHY layer 750, MAC layer 740, and ProSe Protocol layer 730. For example, with the PHY layer passing the MAC PDUs up to the MAC layer. In turn, the MAC layer may extract the ProSe Protocol information and pass it on the ProSe layer for processing.

PHY layer processing may include for ProSe Direct Discovery and ProSe Direct Communication between UEs may involve physical channel structures (referred to herein as "sidelink" channels), similar to those used for uplink transmissions, but with certain changes. For example, such sidelink transmissions may be limited to single cluster transmissions for all the physical channels. Further, such sidelink transmissions may use a single (1) symbol gap at the end of each sub-frame. The physical layer processing of transport channels may also differ from UL transmission in various steps. For example, scrambling for a physical sidelink data channel (PSDCH) and physical sidelink control channel (PSCCH), may not be UE-specific.

Further, modulation of 64 QAM may not be supported and control channels for such transmissions may be mapped to a particular set of control resources. Further, modulation for data and control channels for such transmissions may utilize reference signals similar to uplink demodulation reference signals (e.g., transmitted in the 4-th symbol of the slot in normal CP and in the 3rd symbol of the slot in extended cyclic prefix). These demodulation reference signals sequence lengths may equal the size (number of sub-carriers) of the assigned resource and may be created based on a fixed base sequence, cyclic shift and orthogonal cover code. For in-coverage operation, the power spectral density of such transmissions may be influenced by the eNB.

MAC layer processing may include processing of a discovery channel. Content of discovery information may be transparent to Access Stratum (AS) and there may be no distinction made in AS for ProSe Direct Discovery models and types of ProSe Direct Discovery. The UE may participate in announcing and monitoring of discovery information in both idle and connected states, as per eNB configuration. The UE may announce and monitor its discovery information subject to the half-duplex constraint (e.g., using resource allocation as shown in FIGS. 4-6).

A UE that participates in announcing and monitoring may maintain the current UTC (coordinated universal) time. The UE that participates in announcing transmits a discovery message (e.g., according to one of the formats described above), which is generated by the ProSe protocol taking into account the UTC time upon transmission of the discovery message. In a monitoring UE, the ProSe protocol provides the message to be verified together with the UTC time upon reception of the message to the ProSe function.

Radio Protocol Stack (AS) processing for ProSe Direct Discovery may involve only MAC and PHY layers. The AS layer may perform various functions. The AS layer may interfaces with upper layer (ProSe Protocol). For example, the MAC layer may receive the discovery information from the upper layer (ProSe Protocol). The IP layer may not used for transmitting the discovery information. For scheduling, the MAC layer may determine the radio resource (e.g., per FIG. 6) to be used for announcing the discovery information received from upper layer. For discovery PDU generation, the MAC layer may build the MAC PDU carrying the discovery information and sends the MAC PDU to the physical layer for transmission using the determined radio resource (e.g., with no MAC header added).

While the frame format 700 shown in FIG. 7A may be used in LTE D2D discovery, various other frame formats may be used to participate in discovery (and relaying of discovery information) using different radio access technologies (RATs).

Figure 7E:
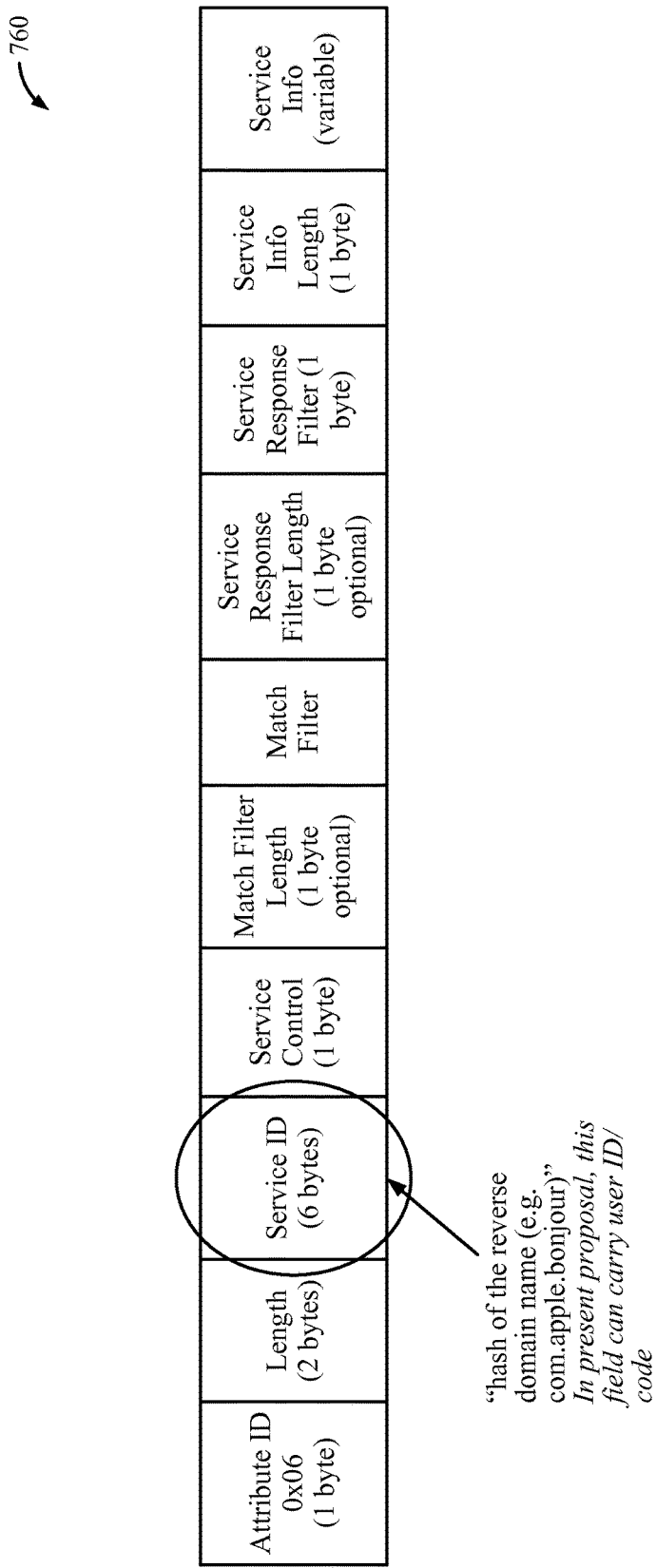
FIGS. 7E-7F illustrate example discovery frame formats and devices capable of communicating using such formats, in accordance with aspects of the present disclosure.

For example, FIG. 7E illustrates an example discovery frame format 760 that may be used for communicating via a local area network (e.g., Wi-Fi), such as a neighbor aware network (NAN). As illustrated, the frame may have an Attribute ID, Length field, Service ID, and Service Control Fields. In some cases, the Service ID may carry discovery information. For example, the Service ID may be generated as a hash of a corresponding domain name and, in some cases, may carry a user ID or code. As illustrated, the frame may also include other fields, such as a Match Filter Length, Match Filter, Service Response Filter Length, Service Response Filter, Service Info Length, and Service Info fields. The Service Info field may be of variable length and may carry various types of service discovery information.

Figure 7F:
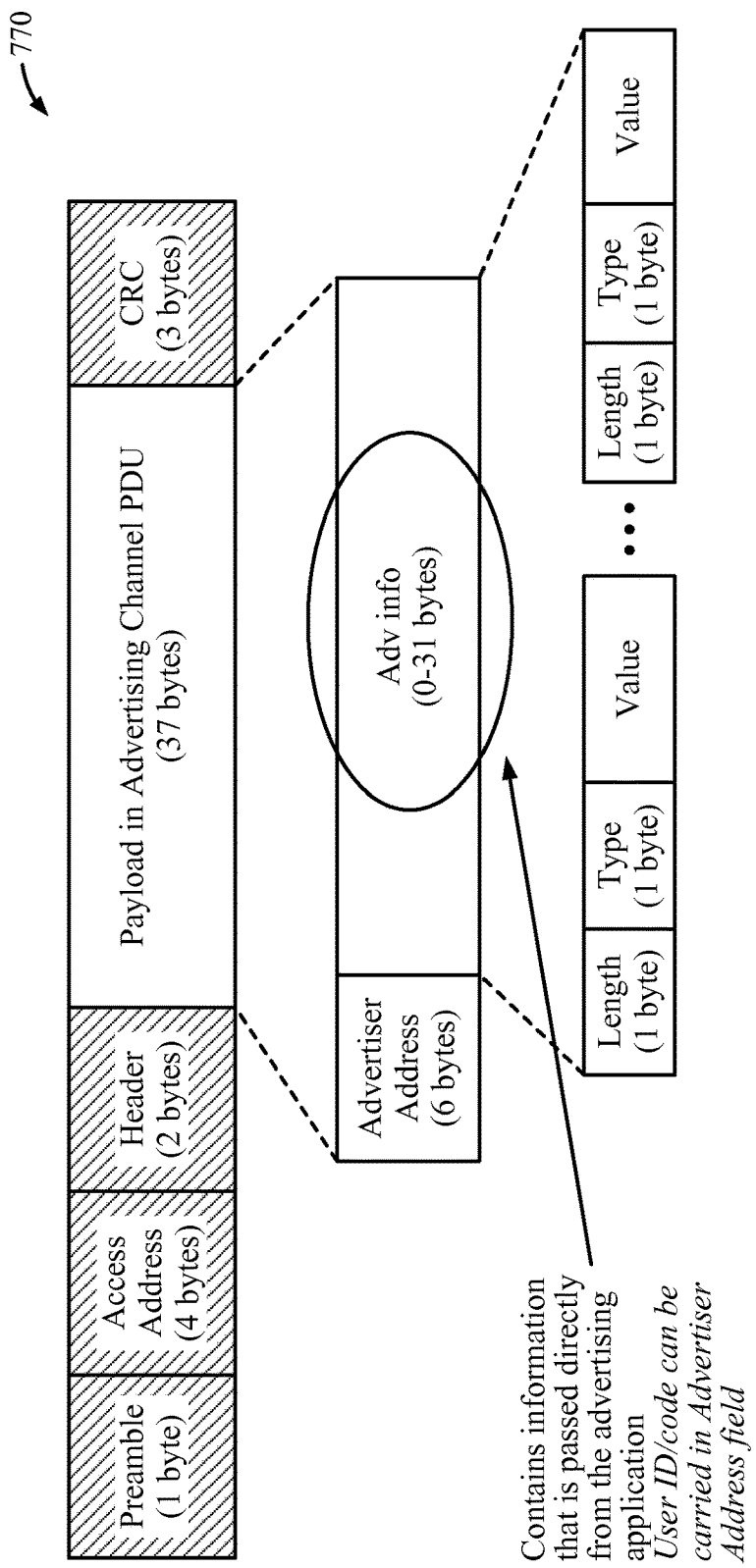

FIG. 7F illustrates an example discovery frame format 770 that may be used for communicating via a close proximity RAT, such as Blue Tooth Low-Energy (BTLE). As illustrated, the frame may have a preamble, access address, and header fields. Discovery information may be provided as payload (e.g., in an Advertising Channel PDU). As illustrated, the payload may include an advertiser address field (which may carry a User ID/code), as well as various advertising information that may include information that is passed directly from an advertising application. Different types of advertising information may be separated in data units, each having length, type, and value fields.

Example Peer-To-Peer Relaying of Discovery Information

Figure 8:
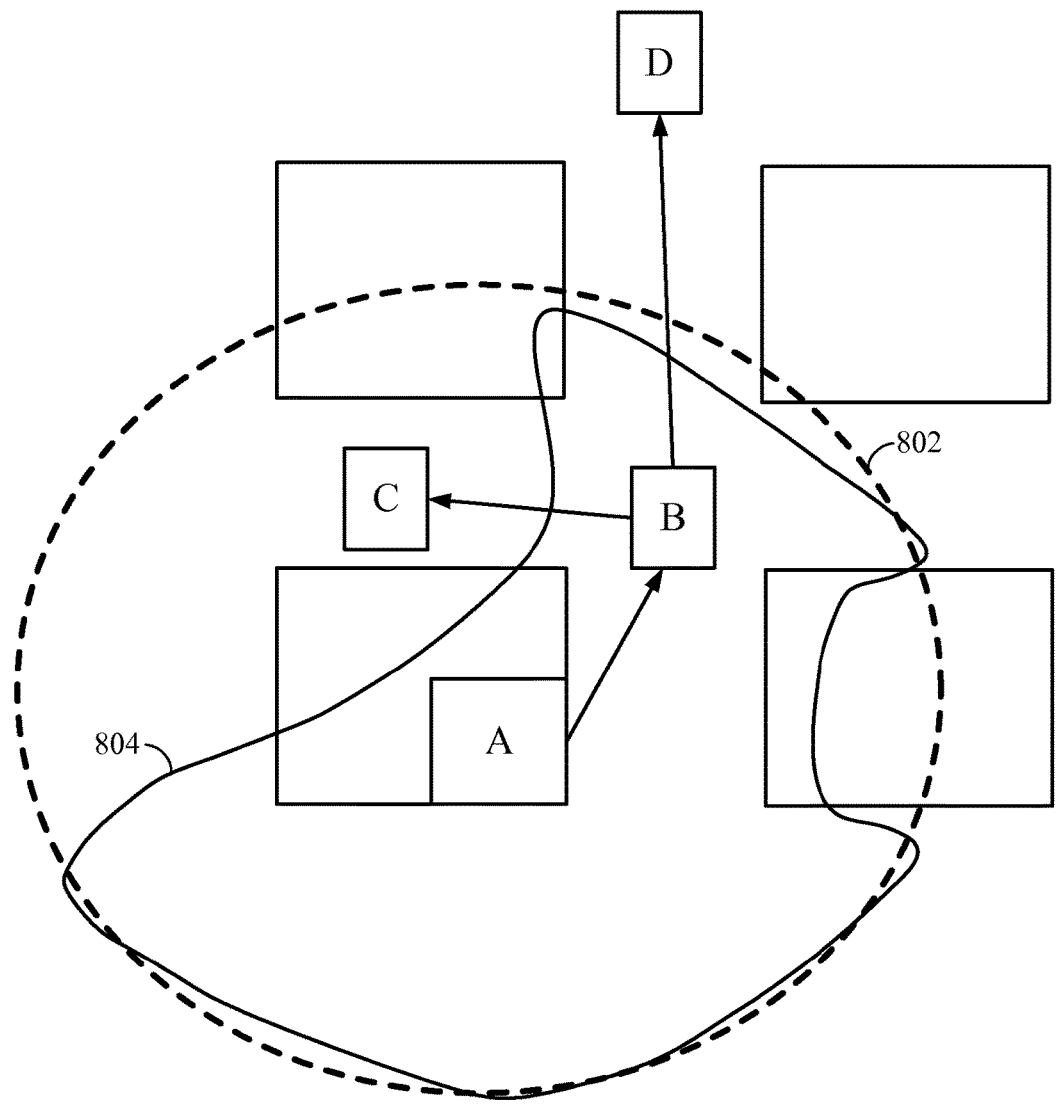
FIG. 8 illustrates an example environment in which discovery information may be relayed, in accordance with aspects of the present disclosure.

FIG. 8 illustrates an example environment in which discovery information may be relayed, in accordance with aspects of the present disclosure (e.g., using the discovery frame format, PHY and MAC processing described above), to effectively increase coverage area of a vendor (device) A. The device advertizing goods or services for A may be any type of device, such as a UE or a base station, such as a pico/micro/femto eNodeB, which may have a local coverage area (indicated by the dashed line 802). A typical LTE-D discovery range may vary from a few 10 s of meters to a few hundred meters (e.g., 500 m) in an ideal environment (e.g., absent obstructions).

Vendor A (hereinafter, simply A) may be interested in advertising its goods or services to potential customers B, C, and D (e.g., having corresponding UEs B, C, and D). A may be particularly interested be interested in targeting B and C, due to their proximity to A (which may translate into an increased probability of a resulting transaction than if D were targeted). While both B and C are in the (theoretical) coverage area of A, due to certain obstructions (e.g., due to buildings or other structures), the actual coverage area of A (indicated by the solid line 804) may be substantially reduced such that A may not be discoverable by C. As a result, A may not be able to reach C with advertised goods or services.

According to certain aspects, device B may act as a "discovery relay" to effectively extend the discovery area of A. By using discovery relays in this manner, it may be possible to provide a more uniform coverage area. That is, by using discovery relays it may be possible to extend the discovery range of an LTE-D device, such as device A, to more closely meet (or expand) a maximum discovery rage (e.g., 500 m) and "fill in" range gaps that exist due to certain obstructions in the LTE-D environment (e.g., obstructions caused by a building).

In the example illustrate in FIG. 8, UEs C and D may be outside the actual discovery range of device A. However, UE B may be able to act as a discovery relay to effectively extend the discovery area of UE A to reach UEs C and D. That is, UE B may be able to detect the presence of (and goods/services offered by) A and relay this information to C and/or D.

For example, during an LTE-D discovery period, UE B may detect a transmitted expression from A and relay that expression (or related information) to UEs C or D. In this manner, by relaying the expression, UE B may effectively refer UEs C or D to A for the advertised goods or services.

In some cases, when a device relays an expression, it may relay the expression as-received or alter the expression, for example, adding some other information (e.g., a bid, a hop-count, location information, information identifying the original transmitter, information identifying the relaying device, or a referral token allowing relaying to get credit if the referral results in a transaction).

In some cases, an expression may actually include an indication of whether the expression should be relayed (which may be considered an explicit request for the relay device to relay the original expression). Other mechanisms may also be used as "flood control" to prevent a flood of expressions from being relayed (possibly from multiple relaying devices). For example, as described above, expression metadata may include a field indicating permission to relay the expression.

According to certain aspects, relaying discovery information (e.g., as expressions), may be performed in various ways. For example, relaying expressions may be performed "passively" with relatively little discretion or processing, or "reactively" with "targeting" (e.g., by relaying expressions to target certain UEs or to relay only when certain conditions are met).

Figure 9A:
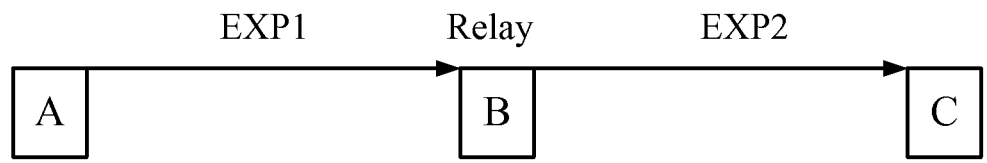
FIGS. 9A and 9B illustrate example mechanisms for relaying discovery information, in accordance with aspects of the present disclosure.

FIG. 9A illustrates an example of passive relaying, in which a discovery node may receive an expression from a device and relay the expression to a disparate device (e.g., that is outside the range of the device transmitting the original expression being relayed). In the illustrated example, device A may transmit expression EXP1, which is detected (discovered) by UE B. In turn, UE B may then transmit (i.e., relay) expression EXP2 to UE C. As noted above, EXP2 may be the same as or different from EXP1.

With reactive or targeting relaying, a discovery relay may relay expressions based on one or more criteria, rather than just blindly relaying all detected expressions—as may be done with passive relaying. In some cases, a discovery relay may relay expressions in response to a request from another device.

Figure 9B:
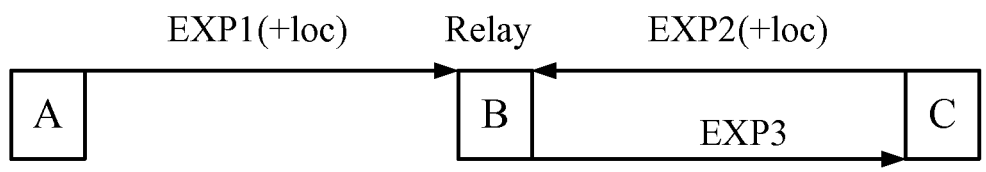

For example, referring to FIG. 9B, UE B may relay expression EXP1 from A to UE C in response to a request from UE C (shown as EXP2). As illustrated, EXP1 may be relayed as EXP3. In some cases, an expression from a device may only be considered a request to relay if certain criteria are met (e.g., matching interest with an advertised good or service).

In the example illustrated in FIG. 9B, location information is included in both EXP1 and EXP2. In some cases, this location information may be used to decide whether or not to relay the expression (e.g., based on a distance between C and A calculated based on the location information).

This distance criteria is just one example of how a discovery relay may relay an expression based on a decision made by/at the discovery relay. As another example, the discovery relay may be running a coffee application that causes the relay to decide when to relay expressions indicating the presence/location of a coffee shop (e.g., to other devices that may be interested in coffee). That is, if a discovery relay receives an expression related to coffee, the discovery relay may decide to relay the expression based on an application stored on the discovery relay that knows to relay expressions related to coffee.

While an interest in coffee serves as a good example due to the proliferation of coffee shops in many communities, a wide variety of other scenarios of targeted relaying (referral) may be envisioned. For example, expressions may be relayed based on musical interest, food interests, product interests, social interests, educational interests, sports interests, or any other type of interest.

In some cases, relayed expressions may assist in providing emergency services. For example, the propagation of emergency-related information via relayed expressions (a type of "reverse 911") may help first responders reach victims, which may help rescue efforts. Similarly, various types of information may be relayed to first responders to help coordinate rescue efforts.

Whatever the case, a relay node may discover interest (or potential interest) based on information in an expression transmitted by a potential target device. In some cases, the relay device may maintain a database of elements obtained from discovered expressions and relay one or more expressions, if there is a match with an element from an expression received from the potential target device. In this manner, a relay device may aggregate several expressions related to advertised goods and services. Similarly, the relay device may aggregate expressions from one or more potential target devices and relay expressions to one or more of those devices when a matching expression is discovered.

According to certain aspects, a discovery relay may decide (whether or not) to relay an expression it receives based on other factors (other than matching expressions), such as time of day. For example, a discovery relay that receives an expression related to a restaurant may decide to relay that expression only during hours when people are likely to be looking for somewhere to eat (e.g., lunchtime).

According to certain aspects, an expression may be relayed in a manner that allows for security or protection of the relayed transmission. This security may encompass, for example, integrity of the relayed information and the honoring of any other privacy protection of the original expression. According to certain aspects, a discovery relay may relay an expression only if there is a relationship between expressions (e.g., an element in EXP2 from a potential target matches an element in EXP1 from a vendor). In other cases, a relay may relay an expression even if there is no relation between the original and requesting expressions. In some cases, a device may relay an expression if there is a relationship between the relaying and requesting devices. In some cases, the device sending the original expression may explicitly request (or instruct) a relaying device to relay an expression (and may even identify the potential targets or the type/characteristics of potential targets).

Example Flood Control to Limit Relaying

As noted above, it may be desirable to limit when or how expressions are relayed by relaying devices. For example, as the number of UEs grows, it may be desirable to implement some sort of mechanism so a potential target is not flooded with the same expression relayed from many relay devices. This flooding of expressions may overwhelm a target device, lead to collisions, and/or needlessly waste system bandwidth resources. A flood control mechanism may also be used to help ensure that, in a referral-based system, users are given a fair chance to earn credits for referrals. In some cases, various contention-based channel access mechanisms may be used to limit what devices relay expressions (and when).

In addition to the conditional relaying mechanisms described above, various other mechanisms may be used. As an example, relaying by one or more devices may be enabled/disabled through network signaling.

In some cases, a target device may initially express interest in a good or service, but stop expressing interest if it has received a relayed expression relating to that interest. As a result, a relay device that detects the initial match (between interest and advertised good/service) may decide not to relay an expression, assuming the target device has already received a referral (from another device). In other words, it may be assumed the request for information (from this target) related to a good or service has been satisfied by another relay device. Thus, relaying of an expression may only be "enabled" when a target is actively advertising interest in a good or service related to (advertised in) that expression.

In accordance with certain aspects of the present disclosure, relaying of expressions may be limited, for example, to only a few or one per subframe. Assuming the allocation of LTE-D resources shown in FIG. 6, this may result in about 32 or 64 out of 1000-2000 received expressions (e.g., ProseAppIDs) transmitted/relayed in a given Window (of LTE-D and conventional LTE subframes).

In a network-controlled resource allocation model, the network may manage who relays expressions (e.g., ProseAppIDs), for example, based on certain network information. For example, a buffer status report (BSR) may include an indication that a LTE-D UE is going to relay an expression. An eNB may prohibit this LTE-D UE from transmitting the expression if other LTE-D UEs have already been allowed to relay the same expression.

In some cases, a similar type of monitoring may be performed by relay UEs, themselves. For example, relay UEs (discovery UEs) may monitor subframes/resource blocks to determine whether a certain expression has already been relayed and determine whether to relay the expression based on this determination. For example, according to certain aspects, UEs may monitor a random access channel (RACH) to determine whether an expression has already been sent. According to certain aspects, if a UE detects that a RACH is not available (e.g., another UE is currently using the RACH), the UE may assume that the expression has already been sent.

As noted above, relaying may be initiated by a target device. For example, a first device (e.g., an LTE-D UE) may monitor for certain expressions containing relevant information related to a good or service of interest. If the first device is not able to detect the expressions, the first device may transmit an expression with an indication requesting certain information be relayed (the "request" expression as described above which may be considered a "Discovery Request"). In this manner "On-Demand" discovery of expressions may be performed. If a second device that has "relaying" enabled (a relay device) receives an expression containing that information, the second device may transmit an expression with the requested information.

Example Economic Incentive for Referrals

According to certain aspects, a structure may be provided to provide economic incentive for devices to relay information related to a vendors goods or services. Such a structure may amount to a credit model, effectively compensating a relay device (with a credit/token or some type of monetary compensation for use at a vendor) if a referral results in a transaction (which may be considered a successful referral).

Figure 10:
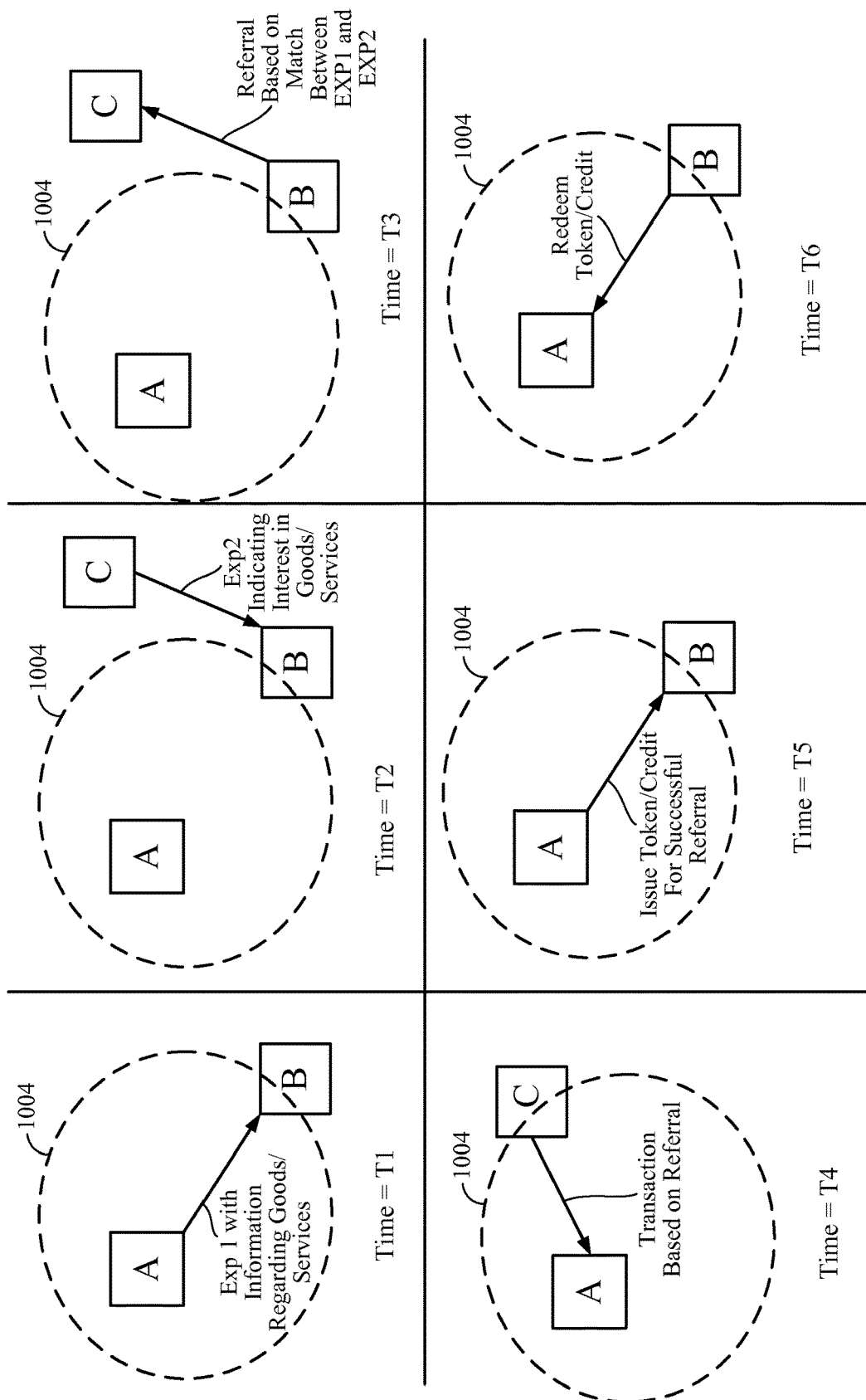
FIG. 10 illustrates an example sequence of relaying discovery information with compensation, in accordance with aspects of the present disclosure.

Such a credit model may be described with reference to in FIG. 10 which shows an example of a referral, by UE B, that results in a successful transaction between UE C and vendor A.

At T1, B (within the coverage area 1004 of A) may discover an expression (EXP1) from A with information related to a good or service. At T2, B (within the discovery range of C) discovers an expression EXP2 from C indicating interest in the goods or service provided by A. At T3, based on the match between information in EXP1 and EXP2, B sends a referral to C (letting C know that A provides the goods or services in which C is interested).

At T4, C (having moved into the coverage area 1004 of A) transacts with A for the goods or services, based on the referral. At T5, B receives a credit (in the form of a token) as compensation for the successful referral. At T6, B redeems the credit, for example, using the credit to obtain goods or services from A. In some cases, such credits may be used at vendors other than vendor A (in addition to, or as an alternative to vendor A).

Various mechanisms may be used to validate transactions (detect/avoid fraud), track referrals, and administer credits. Example mechanisms for authentication and fraud prevention may include various algorithms, for example, based on location, time of day, electronic serial number (ESN), an ESN hash based on vendor ID, or the like. In some cases, a discovery response may comprise information which is a function of the expression received from a vendor and a function of the discovery relay. According to certain aspects, an encryption model may be applied to the discovery response. According to further aspects, when a referred device completes a transaction at a vendor, the vendor may automatically detect that the transacting device was referred to the vendor by the discovery relay.

As noted above, in some cases a transaction may actually be performed at a user device acting as a discovery relay. In this manner, a user device may effectively act as a surrogate sales representative for a vendor of electronic media, goods and/or services. As an example, the user may purchase a song from a vendor and have a copy of that song on their device. Later, that user may encounter a colleague and play the song for them. If the colleague decides they like it and are considering purchasing a copy, the purchasing user could transfer a digital copy of the song with limited rights (e.g., with restrictions on forwarding until actually purchased it) allowing the colleague to play a "sample" of the song, or all of the song for a limited number of plays or for a limited number of hours/days. When the colleague references the copy of the song (or when it expires) the colleague's device may provide them with an option to purchase the song from the original vendor. If the colleague elects to purchase the song, the original purchaser may receive a credit for the referral.

As described above, the discovery relay may determine if one of the elements in the database matches an element included in an expression communicated by one or more of the devices. The discovery relay may also decide a device no longer has interest after receiving an expression lacking the matching element communicated by the device. The discovery relay may discover interest comprises determining one or more of the devices are members of a group associated with interest in the goods or services.

In some cases, discovering interest may involve discovering a plurality of devices are interested in a plurality of goods or services and the sharing may include broadcasting a plurality of elements corresponding to the plurality of goods or services. In some cases, a discovery relay may discover interest based on a common attribute shared by a group of devices send a multicast transmission with at least one element to the group of devices. In some cases, the discovery relay may send a unicast transmission with one or more elements to a single device. In some cases, the discovery relay may determine whether to share an element via group-cast, or unicast messaging based, at least in part, on how many devices are interested in a good or service associated with the element.

In some cases, the discovery relay may perform a channel access procedure prior to sharing the element. The channel access procedure may involve listening on a medium prior to sharing the element.

Figure 11:
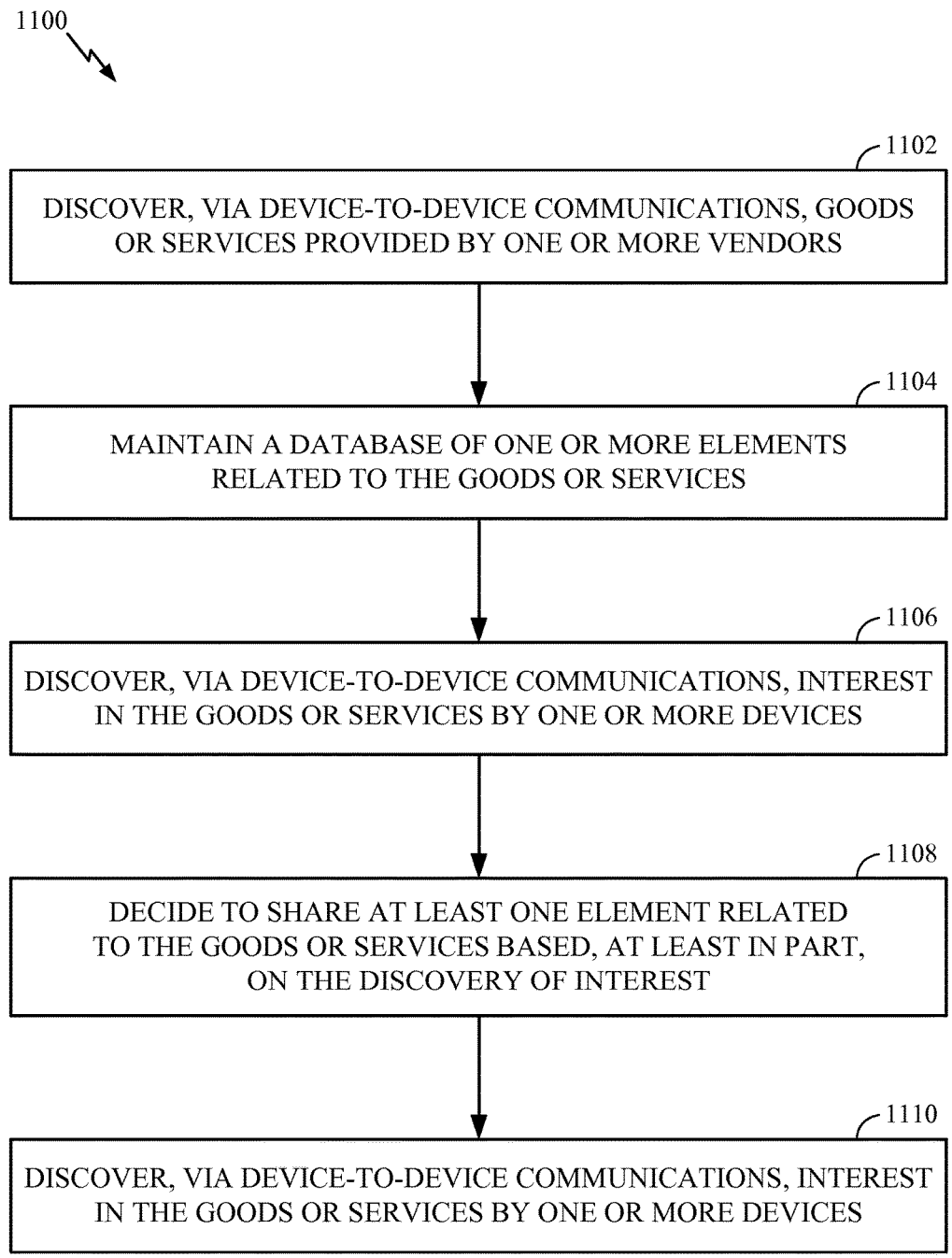
FIG. 11 illustrates example operations for relaying discovery information, in accordance with aspects of the present disclosure.

FIG. 11 illustrates example operations 1100 for relaying discovery information, in accordance with aspects of the present disclosure. The operations 1100 may be performed, for example, by a device operating as a discovery relay, such as an LTE-D UE.

The operations begin, at 1102, by discovering, via device-to-device communications, goods or services provided by one or more vendors. At 1104, the discovery relay maintains a database of one or more elements related to the goods or services. At 1106, the discovery relay discovers, via device-to-device communications, interest in the goods or services by one or more devices. At 1108, the discovery relay decides to share at least one element related to the goods or services based, at least in part, on the discovery of interest and, at 1110, the discovery relay shares the at least one element.

As described above, the discovery relay may determine if one of the elements in the database matches an element included in an expression communicated by one or more of the devices. The discovery relay may also decide a device no longer has interest after receiving an expression lacking the matching element communicated by the device. The discovery relay may discover interest comprises determining one or more of the devices are members of a group associated with interest in the goods or services.

In some cases, discovering interest may involve discovering a plurality of devices are interested in a plurality of goods or services and the sharing may include broadcasting a plurality of elements corresponding to the plurality of goods or services. In some cases, a discovery relay may discover interest based on a common attribute shared by a group of devices send a multicast transmission with at least one element to the group of devices. In some cases, the discovery relay may send a unicast transmission with one or more elements to a single device. In some cases, the discovery relay may determine whether to share an element via group-cast, or unicast messaging based, at least in part, on how many devices are interested in a good or service associated with the element.

Example Discovery Database Maintenance

In some cases, decisions on whether or not to relay discovered information may be based on various considerations. As noted above, these considerations may include comparing elements in a discovery database and recognizing that discovered information is of interest to another device. A device may also queue discovery referral information for relaying, monitor the channel for other users relaying attempts, and decide to transmit or abort a relay attempt accordingly. In general, a device may apply a set of access rules (e.g., governed by PHY and MAC protocols) to determine what to relay and when it should be relayed.

As described above, a database of discovered expressions may be continually updated based on received information on the RF carrier used to facilitate discovery of both proximate discovery and relaying operations. In some cases, certain controls may be placed when building a database of discovered expressions. Such controls may be designed to limit the amount of entries stored locally and also for the aforementioned flood control to limit the amount of relaying traffic on the medium. These controls may include rank ordering entries in the database, for example, based on age, location, relevance, and the like, all of which may be used to influence the decision on whether to share (relay) discovered elements stored in the database.

Figure 12:
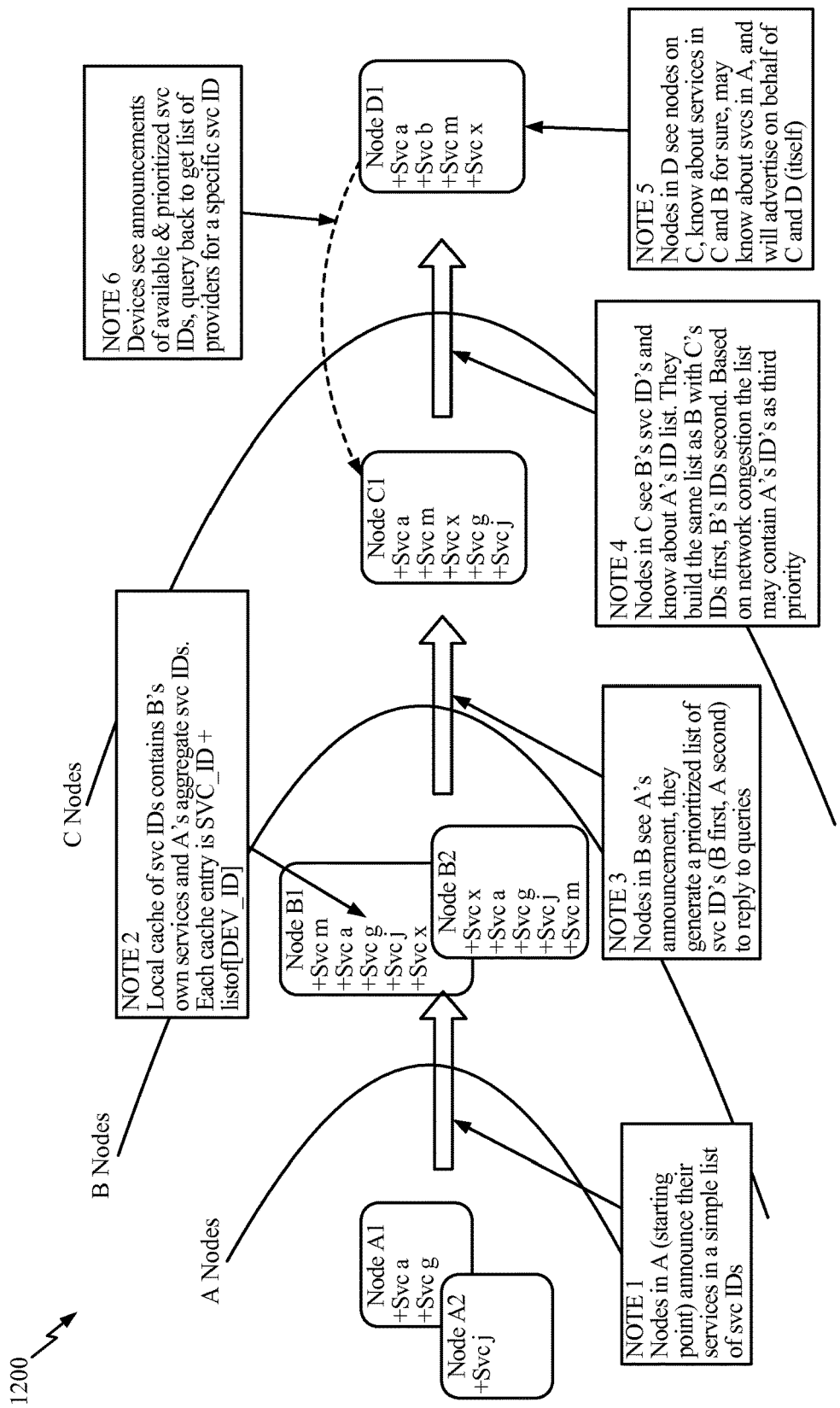
FIG. 12 illustrates an example diagram of maintaining a discovery database, in accordance with aspects of the present disclosure.

FIG. 12 illustrates how a database of discovered goods and/or services in a prioritized list may change as the list is propagated across multiple hops between wireless nodes (e.g., relay UEs) of a D2D network 1200. In the illustrated example, nodes in each group A, B, and C may have direct visibility of each other. Some nodes in group B may see some nodes in group A, but nodes in group C can not see nodes in group A. A propagation path in this exemplary case is assumed to be from nodes A to nodes B to nodes C to nodes D only.

Nodes A1 and A2 illustrated in FIG. 12 may each relay a list of goods/services they offer: [a|g] and [j], respectively. The list of goods/services may be represented as the list of service identifiers (IDs). Adjacent nodes B1 and B2 may see the consolidated availability of services [a|g|j] from peer nodes A1 and A2. Then, nodes B1 and B2 may concatenate their own services [m] and [x] with the list representing A1 and A2 services, and may transmit the concatenated advertisements [m|a|g|j|x] and [x a|g|j|m], respectively.

The local cache of service IDs at a node of group B may contain group B's own services and group A's aggregate service IDs. Each cache entry may comprise a service ID and a list of node IDs that offer that particular service. It can be observed from FIG. 12 that only difference between the list of services offered by the node B1 and the list of services offered by the node B2 may be the position of services [m] and [x] in the prioritized list, as a node's own service may have a higher priority than the service of another node.

Node C1 adjacent to nodes of group B may receive the concatenated list of services of nodes A1, A2, B1, and B2. Nodes in group C may see service IDs of nodes from group B and may also know about service IDs of nodes from group A. As illustrated in FIG. 5, the node C1 may generate the same list of services as nodes of group B, but C1's own service [a] may be listed first, while services of nodes in group B may be listed after that. Depending on the network congestion, the list of services at the node C1 may also contain service IDs of nodes from group A as a third priority.

Therefore, nodes of the D2D network 1200 may prioritize the service entries in their advertisement by a distance: nodes' own services may be listed first, then services that are one hop away, and so on. A distance of each service may be measured as a number of hops between a wireless node with a list of offered services comprising said service and another wireless node that initiated advertisement of the service. Furthermore, nodes may completely drop services of a specific distance from the list of offered services. In this exemplary case, services of the distance three or more may be dropped from the list. This is illustrated in FIG. 5 as the node D1 of group D drops from the list those services that are originally announced at the nodes A1 and A2 since they are three hops away from the node D1.

Prioritization of offered goods/services (to store and/or relay) may be achieved by various aspects. First, there may be a global prioritization established across all known services in order to enable quick discovery of fundamental services over value-add services, e.g. connectivity enablement over a specific application that utilizes the enabled connectivity. Such global prioritization may be typically established for all nodes by a governing entity of the D2D network. Second, each node may be configured by its associated user with a user's preferred order of announced services. Combination of global and user priorities may establish the node's own order of services. Third, service entries may be prioritized by a distance, e.g. entries with the distance zero may precede entries of neighbors (i.e. the distance equal or greater than one). Certain embodiments of the present disclosure also support combining of various priorities into a consolidated order announced by a node of the D2D network.

Various techniques may be applied for lifetime management of service entries. First, the distance of a service entry (i.e., a location of a wireless node offering the service) may determine whether a node may drop the service from its advertisement or forward it. The distance limit may be a predetermined static value, it may vary based on the service (e.g. a service with a high global priority may have a larger distance limit), or it may vary dynamically based on a network loading and a node density. Second, nodes may be configured with a maximum advertisement size limiting an overhead of densely populated areas. The size limit may be a predetermined static limit, may be applicable only to a subset of services (e.g. services with a high global priority may be exempt), or the size limit may vary dynamically based on the network loading and node density.

Example Secure Relaying of Discovery Information in Wireless Networks

Aspects of the present disclosure provide techniques that may enhance security in wireless environments employing device-to-device relaying schemes, such as the wireless environment described above. That is, aspects of the present disclosure may provide for the secure relay of discovery information (i.e., discovery frames/expressions) in wireless networks. As used herein, the terms "discovery frame," "discovery information," and "expression" may be used interchangeably.

As will be described in greater detail below, by providing certain fields in an expression that are changeable (or should be changeable) only by relay devices, in addition to a MIC value, an authenticating entity may be able to detect whether a relayed expression is valid. Such fields are referred to herein as "relay-specific" fields. In some cases, such relay-specific fields may be used to augment existing discovery frame formats, for example, as an alternative to existing fields or in addition to existing fields.

Figures 13A, 13B:
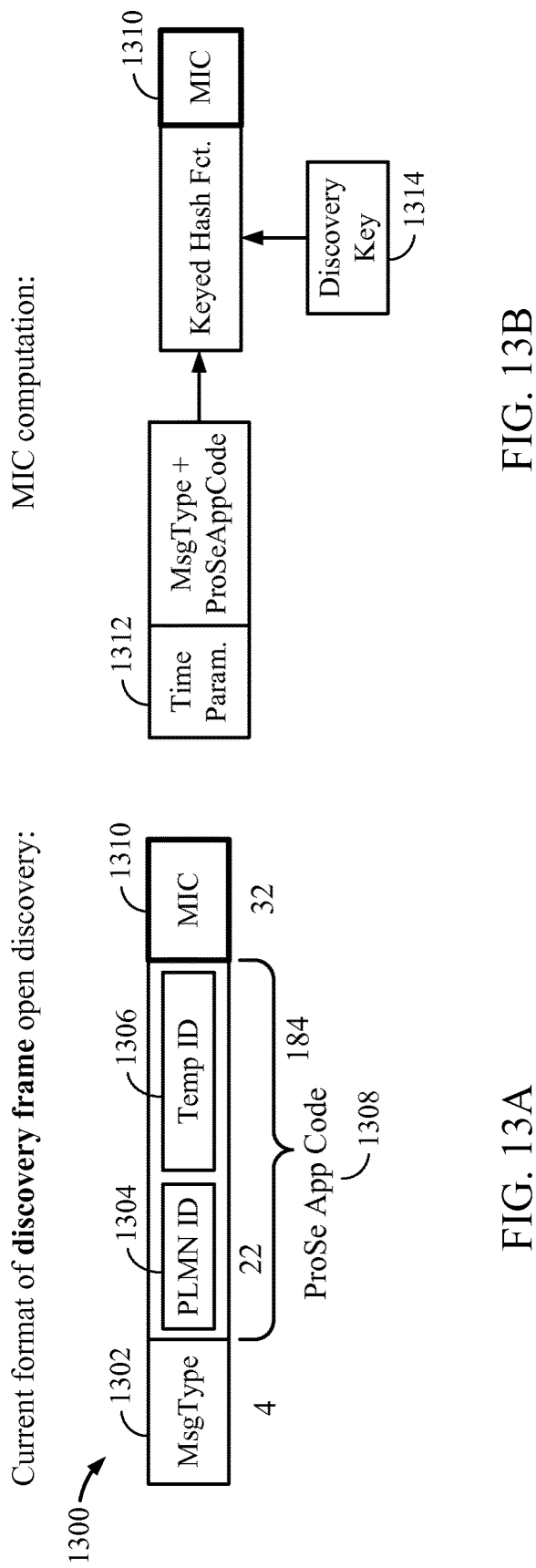
FIG. 13A illustrates format for a discovery frame for open discovery, in accordance with certain aspects of the present disclosure.
FIG. 13B illustrates the computation of a MIC, in accordance with certain aspects of the present disclosure.

For example, FIG. 13A shows an existing format for a discovery frame 1300 for open discovery. According to certain aspects a discovery frame may comprise various fields. For example, a discovery frame may comprise a message type field 1302, a PLMN identification (ID) field 1304, a temporary ID field 1306, and a MIC 1310. According to certain aspects, the PLMN ID and temporary ID fields may collectively be considered a ProSe Application (App) Code 1308.

As illustrated in FIG. 13B, a value for the MIC 1310 may be generated using an algorithm (e.g., Advanced Encryption Standard-Cipher-based Message Authentication Code "AES-CMAC") that takes, as input, a time parameter 1312, the Msg Type field 1302, ProSe App Code 1308, and a (provided secret) Discovery Key 1314. According to aspects, the discovery key 1314 may be provided per code or per UE. The time parameter 1012 may be, for example, a "UTC-based time parameter" 1312 associated with a discovery period/slot when the MIC is announced. According to certain aspects, the UTC-based time parameter may not be sent in its entirety over the air (OTA), assuming other devices nearby can arrive at the same notion of time. For example, only a certain number of least significant bits (LSBs) of the time parameter may be sent to avoid ambiguity arising from border timing between discovery periods.

According to certain aspects, integrity of a message may be checked by "verifying" a MIC received in the message, for example, by an entity such as the ProSe Function (PF). For example the M-UE may provide the PF with information such as a Msg Type, ProSe App Code, MIC, and a time parameter that is "inferred" by the M-UE. If a MIC fails verification (e.g., a generated MIC value does not match the MIC value received in the message) then the discovery frame may be considered willfully or inadvertently compromised.

According to certain aspects, a discovery frame may be compromised, for example, by an attack on the timing of an A-UE's eNB system information block (SIB), a UE impersonation attack, an A-UE not authorized (or no longer authorized) to announce the discovery frame, or an M-UE misreporting (e.g., due to a desire to cause trouble to the A-UE).

As mentioned above, according to certain aspects, relay-specific fields may be utilized as a mechanism to provide for secure relaying of discovery information. As described below, with reference to FIGS. 14-16, an A-UE may initialize values of relay-specific fields, while a relay-UE adjusts the values of the relay-specific fields without altering the MIC value, while a verifying device may validate a message by comparing a MIC value received in the message to a MIC value generated based on other content in the message (e.g., and the initialized values of the relay-specific fields).

Figure 14:
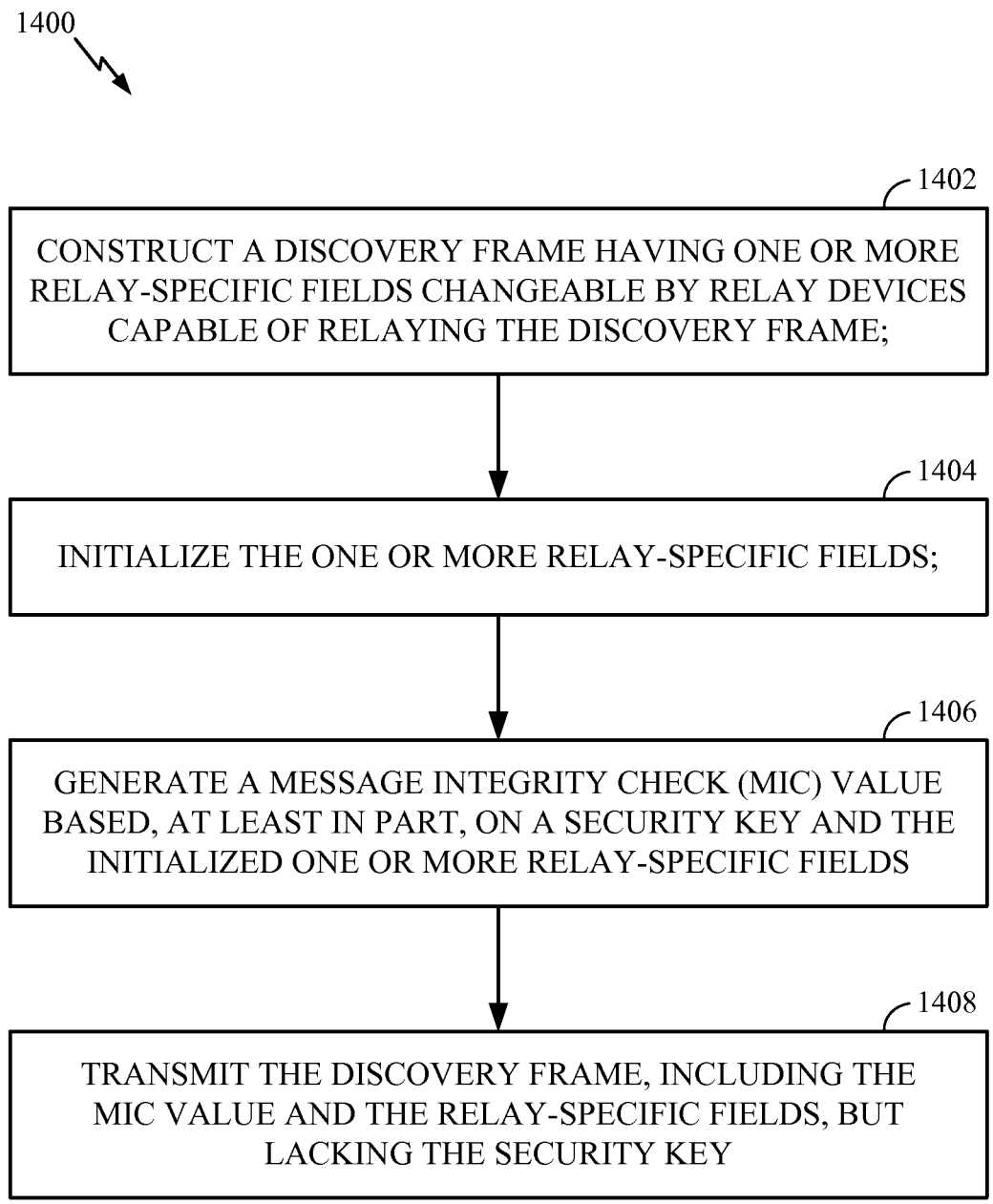
FIG. 14 illustrates example operations, performed by an A-UE, in accordance with certain aspects of the present disclosure.

FIG. 14 illustrates example operations 1400 performed, for example, by an A-UE to allow for secure transmission of discovery information. Operations 1400 begin, at 1402, by constructing a discovery frame having one or more relay-specific fields changeable by relay devices capable of relaying the discovery frame. At 1404, the one or more relay-specific fields are initialized. At 1406, the A-UE generates a MIC value based, at least in part, on a security key and the initialized one or more relay-specific fields. At 1408, the A-UE transmits the discovery frame including the MIC value and the relay-specific fields.

Figure 15:
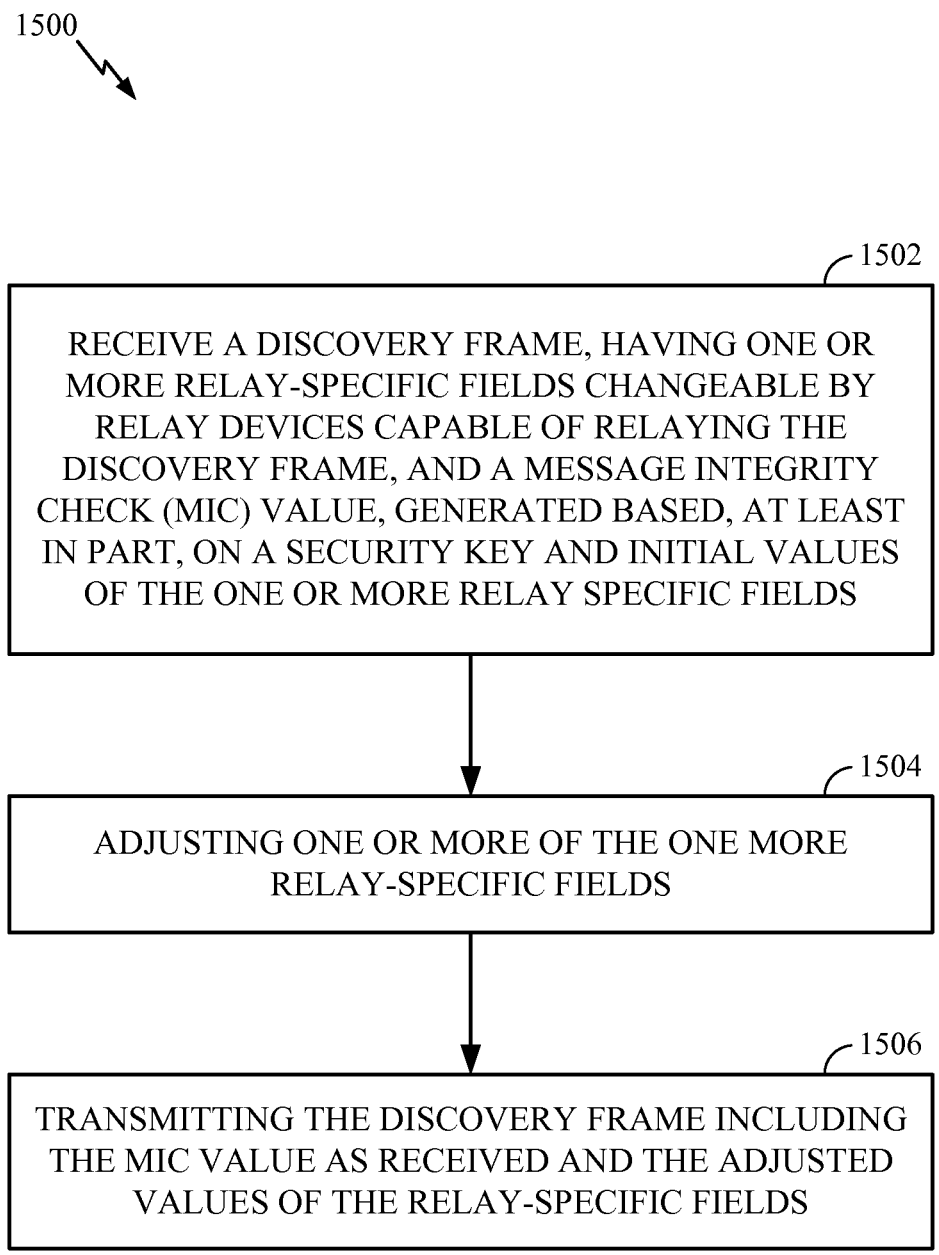
FIG. 15 illustrates example operations, performed by an R-UE, in accordance with certain aspects of the present disclosure.

FIG. 15 illustrates example operations 1500 performed, for example, by an R-UE that receives a discovery frame. Operations 1500 begin, at 1502, by receiving a discovery frame having one or more relay-specific fields changeable by relay devices capable of relaying the discovery frame and a MIC value generated based, at least in part, on a security key and initial values of the one or more relay-specific fields. At 1504, the R-UE adjusts one or more of the one or more relay-specific fields. At 1506, the R-UE transmits (relays) the discovery frame, including the MIC value as received and the adjusted values of the relay-specific fields.

Figure 16:
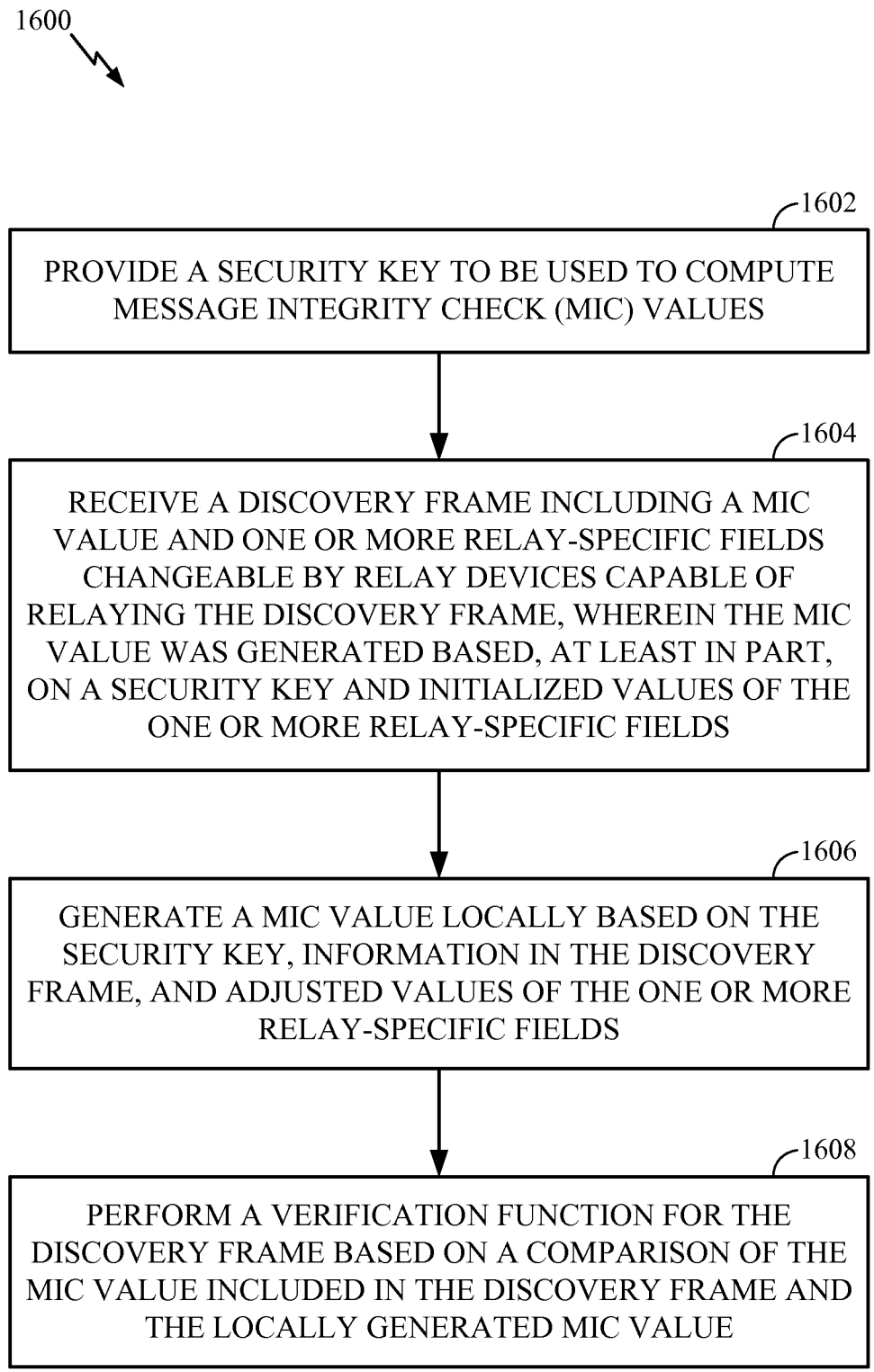
FIG. 16 illustrates example operations, performed by a verifying entity, in accordance with certain aspects of the present disclosure.

FIG. 16 illustrates example operations 1600 performed, for example, by a verifying entity (e.g., the PF), to validate a relayed discovery frame. Operations 1600 begin, at 1602, by providing a security key to be used to compute MIC values. At 1604, the verifying entity receives a discovery frame including a MIC value and one or more relay-specific fields changeable by relay devices capable of relaying the discovery frame, wherein the MIC value was generated based, at least in part, on the security key and initialized values of the one or more relay-specific fields. In some cases, the MIC may be sent separately by the UE and, more generally, all elements that the UE hears in one discovery frame may be dis-assembled and sent to the verifying entity (e.g., ProSe Fct) in separate information elements (IEs) as part of the signaling message.

At 1606, the verifying entity locally generates a MIC value based on the security key, information in the discovery frame, and an adjusted values of the one or more relay-specific fields. At 1608, the verifying entity performs a verification function for the discovery frame based on a comparison of the MIC value included in the discovery frame and the locally generated MIC value.

Figure 17:
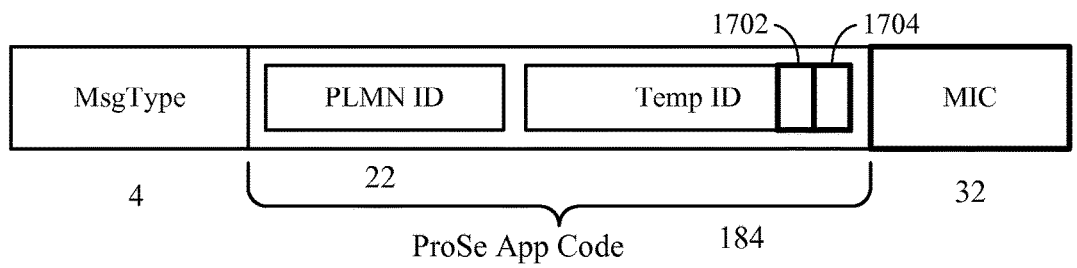
FIG. 17 illustrates an example discovery frame format, in accordance with certain aspects of the present disclosure.

As illustrated in FIG. 17, in some cases, relay specific fields 1702 and 1704 may be included as part of the temporary ID field of a discovery frame 1700.

The relay-specific fields 1702 and 1704 may contain different types of information. For example, field 1702 may comprise information relating to a current hop count (Current_Hop_Count) and/or a current discovery slot count (Current_DiscSlot_Count), while field 1704 may comprise information that indicates an allowable range of values for field 1702. For example, field 1704 may include a maximum hop count and/or a maximum discovery slot count.

According to certain aspects, the current hop count may relate to how many UEs away from original A-UE the discovery frame has been transmitted. According to certain aspects, the original A-UE may set the current hop count value to zero and, for every "hop" the discovery frame makes, the relay UE (R-UE) may increment the current hop count by 1.

According to certain aspects, the current discovery slot count may relate to how many discovery slots have occurred since the discovery slot in which the original A-UE first transmitted the discovery frame. According to certain aspects, the original A-UE may set the current discovery slot count value to zero and, for every discovery slot after the original discovery slot, the R-UE may increment the current hop count by 1.

According to certain aspects, field 1702 may be changeable by a relay relaying the discovery frame whereas field 1704 may only be set by the original transmitter of the discovery frame (e.g., the A-UE). According to certain aspects, the A-UE (i.e., original transmitter of the discovery frame) may compute a MIC based, at least in part, on the value it sets the maximum hop count and/or maximum discovery slot count to. According to aspects, the A-UE may also generate the MIC based, at least in part, on a time-varying parameter.

The use of relay-specific fields proposed herein may be described with reference to various timelines for the relaying of discovery frames (e.g., that include information regarding goods or services provided by one or more vendors).

Figure 18:
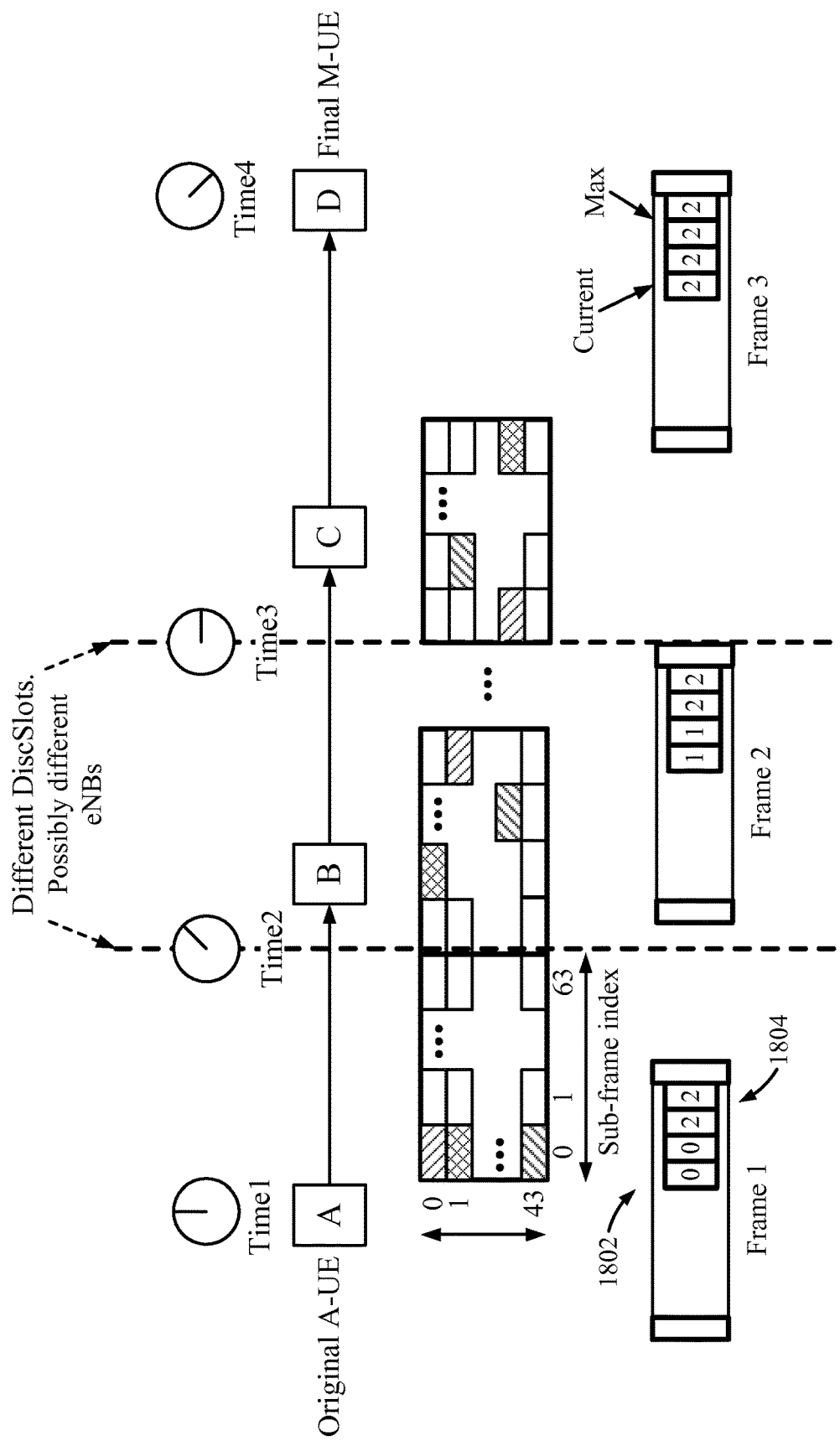
FIG. 18 shows a timeline illustrating the relaying of discovery frames and the incrementing of the relay-specific fields, in accordance with certain aspects of the present disclosure.

For example, FIG. 18 illustrates an example timeline of relaying of discovery frames and the incrementing of the relay-specific fields. At Time 1, device A, an A-UE may set both the current hop count and the current discovery slot count (shown as relay-specific fields 1802) to zero. Additionally, in this example, device A sets both the maximum hop count and maximum slot count (shown as relay-specific fields 1804) to 2. Thereafter, device A may transmit the discovery frame.

At Time 2, device B (e.g., an R-UE) may receive the discovery frame transmitted by device A and increment the relay-specific fields (e.g., both the current hop count and current discovery slot count) by 1. Device B may then transmit (relay) the discovery frame (as Frame 2) with the adjusted relay-specific fields, but with the remaining fields (such as the MIC value) unaltered.

At Time 3, device C (e.g., another R-UE) may receive Frame 2 from UE B, increment both the current hop count and current discovery slot count by 1, and relay the discovery frame (as Frame 3). As illustrated, after this incrementing, the current hop count and current discovery slot count may have a value of 2, the maximum value).

At Time 4, device D (e.g., an M-UE) may receive Frame 3 from UE C. Subsequently, UE D may send Frame 3 to a PF for verification. For example, the PF may verify that the current hop count and/or the current discovery slot count do not exceed the maximum hop count and/or the maximum discovery slot count. According to certain aspects, to verify the MIC of the discovery frame, the PF may reset the current hop count and current discovery slot count to zero (as these are the values device A used to generate the MIC value) and locally generate a MIC value to compare with the MIC value received in Frame 3.

According to certain aspects, the verifying entity (device D or the ProSe Function itself) may ensure the values of the current hop count and discovery slot count are valid. For example, for a maximum hop/discovery slot count of 2, valid combinations for the current hop count and current discovery slot count may be 00, 11, 12, or 22 (where the first digit from left to right corresponds to the current hop count and the second digit corresponds to the current discovery slot count).

The mechanisms provided herein may allow detection of a UE that acts as a "replayer" instead of a "relayer". For example, FIGS. 19A and B illustrate a scenario of a UE acting as a replayer. As illustrated in FIG. 19A, a legitimate A-UE may transmit/announce Frame 1 at Time 1. According to certain aspects, a UE may be able to modify Frame 1 and replay the discovery frame at Time1+2*Disc_period, as illustrated in FIG. 19B, with values for the current hop count and discovery slot count both to 2. A verifying entity may discover this attack, however, by examining the values of these fields-in light of a current slot time.

According to certain aspects, a verifying entity may handle a replayed discovery frame in various ways. For example, the verifying entity may detect replay attacks/modifications on the received discovery frames and reject discovery frames sent by M-UEs with a time parameter that is too old. Alternatively, the PF may accept discovery frames sent by M-UEs that were "heard" from relay (i.e., the discovery frame is marked relayed), and the MIC passes with an old time parameter.

According to certain aspects, a PF may not be able to distinguish between a discovery frame that is relayed and a discovery frame that is replayed. However, if the PF can ensure that an authorized A-UE's discovery frame was meant to be relayed, then replaying its announcement (within A-UE's authorized limits) may be viewed not as an attack, but as a favor (e.g., as extending the A-UE's range).

According to certain aspects, a wormhole attack may still be possible, but may be easily mitigated. For example, an A-UE may include location information in a discovery frame and/or the verifying entity (M-UE) may include location information in a request to the PF. Since a PF may know (at least roughly) where UEs are (e.g., based on at least a PLMN, and possibly more granular like a CellID), the verifying entity may use this location information to verify the discovery frame.

In some cases, a R-UE may attempt to perform a denial of service (DoS) attack against an A-UE, for example, by not increasing/decreasing the current hop/discovery slot counters. As a result, the discovery frame may be relayed further/longer than the maximum hop/discovery slot count, which may result in a relayed frame failing to be verified at the ProSE Function (hence no service can be provided to the Monitoring UE)—which may result in a loss of the information in the relayed discovery frame. Additionally, an R-UE may "max out" the current hop/discovery slot counters prematurely. This may result in the discovery frame not being relayed as far as it could have been and the verification, again, failing.

Figure 20A:
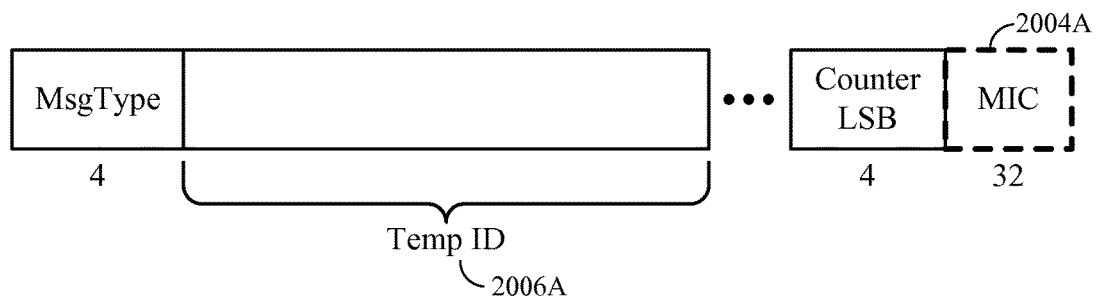
FIG. 20A illustrates an example discovery frame format for restricted discovery, in accordance with certain aspects of the present disclosure.
Figure 20B:
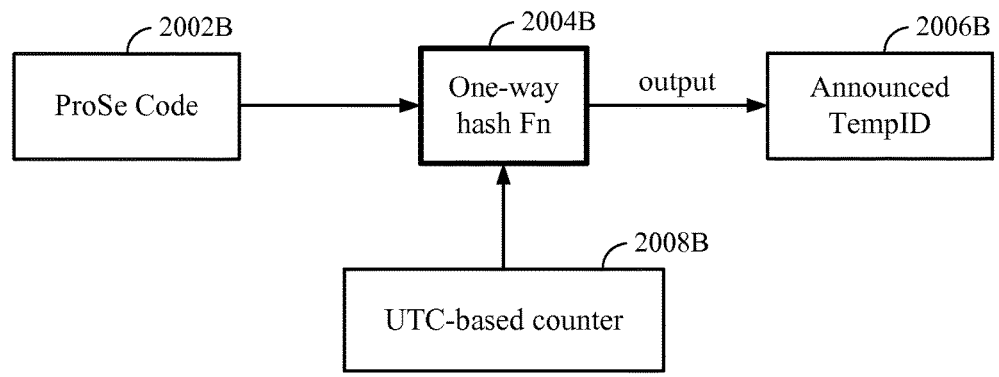
FIG. 20B illustrates example computation using a time-varying one-way hash, in accordance with certain aspects of the present disclosure.

FIG. 20A illustrates an exemplary discovery frame format for restricted discovery. Certain types of discovery frame formats may be susceptible to impersonation or replay attacks. To mitigate these attacks, it may be desirable for the announced TempID 2006A to be generated in a manner that allows for enhanced verification. For example, as illustrated in FIG. 20B, the Announced TempID 2006B may be generated using a time-varying one-way hash function 2004B, using a ProSe Code 2002B and a UTC-based time counter 2008B as input. As noted above, the time value used to calculate the one-way has may not sent in its entirety explicitly (e.g., only the 4 LSBs may be sent). In accordance with certain aspects, a MIC 2004A (as described before) may also be sent to add to the security level.

Aspects of the present disclosure may be used in a credit awarding scheme in connection with the relaying of information. For example, as noted above, a credit may be awarded to an R-UE (or corresponding user) whose relayed discovery frames make it to a PF and are valid.

In some cases, it may be possible for an M-UE to prevent an R-UE from getting a credit for relaying a discovery frame (e.g., by attempting to remove information identifying a corresponding R-UE). Certain mechanisms may help detect this scenario, however. For example, if the identity of the R-UE is not known to the A-UE, the R-UE may add a verifiable "mark" to the discovery frame that it is relaying. If the identity of the R-UE is known to the A-UE, the A-UE may include this information in the discovery frame and may also use R-UE's identity information when generating the MIC for the discovery frame. In either case, an M-UE may not be able to modify the received discovery frame to prevent the R-UE from getting the credit without the MIC failing.

On the other hand, it may be possible for an R-UE to receive credit without actually relaying a discovery frame. For example, if the identity of an R-UE is not known at the A-UE, then any R-UE might claim to have relayed the discovery frame (e.g., acting in collusion with an M-UE that provides a false verification of a relayed frame). Certain mechanisms may be utilized to detect and/or prevent this scenario. For example, if the identity of the R-UE is known at the A-UE, the A-UE may include the R-UE's identity in the discovery frame and the R-UE may include a relay MIC (R-MIC) in the relayed discovery frame. The PF may then verify the MIC using the R-MIC. However, the R-UE may choose not relay the discovery frame, and instead, have an M-UE add an R-MIC to the discovery frame sent to PF. In this case, the PF would see the R-MIC added by the M-UE and award a credit to the R-UE identified in the R-MIC even though the R-UE did not relay a discovery frame.

According to certain aspects, another way to identify an R-UE may be to compute the R-UEs handle from an existing ID and use this handle at an A-UE to include in the discovery frame just like the full R_UE's identity as described herein.

According to certain aspects, preventing an R-UE from receiving undue credit may require cooperation between M-UE(s), may require the R-UE identity to be known by the A-UE, and may require additional OTA overhead, which may be prohibitive in some cases.

Figure 21:
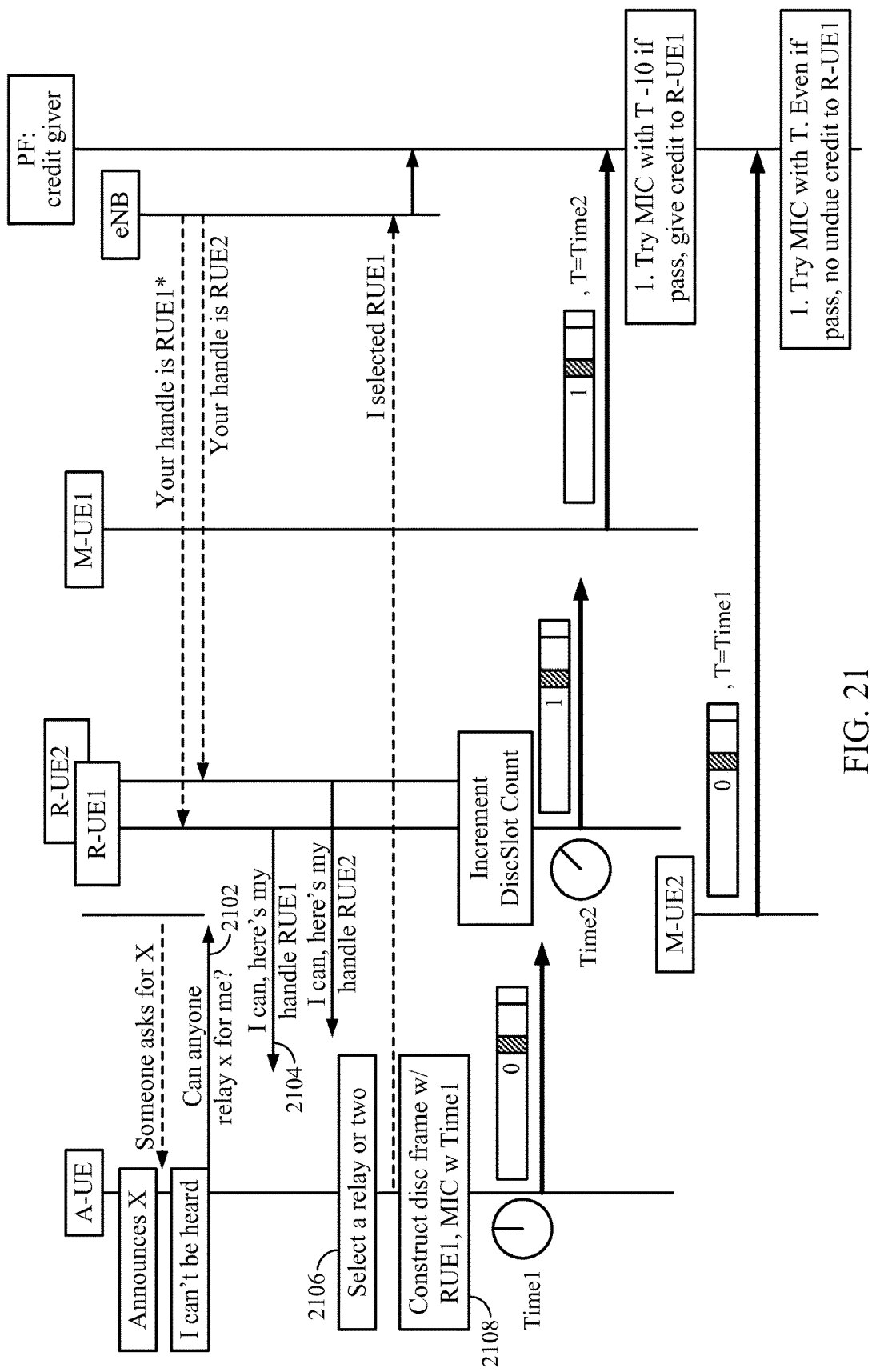
FIG. 21 illustrates an example timeline for relaying of discovery frames when the R-UE is known by the A-UE, in accordance with certain aspects of the present disclosure.

FIG. 21 illustrates an example timeline for relaying of discovery frames when (identity of) the R-UE is known by the A-UE. At 2102 the A-UE asks whether there are any R-UE's in the A-UE's vicinity available to relay a discovery frame. At 2104 an R-UE (e.g., R-UE1 and/or R-UE2) may respond to A-UE with the R-UE's identity/handle. The A-UE may subsequently select, at 2106, one or more of the R-UEs to relay the discovery frame. As illustrated, in some cases, the R-UE handles may be assigned by an eNB (with the PF/credit giver) and the A-UE may indicate, to the eNB which R-UE is chosen.

The A-UE may construct the discovery frame, at 2108 based, at least in part, on the R-UE's identity/handle, a MIC, and a time parameter. The A-UE may then transmit the discovery frame at Time1. At time Time2, R-UE1 (selected by the A-UE), may receive the discovery frame, increment the discovery slot count, and relay the discovery frame to an M-UE.

In some cases, credit may only be given if a passing MIC value is generated with a valid time parameter. For example, as illustrated in FIG. 21, a discovery frame from M-UE1 that passes with a MIC generated with a time (T-10) may result in credit given to R-UE1. On the other hand, a discovery frame from M-UE2 that passes with a MIC generated from an invalid time (e.g., T-10) may result in no undue credit being given to R-UE1, as M-UE2 may have sent the frame without it actually being relayed from R-UE1.

Despite these mechanisms, in some cases, a verifying entity may not be able to distinguish between a legitimate relayed discovery frame and one that was not relayed but was sent to a verifying entity with a delay and purposely modified.

Figure 22:
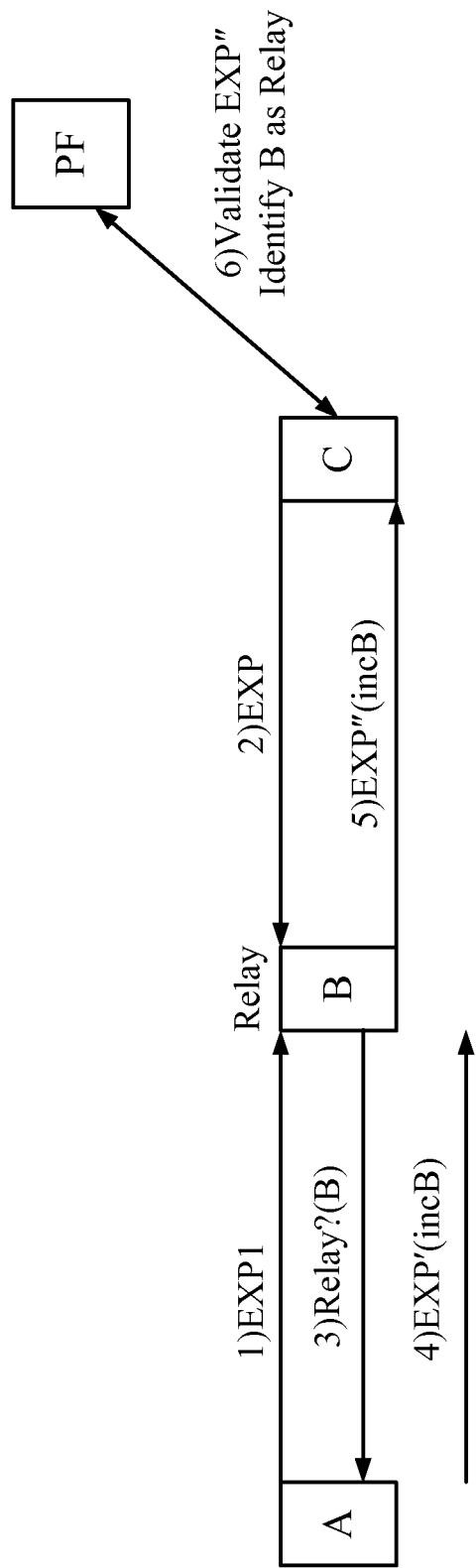
FIG. 22 illustrates an example timeline for relaying of expressions including the identity of the R-UE, in accordance with certain aspects of the present disclosure.

FIG. 22 illustrates an example of how an identity of a relay UE may be made known to an A-UE, in the event discovery is requested by another device (this scenario may be referred to as reactive relaying). As illustrated, at Time 1, device A (an A-UE) may transmit an expression to UE B. At Time 2, UE C may transmit an expression (indicating interest that matches the expression UE B received from A. Detecting the Match, at Time 3, B may ask A permission to relay the expression and may provide its ID (i.e., a Bid to relay) to A. At Time 4, UE A may transmit another expression (EXP'), by broadcasting it or transmitting it just to B, which may include the same information as EXP but also including UE B's Bid, which may be protected by a MIC. According to certain aspects, once a Bid is protected by a MIC, that Bid may no longer be removed/replaced from the EXP. At Time 5, B relays the expression to C (e.g., as EXP"), including B's Bid. UE C may receive EXP" and, and Time 6, forward it to a verifying entity (PF) for validation and to identify B as the relay (e.g., for credit purposes).

Figure 23:
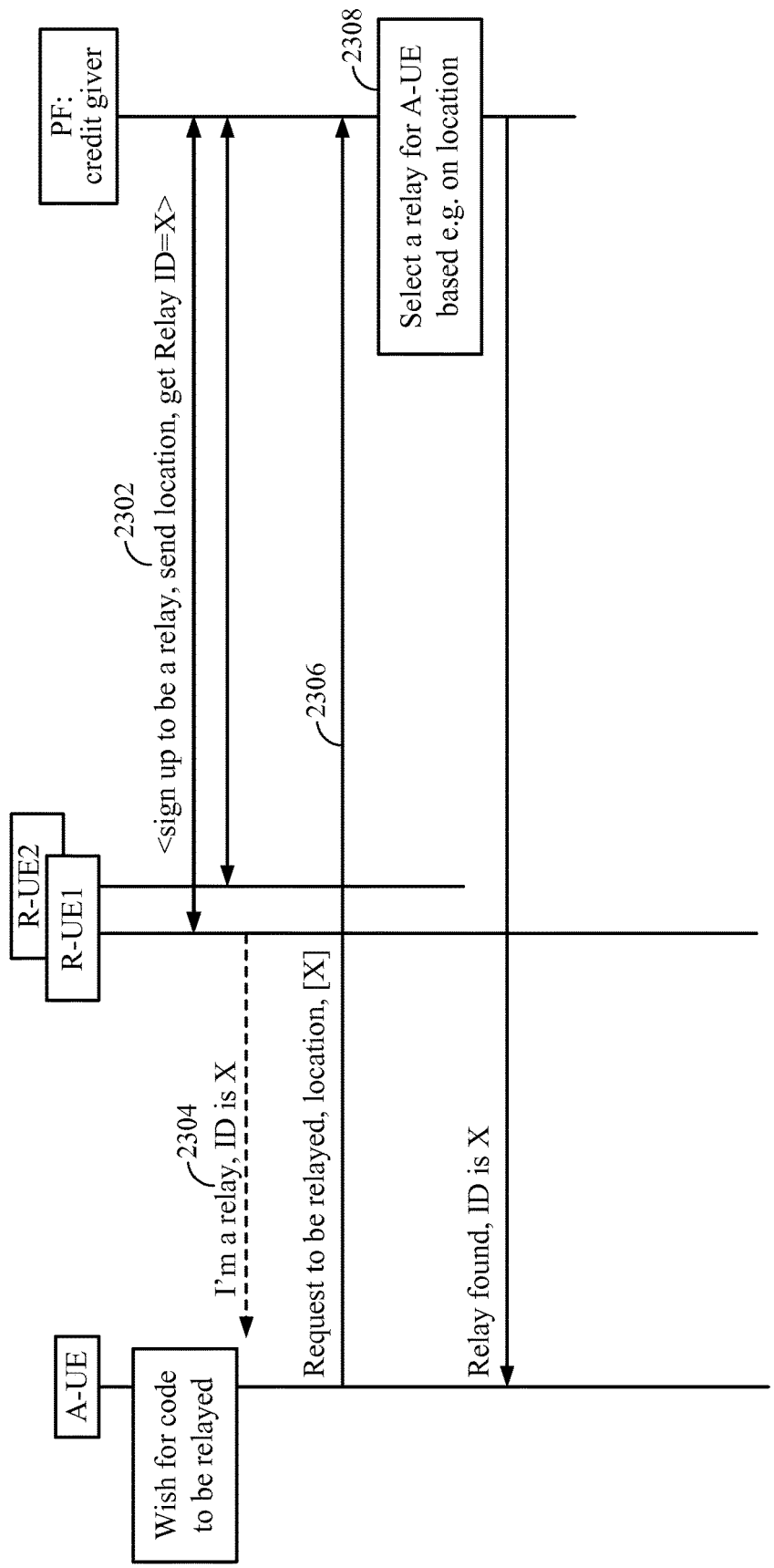
FIG. 23 illustrates an example timeline for identification of an R-UE may be made known to an A-UE by the network, in accordance with certain aspects of the present disclosure.

FIG. 23 illustrates a "network-centric" example of how an identity of a relay UE may be made known to an A-UE. In this example, at 2302, R-UEs may sign up with the PF/credit-giver and periodically upload their location and status (e.g. battery, availability, etc.). If PF authorizes them, the PF may send a Relay ID to the R-UE to be used when relaying information (e.g., EXPs or discovery frames). According to certain aspects, at 2304, relays may provide their relay capability and ID to the A-UE. According to certain aspects, Relay IDs may be public but temporary, self-configured, or distributed (e.g., assigned by eNB, ProSe Function (PF) or an Application Server).

At 2306, the A-UE may transmit a request to the network (PF/credit-giver) to have the A-UE's discovery frames relayed. In some cases, to help the PF/credit-giver select an appropriate relay, the A-UE may also upload its location and (optionally) the IDs of relays it has detected nearby.

At 2308, the PF may select a relay based on the location (and/or other criteria such as battery power and the like). The PF may then send an indication of the selected relay ID (or a list of relay IDs to choose from) to the A-UE.

According to certain aspects, the A-UE may now include the ID of the (selected) R-UE in a generated over the air (OTA) code. For example, the ID of the selected R-UE may be used when generating a MIC for the discovery frame. According to aspects, when an M-UE sends a relayed discovery frame to PF/credit giver, the PF may also verify that discovery frame was relayed by an authorized relay.

Figure 24:
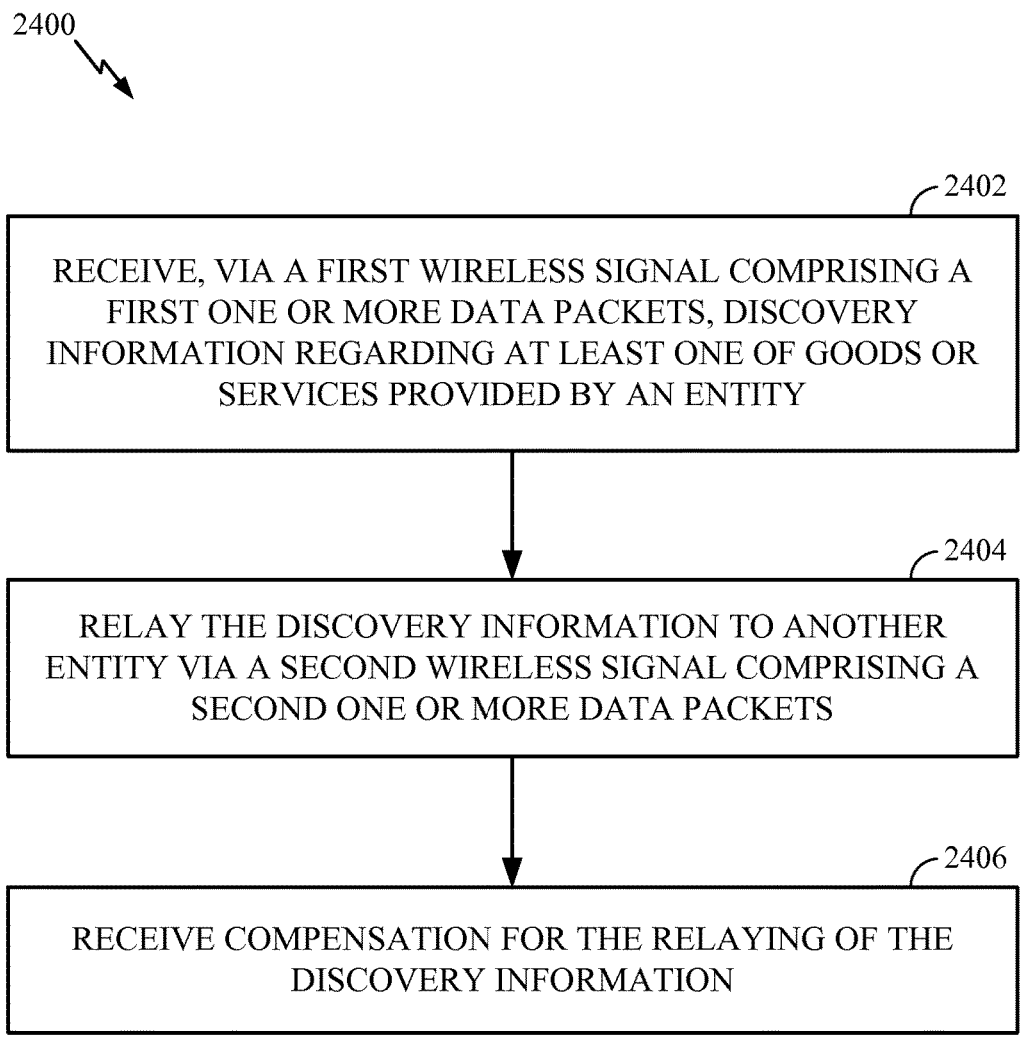
FIG. 24 illustrates example operations, performed by an R-UE, in accordance with certain aspects of the present disclosure.
Figure 25:
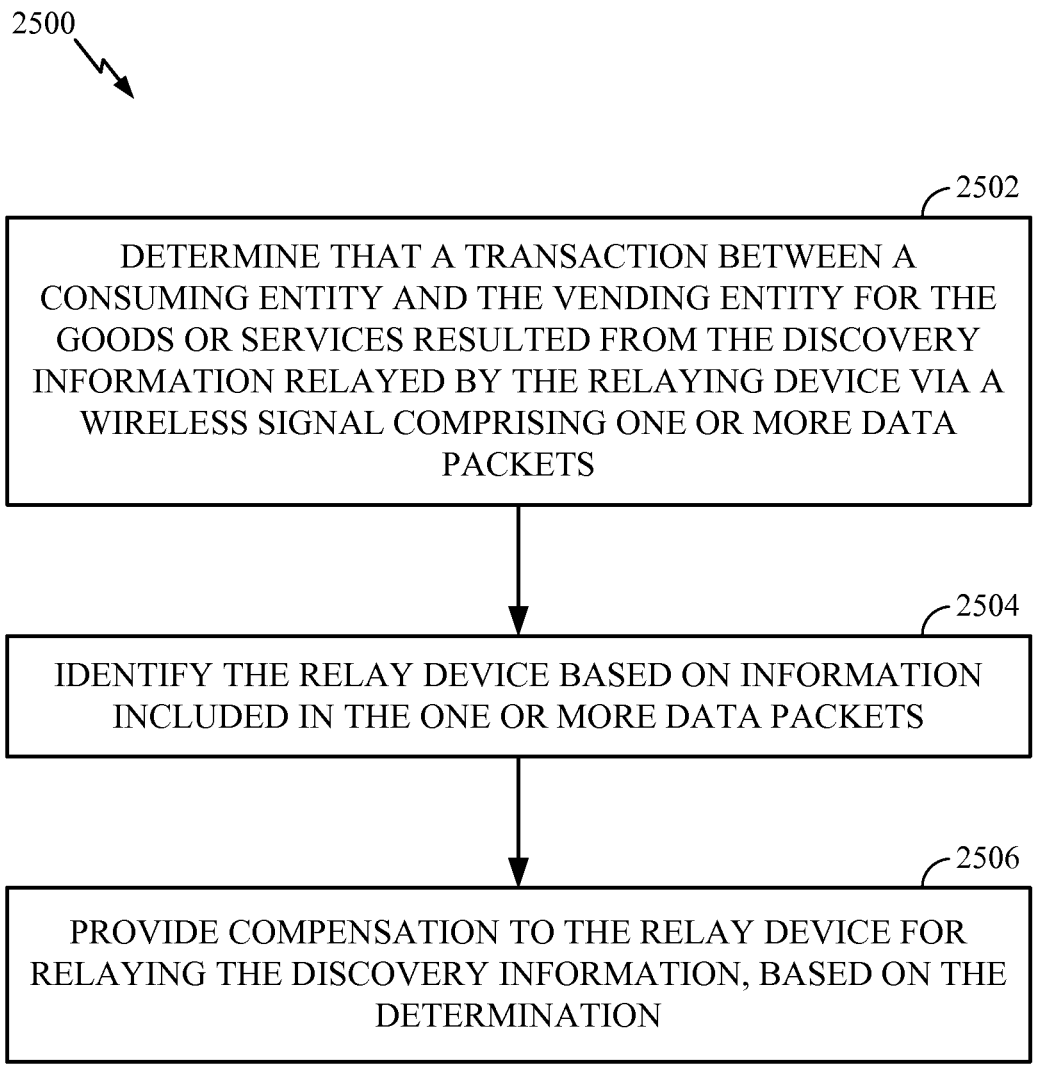
FIG. 25 illustrates example operations, performed by a credit giver, in accordance with certain aspects of the present disclosure.
Figure 26:
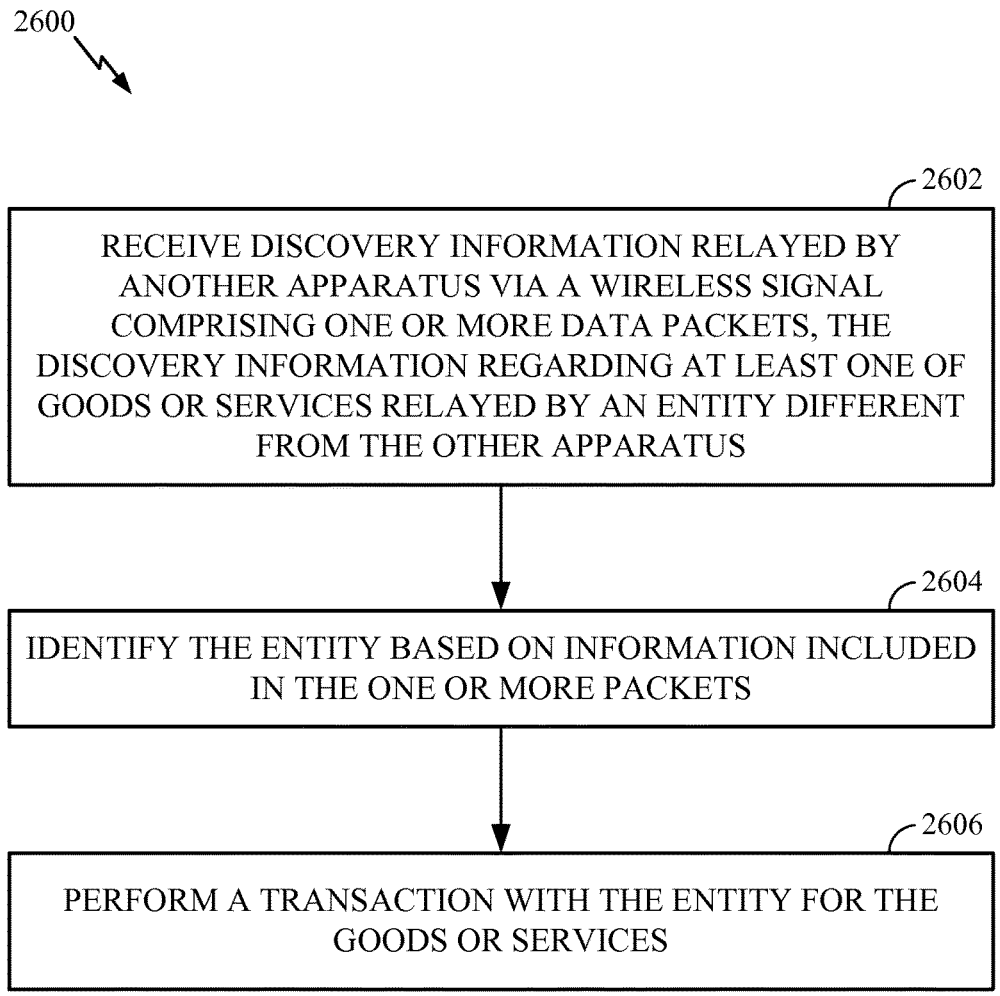
FIG. 26 illustrates example operations, performed by a transacting entity, in accordance with certain aspects of the present disclosure.

The various techniques presented herein provide a flexible infrastructure that allows for a relay device to receive compensation. FIGS. 24, 25, and 26 illustrate various operations for utilizing such an infrastructure, from the perspective of a relay device, a credit provider, and a transacting device, respectively.

FIG. 24 illustrates example operations 2400 that may be performed by a relay device that receives compensation for relaying discovery information. As illustrated, the operations 2400 begin, at 2402, by receiving, via a first wireless signal comprising a first one or more data packets, discovery information regarding at least one of goods or services provided by an entity. At 2404, the relay device relays the discovery information to another entity via a second wireless signal comprising a second one or more data packets. At 2406, the relay device receives compensation for the relaying of the discovery information.

FIG. 25 illustrates example operations 2500 that may be performed by a device that provides compensation for relaying discovery information. As illustrated, the operations 2500 begin, at 2502, by determining that a transaction between a consuming entity and the vending entity for the goods or services resulted from the discovery information relayed by the relaying device via a wireless signal comprising one or more data packets. At 2504, the relay device is identified based on information included in the one or more data packets. At 2506, compensation is provided to the relay device for relaying the discovery information, based on the determination.

FIG. 26 illustrates example operations 2600 that may be performed by a device that performs a transaction using relayed discovery information. As illustrated, the operations 2600 begin, at 2602, by receiving discovery information relayed by another apparatus via a wireless signal comprising one or more data packets, the discovery information regarding at least one of goods or services relayed by an entity different from the other apparatus. At 2604, the entity is the identified based on information included in the one or more packets. At 2606, a transaction is performed with the entity for the goods or services.

Figure 27:
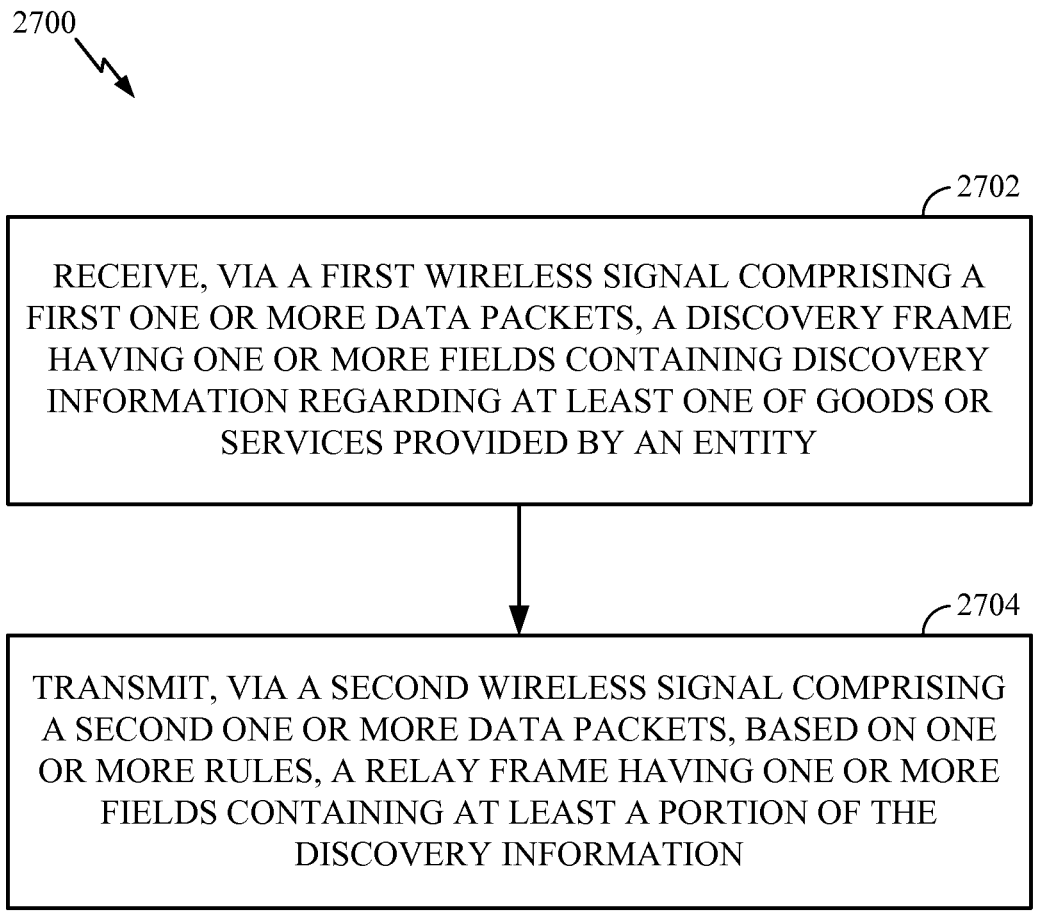
FIG. 27 illustrates example operations, performed by an R-UE, in accordance with certain aspects of the present disclosure.
Figure 28:
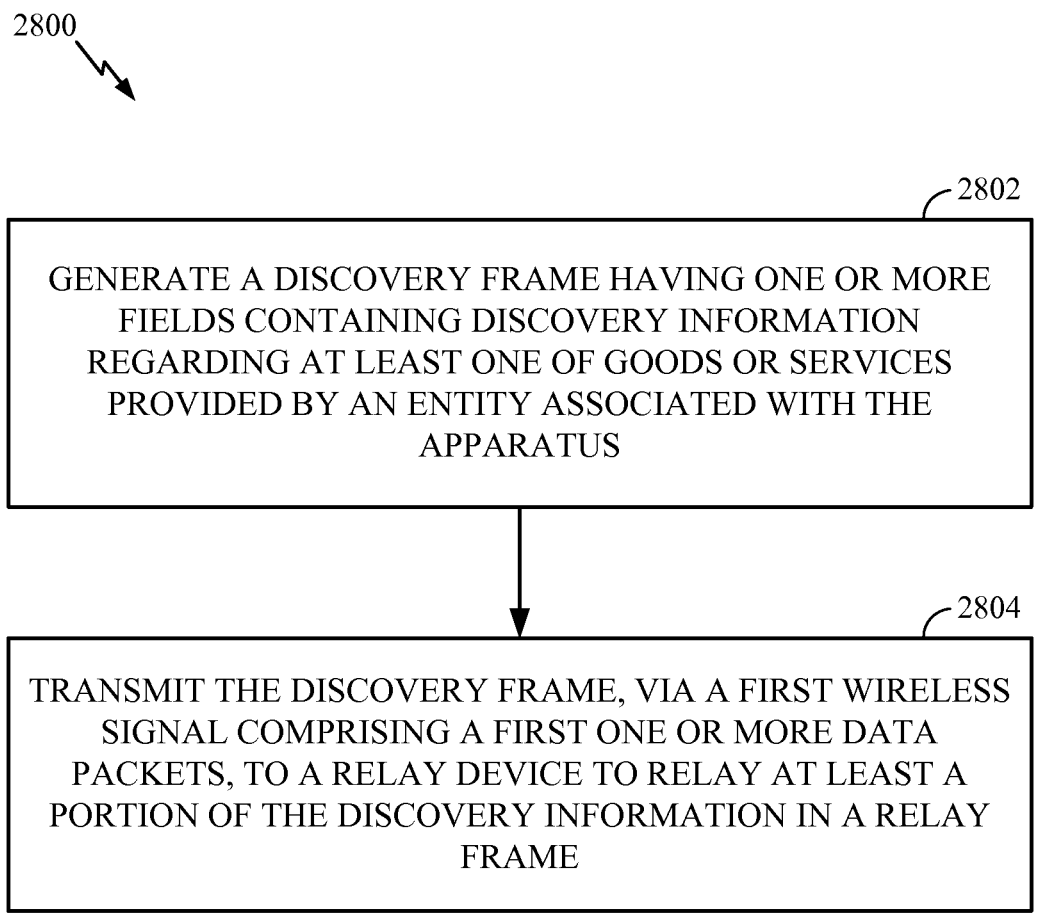
FIG. 28 illustrates example operations, performed by an A-UE, in accordance with certain aspects of the present disclosure.
Figure 29:
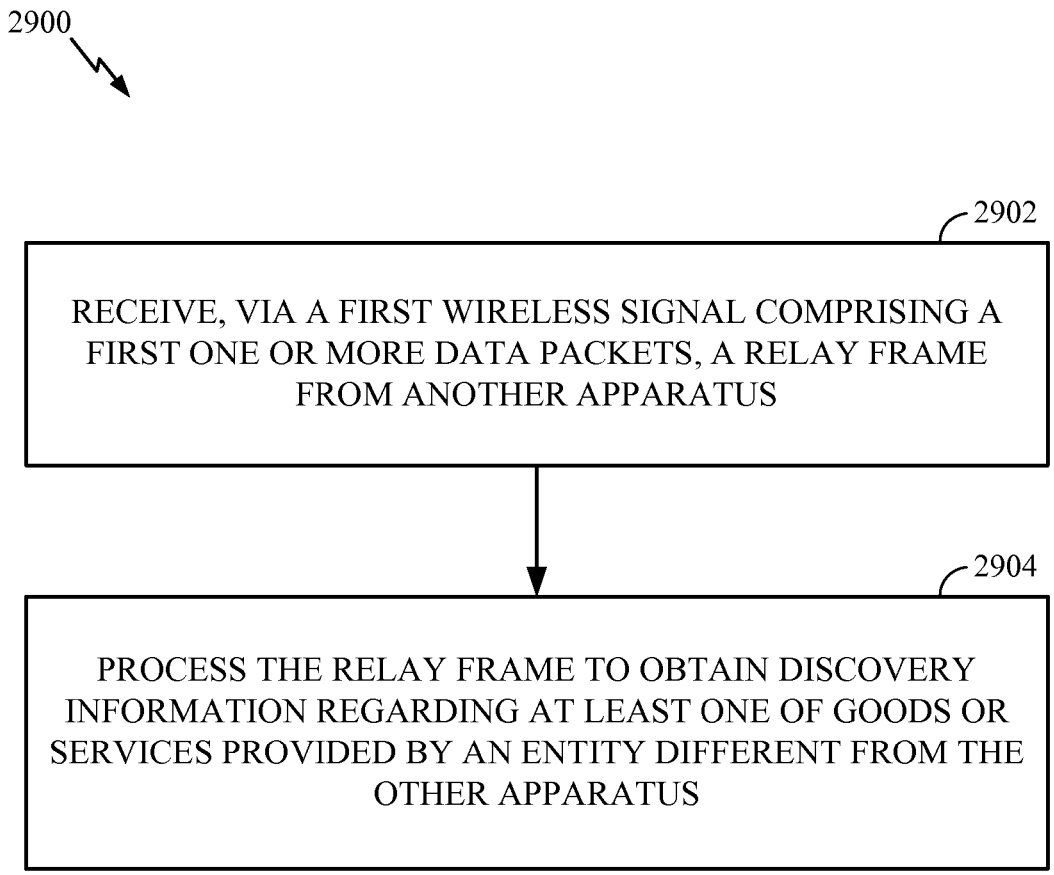
FIG. 29 illustrates example operations, performed by a monitoring entity, in accordance with certain aspects of the present disclosure.

The various techniques presented herein provide a flexible infrastructure that allows for advertising and relaying of discovery information. FIGS. 27, 28, and 29 illustrate various operations for utilizing such an infrastructure, from the perspective of a relay device, an advertising (or announcing) device, and a monitoring device, respectively.

FIG. 27 illustrates example operations 2700 that may be performed by a relay device that relays discovery information. As illustrated, the operations 2700 begin, at 2702, by receiving, via a first wireless signal comprising a first one or more data packets, a discovery frame having one or more fields containing discovery information regarding at least one of goods or services provided by an entity. At 2704, the relay device transmits, via a second wireless signal comprising a second one or more data packets, based on one or more rules, a relay frame having one or more fields containing at least a portion of the discovery information.

FIG. 28 illustrates example operations 2800 that may be performed by a device that advertises discovery information for relaying by a relay device. As illustrated, the operations 2800 begin, at 2802, by generating a discovery frame having one or more fields containing discovery information regarding at least one of goods or services provided by an entity associated with the apparatus. At 2804, the device transmits the discovery frame, via a first wireless signal comprising a first one or more data packets, to a relay device to relay at least a portion of the discovery information in a relay frame.

FIG. 29 illustrates example operations 2900 that may be performed by a device that performs a transaction using relayed discovery information. As illustrated, the operations 2900 begin, at 2902, by receiving, via a first wireless signal comprising a first one or more data packets, a relay frame from another apparatus. At 2904, the device processes the relay frame to obtain discovery information regarding at least one of goods or services provided by an entity different from the other apparatus.

Example Application Programming Interface (API)

As noted above, an API may be provided to allow some control over discovery and access to discovery information (e.g., via vendor specific Apps). In some cases, such an API may be provided (e.g., by device manufacturers) to application designers to facilitate customization of the use of the D2D services described herein, that the underlying communications system enables. These Apps may be vendor-specific or general purpose (e.g., for presentation, profile manipulation, alert customization, etc.). The Discovery-Request messages sent by UE to operator ProSe Function contain the ID of the requesting application. If the application is not accepted, the request is denied. Open discovery intrinsically requires no permission control on who can monitor for the announced public expressions, while restricted discovery require application/user-level permission. This may be achieved with the assistance of an application server who maintains discovery permissions for its users.

In any case, the API may provide access to the discovery functionality and discovery information, without an application designer needing to know the details of the underlying PHY/MAC communications protocol, such as those details described above.

Figure 30A:
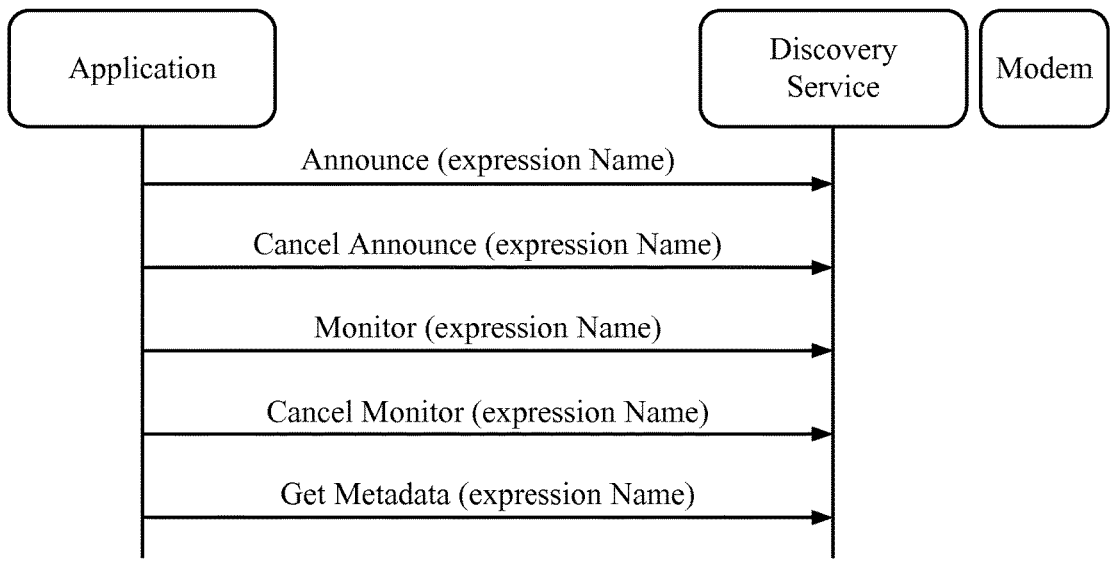
FIGS. 30A and 30B illustrate an example application programming interface (API) and corresponding API calls, in accordance with certain aspects of the present disclosure.
Figure 30B:
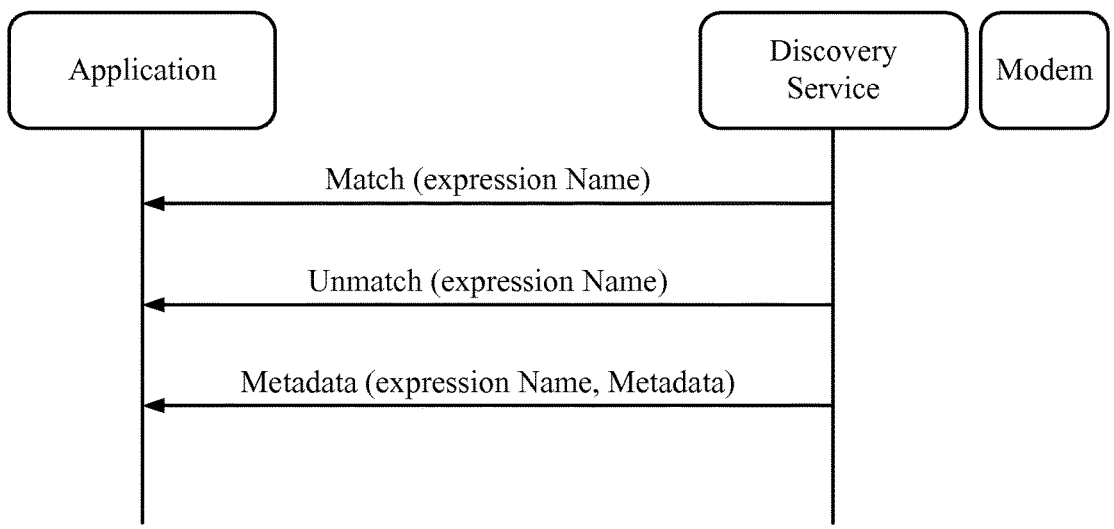

FIGS. 30A and 30B illustrate an example API and corresponding API calls. In general, the API allows an operator to maintain control over which apps are allowed access to discovery information (announce/monitor). As illustrated in FIG. 30A, the API may allow an application to initiate expression announcement (e.g., for a given period of time or until cancelled), cancel expression announcement, monitor for specified expressions (e.g., by explicit names, categories, etc.), cancel monitoring, and obtain (get) metadata for discovered expressions. As illustrated in FIG. 30B, the API may also return a match of a given expression (e.g., when monitoring), an indication if a monitored expression is not found (unmatched), and return various metadata (e.g., if set up for monitoring or triggered by certain conditions). Various other API calls are possible and likely variants of those illustrated may be desirable and useful.

Figure 31:
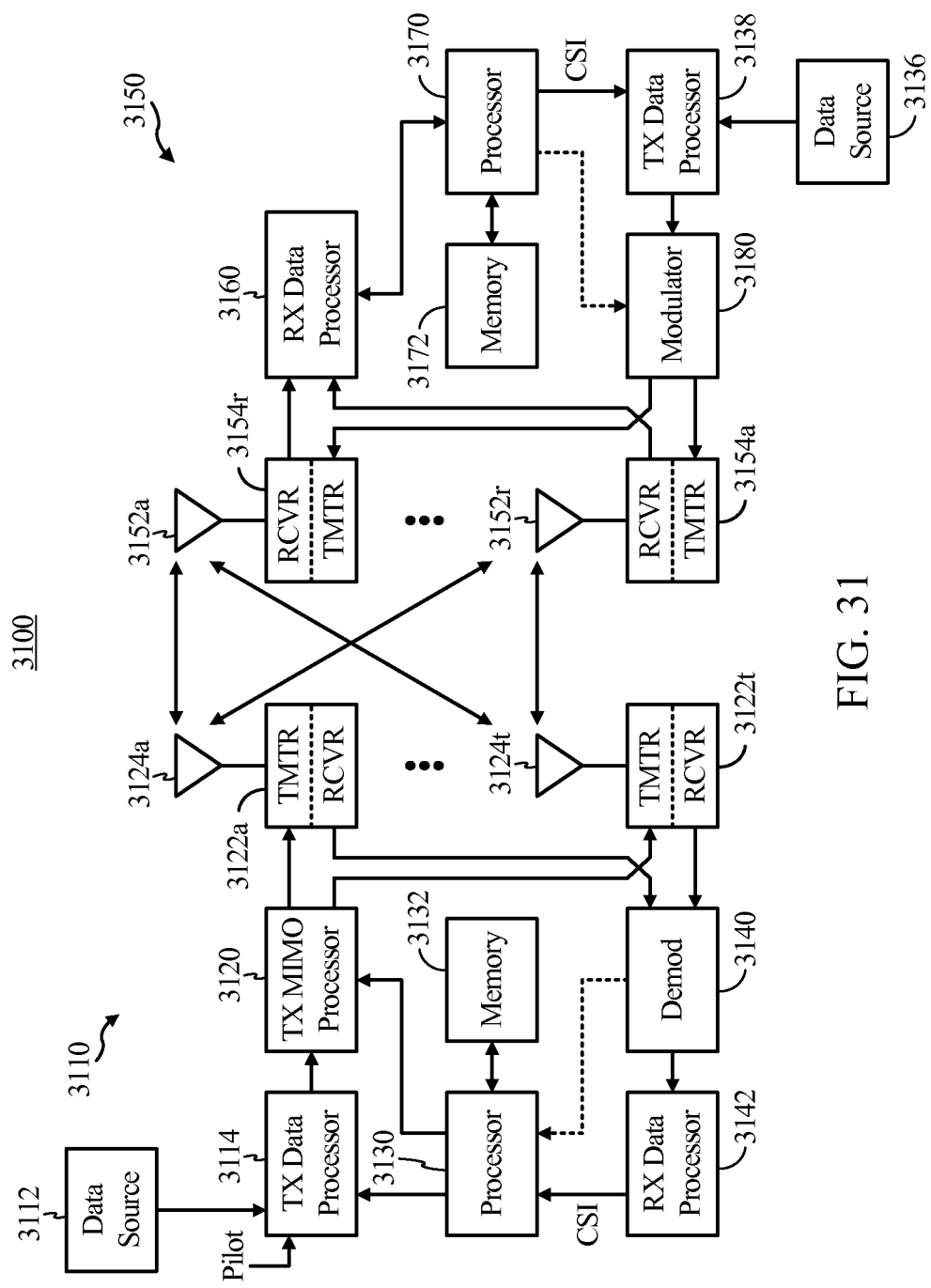
FIG. 31 illustrates a block diagram of an access point and a user terminal in accordance with certain aspects of the present disclosure.

FIG. 31 illustrates a block diagram of a system 3100 with a transmitter system 3110 (e.g., which may correspond to a vendor base station or eNodeB) and a receiver system 3150 (e.g., also known as an access terminal may correspond to a discovery relay, such as an LTE-D UE). At the transmitter system 3110, traffic data for a number of data streams is provided from a data source 3112 to a transmit (TX) data processor 3114.

In one aspect of the present disclosure, each data stream may be transmitted over a respective transmit antenna. TX data processor 3114 formats, codes, and interleaves the traffic data for each data stream based on a particular coding model selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation model (e.g., BPSK, QPSK, m-QPSK, or m-QAM) selected for that data stream to provide modulation symbols. The data rate, coding, and modulation for each data stream may be determined by instructions performed by processor 3130.

The modulation symbols for all data streams are then provided to a TX MIMO processor 3120, which may further process the modulation symbols (e.g., for OFDM). TX MIMO processor 3120 then provides NT modulation symbol streams to NT transmitters (TMTR) 3122a through 3122t.

Each transmitter 3122 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 3122a through 3122t are then transmitted from NT antennas 3124a through 3124t, respectively.

At receiver system 3150, the transmitted modulated signals may be received by NR antennas 3152a through 3152r and the received signal from each antenna 3152 may be provided to a respective receiver (RCVR) 3154a through 3154r. Each receiver 3154 may condition (e.g., filters, amplifies, and downconverts) a respective received signal, digitize the conditioned signal to provide samples, and further process the samples to provide a corresponding "received" symbol stream.

An RX data processor 3160 then receives and processes the NR received symbol streams from NR receivers 3154 based on a particular receiver processing technique to provide NT "detected" symbol streams. The RX data processor 3160 then demodulates, deinterleaves, and decodes each detected symbol stream to recover the traffic data for the data stream. The processing by RX data processor 3160 may be complementary to that performed by TX MIMO processor 3120 and TX data processor 3114 at transmitter system 3110.

A processor 3170 periodically determines which precoding matrix to use. Processor 3170 formulates a reverse link message comprising a matrix index portion and a rank value portion. The reverse link message may comprise various types of information regarding the communication link and/or the received data stream. The reverse link message is then processed by a TX data processor 3138, which also receives traffic data for a number of data streams from a data source 3136, modulated by a modulator 3180, conditioned by transmitters 3154a through 3154r, and transmitted back to transmitter system 3110.

At transmitter system 3110, the modulated signals from receiver system 3150 are received by antennas 3124, conditioned by receivers 3122, demodulated by a demodulator 3140, and processed by a RX data processor 3142 to extract the reserve link message transmitted by the receiver system 3150. In one aspect of the present disclosure, the aforementioned two-step joint de-mapping algorithm for computing bit LLRs based on LMMSE detection and sphere decoding may be performed at the transmitter system 3110, e.g., at the processor 3130. In another aspect, the proposed two-step de-mapping algorithm may be performed at the receiver system 3150, e.g., at the processor 3170. In one aspect of the present disclosure, the aforementioned joint demodulation using MLM may be performed at the transmitter system 3110, e.g., at the processor 3130 and/or other processors and modules at the transmitter system 3110. In another aspect, the aforementioned joint demodulation using MLM may be performed at the receiver system 3150, e.g., at the processor 3170 RX data processor 3160, and/or other processors and modules at the receiver system.

Figure 32:
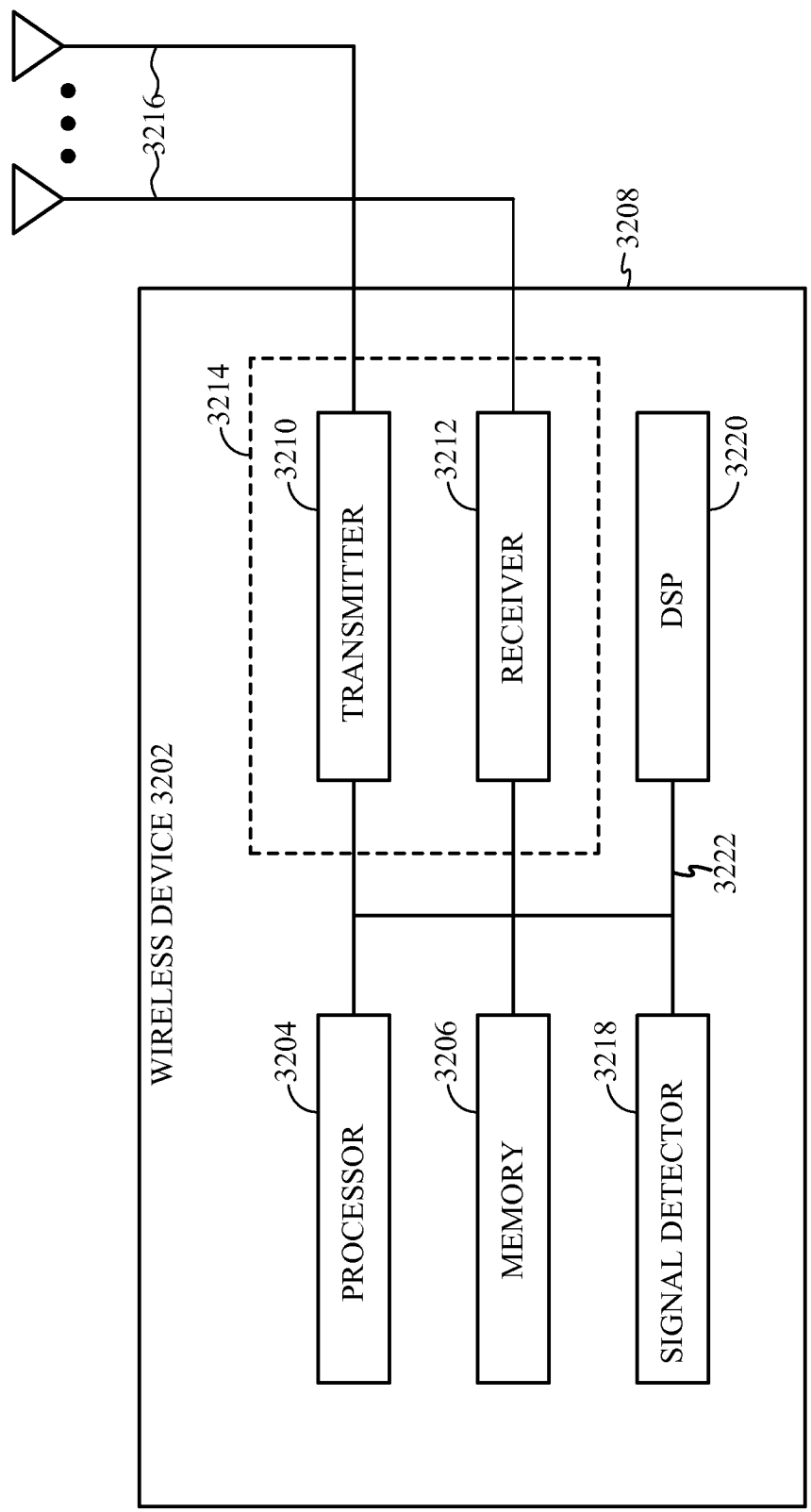
FIG. 32 illustrates a block diagram of an example wireless device in accordance with certain aspects of the present disclosure.

FIG. 32 illustrates various components that may be utilized in a wireless device 3202, for example, that may be employed as a vendor device transmitting expressions regarding goods or services or as a discover relay. Thus, the wireless device 3202 is an example of a device that may be configured to implement the various methods described herein.

The wireless device 3202 may include a processor 3204 which controls operation of the wireless device 3202. The processor 3204 may also be referred to as a central processing unit (CPU). Memory 3206, which may include both read-only memory (ROM) and random access memory (RAM), provides instructions and data to the processor 3204. A portion of the memory 3206 may also include non-volatile random access memory (NVRAM). The processor 3204 typically performs logical and arithmetic operations based on program instructions stored within the memory 3206. The instructions in the memory 3206 may be executable to implement the methods described herein.

The wireless device 3202 may also include a housing 3208 that may include a transmitter 3210 and a receiver 3212 to allow transmission and reception of data between the wireless device 3202 and a remote location. The transmitter 3210 and receiver 3212 may be combined into a transceiver 3214. A single or a plurality of transmit antennas 3216 may be attached to the housing 3208 and electrically coupled to the transceiver 3214. The wireless device 3202 may also include (not shown) multiple transmitters, multiple receivers, and multiple transceivers.

The wireless device 3202 may also include a signal detector 3218 that may be used in an effort to detect and quantify the level of signals received by the transceiver 3214. The signal detector 3218 may detect such signals as total energy, energy per subcarrier per symbol, power spectral density and other signals. The wireless device 3202 may also include a digital signal processor (DSP) 3220 for use in processing signals.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for transmitting may comprise a transmitter, such as the transmitter unit illustrated in FIG. 2, the transmitter unit 3210 of the wireless device depicted in FIG. 32, or a transmitter/receiver depicted in FIG. 31. Means for receiving may comprise a receiver, such as the receiver unit 3212 of the wireless device depicted in FIG. 32 or a transmitter/receiver unit depicted in FIG. 31. Means for processing, means for determining, means for altering, means for generating, means for correcting, and/or means for checking may comprise a processing system, which may include one or more processors depicted in FIG. 31 or FIG. 32. The processing system may also include a correlator.

Further, in some cases, rather than actually transmit a frame (or other structure), an entity (e.g., a processor) may output such a structure via a transmit interface to another entity (e.g., an RF front end or modem) for transmission. Similarly, rather than actually receive a subframe (or other structure), an entity (e.g., a processor) may receive such a structure from another entity (e.g., from an RF front end or modem) via a receive interface. For example, the receive interface may include a bus interface or other type interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combinations with multiples of the same element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by an apparatus, comprising:
   discovering, via device-to-device communications using a first wireless signal comprising a first one or more data packets, goods or services provided by one or more vendors;
   maintaining a database of one or more elements related to the goods or services;
   discovering, via device-to-device communications using a second wireless signal comprising a second one or more data packets, interest in the goods or services by one or more devices; and
   sharing, based at least in part on the discovery of interest, at least one of the one or more elements related to the goods or services with the one or more interested devices only when another apparatus has not already shared the at least one of the one or more elements related to the goods or services with the one or more interested devices,
   wherein the sharing comprises sharing the at least one element with the one or more interested devices, via a third wireless signal comprising a third one or more data packets.

2. The method of claim 1, wherein discovering interest comprises: determining if one of the elements in the database matches an element included in an expression communicated by one or more of the devices.

3. The method of claim 2, further comprising: deciding a device no longer has interest after receiving an expression lacking the matching element communicated by the device.

4. The method of claim 1, wherein discovering interest comprises: determining one or more of the devices are members of a group associated with interest in the goods or services.

5. The method of claim 1, wherein:
   discovering interest comprises discovering a plurality of devices are interested in a plurality of goods or services; and
   the sharing comprises broadcasting, via the third wireless signal, a plurality of elements corresponding to the plurality of goods or services.

6. The method of claim 1, wherein:
   discovering interest is based on a common attribute shared by a group of devices; and
   the sharing comprises sending, via the third wireless signal, a multicast transmission with at least one element to the group of devices.

7. The method of claim 1, wherein the sharing comprises sending, via the third wireless signal, a unicast transmission with one or more elements to a single device.

8. The method of claim 1, further comprising: determining whether to share an element via group-cast, or unicast messaging based, at least in part, on how many devices are interested in a good or service associated with the element.

9. The method of claim 1, further comprising performing a channel access procedure prior to sharing the at least one element.

10. The method of claim 9, wherein the channel access procedure comprises listening on a medium prior to sharing the at least one element.

11. The method of claim 1, further comprising receiving, via a fourth wireless signal, network signaling enabling the sharing.

12. The method of claim 1, further comprising receiving, via a fourth wireless signal, compensation for sharing the at least one element related to the goods or services.

13. The method of claim 12, wherein the compensation is received when a device completes a transaction at the vendor based on the shared information.

14. The method of claim 12, wherein the compensation comprises credit redeemable at the vendor.

15. An apparatus for wireless communications, comprising:
   means for discovering, via device-to-device communications using a first wireless signal comprising a first one or more data packets, goods or services provided by one or more vendors;
   means for maintaining a database of one or more elements related to the goods or services;
   means for discovering, via device-to-device communications using a second wireless signal comprising a second one or more data packets, interest in the goods or services by one or more devices; and
   means for sharing, based at least in part on the discovery of interest, at least one of the one or more elements related to the goods or services with the one or more interested devices only when another apparatus has not already shared the at least one of the one or more elements related to the goods or services with the one or more interested devices,
   wherein the means for sharing shares the at least one element with the one or more interested devices, via a third wireless signal comprising a third one or more data packets.

16. The apparatus of claim 15, wherein the means for discovering interest comprises: means for determining if one of the elements in the database matches an element included in an expression communicated by one or more of the devices.

17. The apparatus of claim 16, further comprising: means for deciding a device no longer has interest after receiving an expression lacking the matching element communicated by the device.

18. The apparatus of claim 15, wherein the means for discovering interest comprises: means for determining one or more of the devices are members of a group associated with interest in the goods or services.

19. The apparatus of claim 15, wherein:
   the means for discovering interest comprises means for discovering a plurality of devices are interested in a plurality of goods or services; and
   the means for sharing comprises means for broadcasting, via the third wireless signal, a plurality of elements corresponding to the plurality of goods or services.

20. The apparatus of claim 15, wherein:
   discovering interest is based on a common attribute shared by a group of devices; and
   the means for sharing comprises means for sending, via the third wireless signal, a multicast transmission with at least one element to the group of devices.

21. The apparatus of claim 15, wherein the means for sharing comprises means for sending, via the third wireless signal, a unicast transmission with one or more elements to a single device.

22. The apparatus of claim 15, further comprising: means for determining whether to share an element via group-cast, or unicast messaging based, at least in part, on how many devices are interested in a good or service associated with the element.

23. The apparatus of claim 15, further comprising means for performing a channel access procedure prior to sharing the at least one element.

24. The apparatus of claim 23, wherein the channel access procedure comprises listening on a medium prior to sharing the at least one element.

25. The apparatus of claim 15, further comprising means for receiving, via a fourth wireless signal, network signaling enabling the sharing.

26. The apparatus of claim 15, further comprising means for receiving, via a fourth wireless signal, compensation for sharing the at least one element related to the goods or services.

27. The apparatus of claim 26, wherein the compensation is received when a device completes a transaction at the vendor based on the shared information.

28. The apparatus of claim 26, wherein the compensation comprises credit redeemable at the vendor.

29. An apparatus for wireless communication, comprising:
   a processing system configured to:
      discover, via device-to-device communications using a first wireless signal comprising a first one or more data packets, goods or services provided by one or more vendors,
      maintain a database of one or more elements related to the goods or services,
      discover, via device-to-device communications using a second wireless signal comprising a second one or more data packets, interest in the goods or services by one or more devices, and
   a transmitter configured to share, based at least in part on the discovery of interest, at least one of the one or more elements related to the goods or with the one or more interested devices only when another apparatus has not already shared the at least one of the one or more elements related to the goods or services with the one or more interested devices,
   wherein the transmitter is configured to share the at least one element with the one or more interested devices, via a third wireless signal comprising a third one or more data packets.

30. The apparatus of claim 29, wherein the processing system is configured to discover interest by determining if one of the elements in the database matches an element included in an expression communicated by one or more of the devices.

31. The apparatus of claim 30, wherein the processing system is further configured to decide a device no longer has interest after receiving an expression lacking the matching element communicated by the device.

32. The apparatus of claim 29, wherein the processing system is configured to discover interest by determining one or more of the devices are members of a group associated with interest in the goods or services.

33. The apparatus of claim 29, wherein:
   the processing system is configured to discover interest by discovering a plurality of devices are interested in a plurality of goods or services; and
   the transmitter is configured to share by broadcasting, via the third wireless signal, a plurality of elements corresponding to the plurality of goods or services.

34. The apparatus of claim 29, wherein:
the processing system is configured to discover interest based on a common attribute shared by a group of devices; and
the transmitter is configured to share by sending, via the third wireless signal, a multicast transmission with at least one element to the group of devices.

35. The apparatus of claim 29, wherein the transmitter is configured to share by sending, via the third wireless signal, a unicast transmission with one or more elements to a single device.

36. The apparatus of claim 29, wherein the processing system is further configured to determine whether to share an element via group-cast, or unicast messaging based, at least in part, on how many devices are interested in a good or service associated with the element.

37. The apparatus of claim 29, wherein the processing system is further configured to perform a channel access procedure prior to sharing the at least one element.

38. The apparatus of claim 37, wherein the channel access procedure comprises listening on a medium prior to sharing the at least one element.

39. The apparatus of claim 29, further comprising a receiver configured to receive, via a fourth wireless signal, network signaling enabling the sharing.

40. The apparatus of claim 29, further comprising a receiver configured to receive, via a fourth wireless signal, compensation for sharing the at least one element related to the goods or services.

41. The apparatus of claim 40, wherein the compensation is received when a device completes a transaction at the vendor based on the shared information.

42. The apparatus of claim 40, wherein the compensation comprises credit redeemable at the vendor.

43. A non-transitory computer-readable medium having computer executable code stored thereon for:
discovering, via device-to-device communications using a first wireless signal comprising a first one or more data packets, goods or services provided by one or more vendors;
maintaining a database of one or more elements related to the goods or services;
discovering, via device-to-device communications using a second wireless signal comprising a second one or more data packets, interest in the goods or services by one or more devices; and
sharing, based at least in part on the discovery of interest, at least one of the one or more elements related to the goods or services with the one or more interested devices only when another apparatus has not already shared the at least one of the one or more elements related to the goods or services with the one or more interested devices,
wherein the sharing comprises sharing the at least one element with the one or more interested devices, via a third wireless signal comprising a third one or more data packets.

44. The computer-readable medium of claim 43, wherein discovering interest comprises: determining if one of the elements in the database matches an element included in an expression communicated by one or more of the devices.

45. The computer-readable medium of claim 44, further comprising: deciding a device no longer has interest after receiving an expression lacking the matching element communicated by the device.

46. The computer-readable medium of claim 43, wherein discovering interest comprises: determining one or more of the devices are members of a group associated with interest in the goods or services.

47. The computer-readable medium of claim 43, wherein:
discovering interest comprises discovering a plurality of devices are interested in a plurality of goods or services; and
the sharing comprises broadcasting, via the third wireless signal, a plurality of elements corresponding to the plurality of goods or services.

48. The computer-readable medium of claim 43, wherein:
discovering interest is based on a common attribute shared by a group of devices; and
the sharing comprises sending, via the third wireless signal, a multicast transmission with at least one element to the group of devices.

49. The computer-readable medium of claim 43, wherein the sharing comprises sending, via the third wireless signal, a unicast transmission with one or more elements to a single device.

50. The computer-readable medium of claim 43, wherein the computer executable code is further for determining whether to share an element via group-cast, or unicast messaging based, at least in part, on how many devices are interested in a good or service associated with the element.

51. The computer-readable medium of claim 43, wherein the computer executable code is further for performing a channel access procedure prior to sharing the at least one element.

52. The computer-readable of claim 51, wherein the channel access procedure comprises listening on a medium prior to sharing the at least one element.

53. The computer-readable medium of claim 43, wherein the computer executable code is further for receiving, via a fourth wireless signal, network signaling enabling the sharing.

54. The computer-readable medium of claim 43, wherein the computer executable code is further for receiving, via a fourth wireless signal, compensation for sharing the at least one element related to the goods or services.

55. The computer-readable medium of claim 54, wherein the compensation is received when a device completes a transaction at the vendor based on the shared information.

56. The computer-readable medium of claim 54, wherein the compensation comprises credit redeemable at the vendor.

* * * * *